US012255972B2

(12) United States Patent
Merwaday et al.

(10) Patent No.: US 12,255,972 B2
(45) Date of Patent: Mar. 18, 2025

(54) EDGE COMPUTING LOCAL BREAKOUT

(71) Applicant: Intel Corporation, Santa Clara, CA (US)

(72) Inventors: Arvind Merwaday, Beaverton, OR (US); Kathiravetpillai Sivanesan, Portland, OR (US); Leonardo Gomes Baltar, Munich (DE); Suman A. Sehra, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 337 days.

(21) Appl. No.: 17/407,456

(22) Filed: Aug. 20, 2021

(65) Prior Publication Data

US 2022/0038554 A1 Feb. 3, 2022

Related U.S. Application Data

(60) Provisional application No. 63/068,866, filed on Aug. 21, 2020.

(51) Int. Cl.
*H04L 67/63* (2022.01)
*H04L 45/64* (2022.01)

(52) U.S. Cl.
CPC ............ *H04L 67/63* (2022.05); *H04L 45/64* (2013.01)

(58) Field of Classification Search
CPC ................................ H04L 67/63; H04L 45/64
See application file for complete search history.

(56) References Cited

U.S. PATENT DOCUMENTS

| | | | |
|---|---|---|---|
| 2018/0248707 A1* | 8/2018 | Rune | H04W 8/082 |
| 2018/0352038 A1* | 12/2018 | Sathyanarayana | H04L 69/22 |
| 2019/0029061 A1* | 1/2019 | Feng | H04W 76/22 |
| 2020/0007460 A1 | 1/2020 | Guim Bernat et al. | |
| 2020/0107403 A1* | 4/2020 | Frydman | H04W 88/182 |

(Continued)

FOREIGN PATENT DOCUMENTS

WO WO2010/130270 A1 11/2010

OTHER PUBLICATIONS

Extended European Search Report for European Patent Application No. 21192527.6, 10 pages.

(Continued)

*Primary Examiner* — Yemane Mesfin
*Assistant Examiner* — Salma Ayad
(74) *Attorney, Agent, or Firm* — Hanley, Flight & Zimmerman, LLC

(57) ABSTRACT

The present disclosure describes local breakout for edge computing systems, wherein the local breakout selectively routes the traffic from/to a user equipment between an edge compute node or some other service such as a core network, cloud computing service, or the like. Packets related to microservices that are offered by the edge compute node are routed to the edge compute node instead of routing those packets to the core network, and packets that are not related to the microservices provided by the edge compute node are routed to the core network or to another network such as a data network or cloud computing service. In these ways, the local breakout mechanisms provide low latency and reduced network resource consumption for the microservices and decreased data traffic load on the core network.

17 Claims, 26 Drawing Sheets

(56) References Cited

U.S. PATENT DOCUMENTS

| | | | | |
|---|---|---|---|---|
| 2020/0288352 | A1* | 9/2020 | Hu | H04L 47/2408 |
| 2021/0176327 | A1* | 6/2021 | Soliman | H04M 15/64 |
| 2022/0159501 | A1* | 5/2022 | Chou | H04L 41/122 |
| 2022/0182890 | A1* | 6/2022 | Shan | H04W 4/50 |
| 2022/0182917 | A1* | 6/2022 | Muhammad | H04W 40/248 |
| 2022/0322202 | A1* | 10/2022 | Li | H04W 36/03 |
| 2023/0007457 | A1* | 1/2023 | Kleinrouweler | H04L 67/1014 |
| 2023/0209402 | A1* | 6/2023 | Ronkainen | H04W 28/08 370/229 |

OTHER PUBLICATIONS

Paper White et al: "Edge Computing: from standard to actual infrastructure deployment and software development Authors", Oct. 1, 2019 (Oct. 1, 2019), 42 pages, XP055883211.

Thomas Linget, "5GAA Automotive Association—MEC for Automotive in Multi-Operator Scenarios—Technical Report", Mar. 3, 2021, 58 pages.

Thomas Linget, "5GAA Automotive Association—Working Item MEC4AUTO—Technical Report", 2020, 38 pages.

Rolf Schuster et al., "Open Edge Computing", Jun. 21, 2016, 23 pages, Berlin, Germany.

"3rd Generation Partnership Project; Technical Specification Group Core Network and Terminals; General Packet Radio System (GPRS) Tunnelling Protocol User Plane (GTPv1-US) (Release 16)", Dec. 2019, 33 pages, 3GPP TS 29.281 V16.0.0, Valbonne, France.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", Jul. 2020, 378 pages, 3GPP TS 36.300 V16.2.0, Valbonne, France.

"3rd Generation Partnership Project; Technical Specification Group Radio Access Network; Evolved Universal Terrestrial Radio Access (E-UTRA); Radio Resource Control (RRC); Protocol specification (Release 16)", Jul. 2020, 1078 pages, 3GPP TS 36.331 V16.1.1 , Valbonne, France.

"3rd Generation Partnership Project; Technical Specification Group Radio Access Network; Evolved Universal Terrestrial Radio Access Network (E-UTRAN); X2 application protocol (X2AP) (Release 16)", Jul. 2020, 490 pages, 3GPP TS 36.423 V16.2.0, Valbonne, France.

"3rd Generation Partnership Project; Technical Specification Group Radio Access Network; NR; NR and NG-RAN Overall Description; Stage 2 (Release 16)", Jul. 2020, 148 pages, 3GPP TS 38.300 V16.2.0, Valbonne, France.

Sebastian Bohm et al., "A Quantitative Evaluation Approach for Edge Orchestration Strategies", Dec. 2020, 21 pages.

Giovanbattista Caliandro, "Multi-Access Edge Computing for Automotive Applications", Mar. 2020, 74 pages.

GSM Associaion, "IMS Roaming, Interconnection and Interworking Guidelines", May 3, 2021, 81 pages, Version 34.0.

Intel, "Using OpenNESS to Unleash Innovation at the Network Edge", Dec. 19, 2019, 11 pages.

Eberhardt et al., "Simplifying Edge Orchestration", Intel White Paper, Aug. 8, 2020, 4 pages.

Mavenir, "Local Breakout—A Solid Business Case for MEC at the Edge", May 2018, 10 pages.

Intel Network Platforms Group (NPG), "Open Network Edge Services Software (Openness): APIS", May 28, 2020, 22 pages.

European Patent Office, "Communication pursuant to Article 94(3) EPC," issued in connection with European Patent Application No. 21 192 527.6-1215, dated May 31, 2024, 5 pages.

Chen et al., "IoT Microservice Deployment in Edge-Cloud Hybrid Environment Using Reinforcement Learning," IEEE Internet of Things Journal, vol. 8, No. 16, Aug. 15, 2021, 13 pages.

* cited by examiner

EDGE COMPUTING LOCAL BREAKOUT

RELATED APPLICATIONS

The present application claims priority to U.S. Provisional App. No. 63/068,866 filed Aug. 21, 2020 ("[AD1894-Z]"), the contents of which is/are hereby incorporated by reference in its/their entirety.

TECHNICAL FIELD

Embodiments described herein generally relate to edge computing, network communication, and communication system implementations, and in particular, to mechanisms for providing edge local breakout sessions for providing edge-related services and microservices.

BACKGROUND

Local breakout (LBO) refers to a method of providing a data session (e.g., Internet access) at a cell site instead of tunneling back into a core network. Usually, conventional LBO requires core network functions to be, effectively, inside the cell site, making the cell site a completely self-contained cellular network. This mode of operation can be used along with authentication bypassing to eliminate the need for a core network in certain scenarios. Because conventional LBO does not rely on the network functions of a centralized core network, conventional LBO can simplify the network, and reduce latency and/or delay. However, these advantages are only possible for applications that use a single cell site, or where a mobile station is not likely to move between cells during a data session. This is because an internet protocol (IP) address change will take place when the mobile station travels from one cell to another, which will disrupt in-progress data sessions thereby eliminating the advantages of provided by conventional LBO.

BRIEF DESCRIPTION OF THE DRAWINGS

In the drawings, which are not necessarily drawn to scale, like numerals may describe similar components in different views. Like numerals having different letter suffixes may represent different instances of similar components. The figures of the accompanying drawings include.

DETAILED DESCRIPTION

Figure 1:
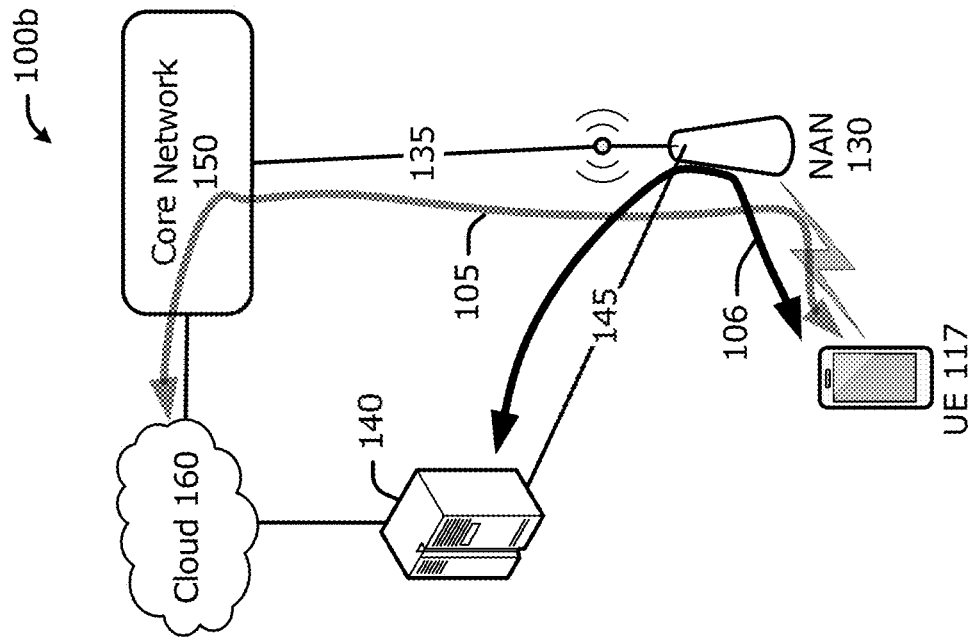
FIG. 1 depicts examples of local breakout at a edge computing platform and/or network access nodes (NANs).
Figure 1:
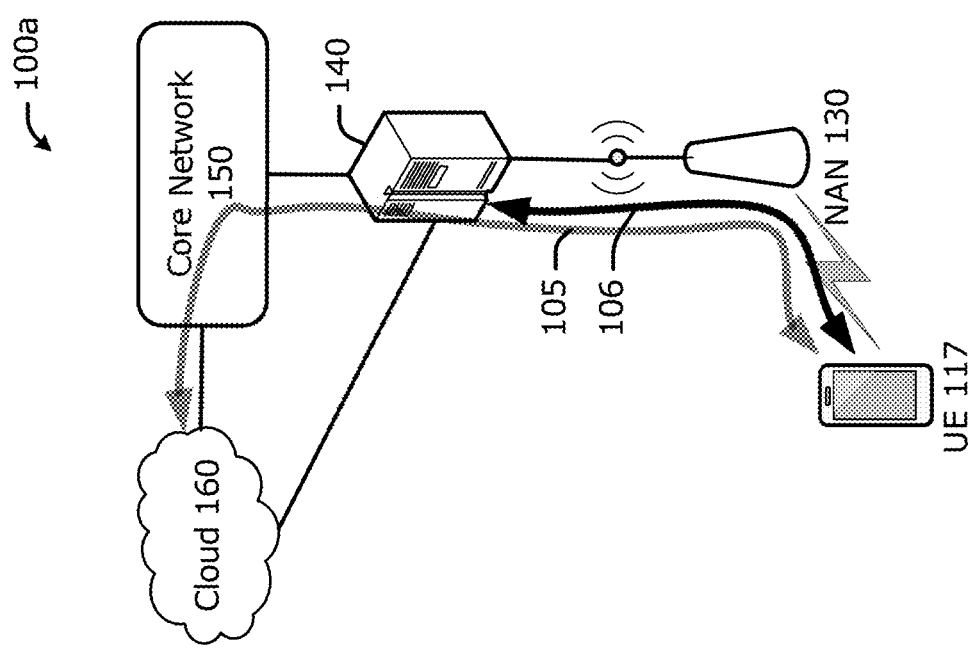

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

1. Edge Local Breakout

The present disclosure provides edge-based micro-services using edge infrastructure via existing air interfaces (e.g., 3GPP-based air interface such as the LTE-Uu interface or the NR-Uu interface). In embodiments, local breakout (LBO) techniques is/are used to selectively divert edge-service related packets from UEs to edge computing nodes/platforms, and vice versa. LBO refers to mechanisms that route traffic from network access nodes (NANs) to the services themselves, and vice versa, and often involves providing local access (e.g., IP access) to those services. For example, data packets related to microservices and/or related to other services that are offered by one or more edge compute nodes are routed to the edge compute nodes instead of being routed to the core network. LBO is normally performed to provide backend services to a user, but the edge LBO services discussed herein can be done as an edge session depending on the user's needs and/or use case. In some embodiments, the edge LBO services can be provided as a new session or as part of an ongoing session. In some embodiments, the edge LBO services can be part of a continuous process in a layer of a software stack. In some embodiments, the edge LBO services can pull backend network functions (NFs) into the edge LBO session as needed (e.g., operating one or more core network NFs as edge apps or in some other manner on an edge platform).

Currently available solutions, utilize packets related to services (e.g., commercial services or other services) that have to pass through a core network (e.g., a cellular core network or some other back-end network) to reach a cloud computing platform where the services are provided. The disadvantages of the current solutions include increased data traffic load on the core network and/or other back-end network infrastructure for carrying these packets, congestion in the core network and/or backhaul network, and high latency due to several entities involved in transporting the packets between UEs and the service.

The edge LBO techniques discussed herein allow traffic to bypass a core network and/or other back-end/backbone network on the user plane (UP), which shortens the end-to-end (e2e) route (network path) thereby reducing network latency/delays as well as reducing network/communication overhead. Bypassing the core network and/or other back-end/backbone network also reduces the load on relatively expensive core network functions and/or backbone infrastructure. The present disclosure also provides system architecture deployments, protocol stacks, and messaging procedures to provide the edge LBO techniques. The edge LBO techniques discussed herein enable targeted/context aware micro-services to be provided to end users.

FIG. 1 shows examples of local breakout, which is used to divert edge-service related packets to/from a UE 117 to an edge node 140 (over path 106 in FIG. 1) instead of sending those packets to/from a cloud computing service 160 via core network 150 (over path 105 in FIG. 1). The local breakout techniques are implemented at edge compute nodes 140 and/or at network access nodes (NANs) 130. In FIG. 1, only the UP interfaces are shown for the sake of brevity, but it should be understood that such implementations may apply to control plane (CP) aspects as well.

FIG. 1 shows a first local breakout example 100a where the edge node 140 is deployed on an interface between the NAN 130 and the core network 150. Here, the local breakout algorithm can be implemented in the edge node 140, which diverts the edge-based packets to edge applications ("apps") in the edge node 140, while the other packets are relayed to the cloud computing service ("cloud") 160 via the core network 150. FIG. 1 also shows a second local breakout example 100b where the edge node 140 is deployed using a separate interface 145 to the NAN 130. In example 100b, the interface 135 between the NAN 130 and the core network 150 is not changed. Here, the local breakout algorithm can be implemented in the NAN 130 where the NAN 130 sends the edge-based packets to the edge compute node 140 and the non-edge-related packets to the cloud 160 via the core network 150.

As mentioned previously, the local breakout techniques discussed herein selectively route edge-service packets to edge compute nodes 140 while forwarding other (non-edge-related) packets to a core network 150 and/or cloud 160.

The edge compute nodes 140 include computing resources (e.g., compute, storage, I/O, network, virtualization, and/or other resources) to provide low latency edge services. As an example, where MEC implementations are used, a MEC orchestrator manages/controls one or more MEC platforms. For scalability, multiple MEC orchestrators can be deployed in large scale scenarios.

The UE 117 is a client device and/or mobile device such as a laptop, smartphone, tablet, wearable device, Internet of Things (IoT) device, appliance, and/or other suitable user device such as those discussed herein. In some implementations, the UE 117 is or includes an Intelligent Transport System Station (ITS-S) such as a vehicle ITS-S (V-ITS-S) in a vehicle system, a personal ITS-S (P-ITS-S) or a vulnerable road user (VRU) ITS-S (see e.g., [AD1894-Z]). The UE 117 can obtain edge services from an edge compute node 140 via an air interface such as the Uu interface (e.g., where the NAN 130 is an Evolved Universal Terrestrial Radio Access Network (E-UTRAN) NodeB ("eNodeB" or "eNB") or Next Generation NodeB ("gNodeB or "gNB")) or a WLAN interface (e.g., where the NAN 130 is a WiFi access point (AP) or the like).

The NAN 130 comprises one or more network elements such as base stations, roadside units (RSUs) and/or roadside ITS-Ss in roadside infrastructure nodes (see e.g., [AD1894-Z]), access points (APs), etc., implemented by RAN controllers, hubs, switches, routers, gateways, specialized network appliances, and/or other network elements.

The edge compute nodes 140 may be implemented using a suitable edge computing technology/framework such as a Multi-access Edge Computing (MEC) framework (see e.g., FIG. 17 discussed infra), OpenNESS edge platforms (see e.g., FIGS. 19-23), and/or using some other edge computing technologies such as those discussed herein. In implementations that utilize the Multi-access Edge Computing (MEC) framework (see e.g., FIG. 17), new MEC bearers are added to protocol(s) in order to efficiently differentiate the MEC packets from the non-edge-service packets destined for the core network, app server(s), and/or cloud computing system.

Figure 5:
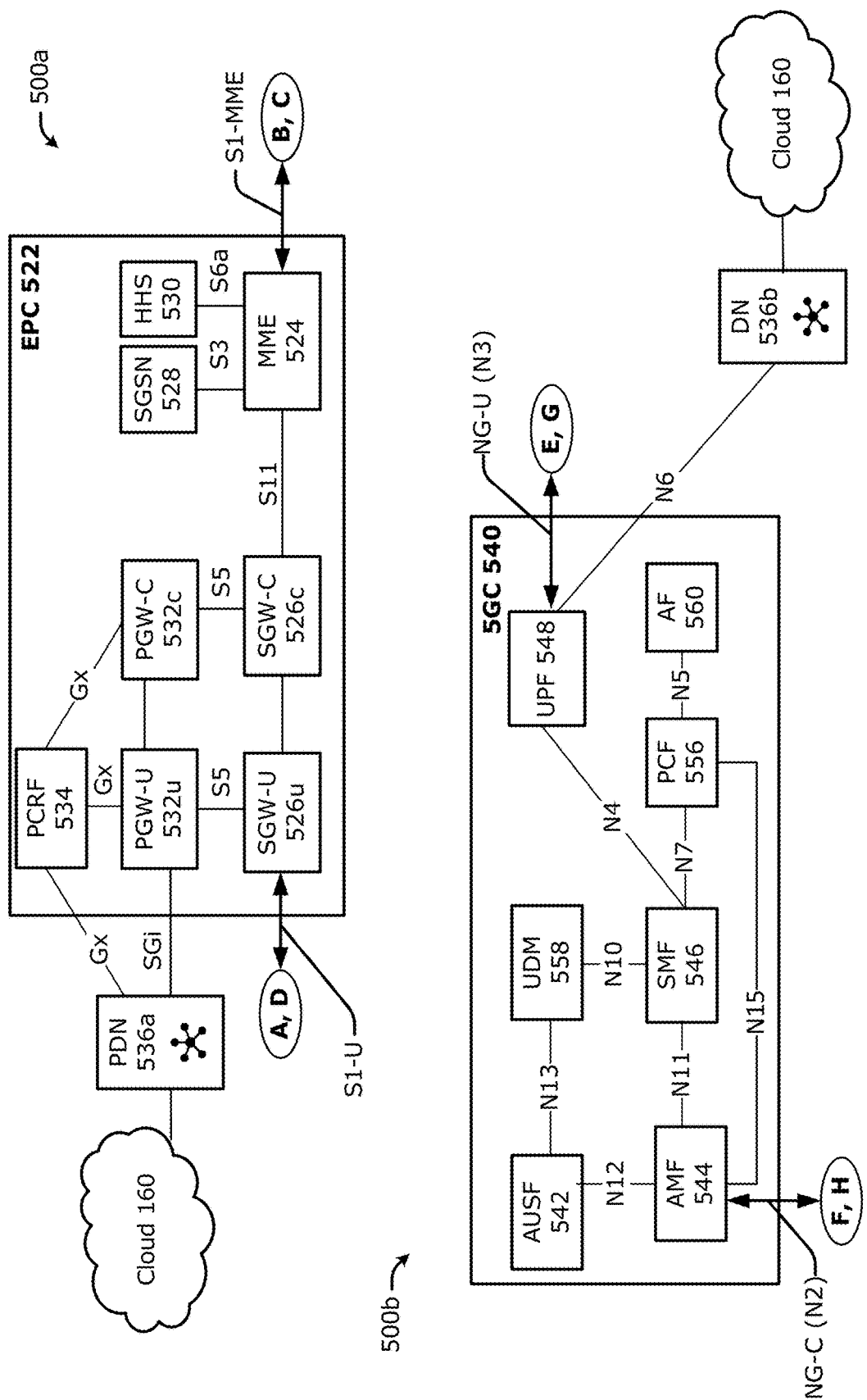

The core network 150 may be a cellular core network such as a Fourth Generation (4G)/Long Term Evolution (LTE) Evolved Packet Core (EPC), a Fifth Generation Core network (5GC), and/or the like (see e.g., FIG. 5 discussed infra). Alternatively, the core network 150 could represent a non-cellular backend network architecture such as a World-wide Interoperability for Microwave Access (WiMAX) core network, a Fixed Access (FA) core network and/or broadband core, and/or the like.

The cloud 160 may be a cloud computing architecture/platform that provides cloud computing services. Additionally or alternatively, the cloud 160 may represent one or more application servers, a distributed computing platform/service, and/or some other remote infrastructure. Additionally or alternatively, the cloud 160 may represent a network such as a data network, a local area network (LAN), a wide area network (WAN), a wireless local area network (WLAN), a wireless wide area network (WWAN), a virtual private network (VPN), the Internet, and/or an edge cloud. Any of the aforementioned networks may include proprietary and/or enterprise networks for a company or organization, or combinations thereof.

The present disclosure is applicable for both 4G LTE and 5G NR network architectures, and supports different edge compute node 140 deployments. Depending on the deployment, the local breakout technique can be applied at NAN 130 and/or at the edge compute node 140. In various implementations, data and control packets may be altered or enhanced to include some indication that the packets belong to edge-services or not, and may be carried/communicated by different network nodes. The local breakout mechanisms discussed herein may also be implemented in existing network element, network appliances, base stations, and/or other like devices.

1.1. System Architecture for Edge Local Breakout

Figure 2:
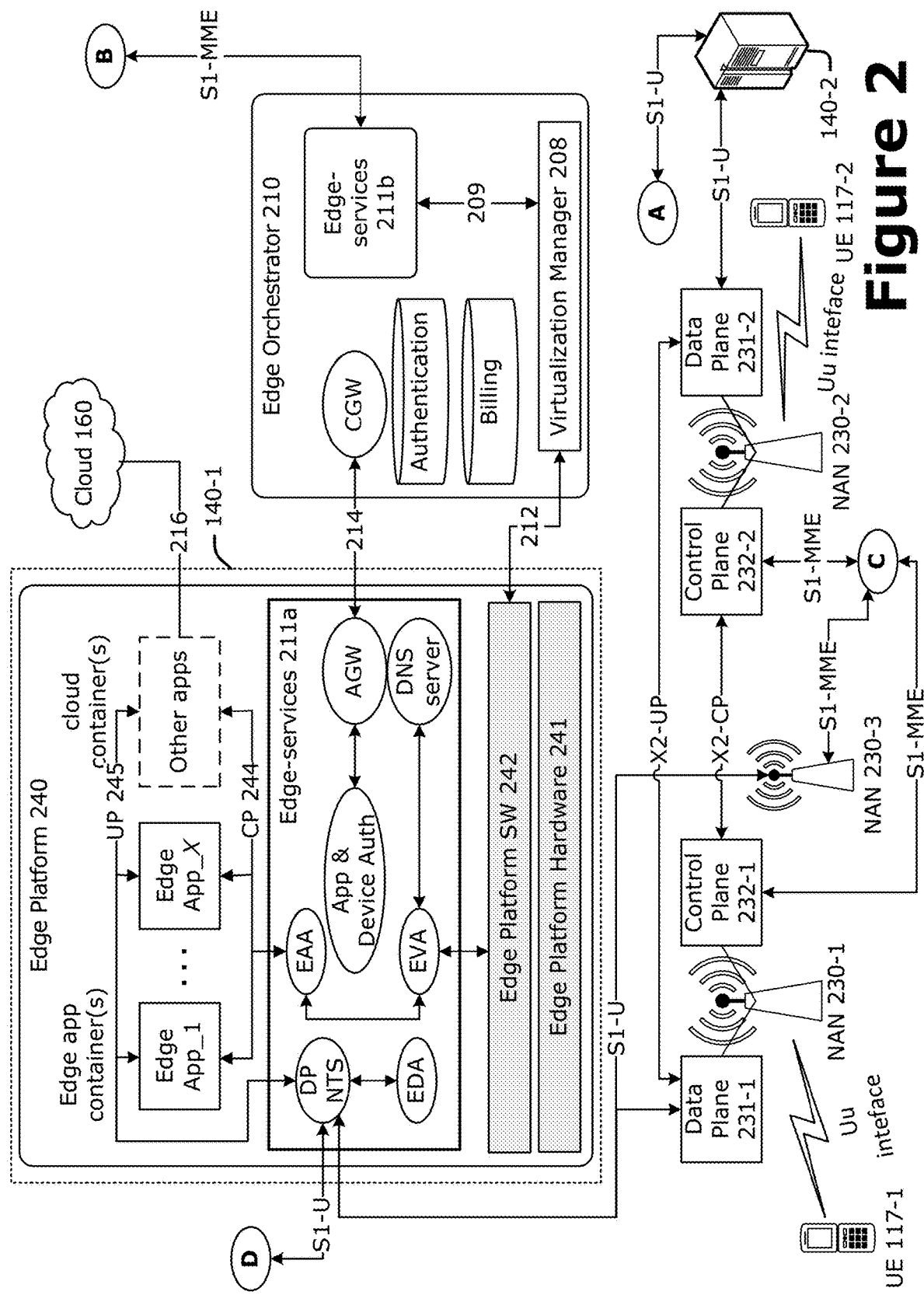
FIGS. 2, 3, 4, and 5 depict respective cellular system architectures with various edge computing deployments.

FIG. 2 illustrates an example fourth generation (4G) System Architecture (SA) with a first edge computing deployment, which utilizes the local breakout mechanisms discussed herein. In this deployment scenario, the NANs 230-1, 230-2, 230-3 (collectively referred to as "NANs 230" or "NAN 230") may be cellular base stations such as eNBs, en-gNBs, and/or other like Radio Access Network (RAN) nodes. The NANs 230 provide E-UTRA UPs 231-1, 231-2 (e.g., Packet Data Convergence Protocol (PDCP), Radio Link Control (RLC), Medium Access Control (MAC), and Physical layer (PHY)) and CPs 232-1, 232-2 (e.g., Radio Resource Control (RRC)) protocol terminations towards UEs 117. The NANs 230 (e.g., eNBs, en-gNBs, etc.) are interconnected with each other by means of an X2 interface, which includes an X2-CP interface communicatively coupling the CP entities 232-1, 232-2 of the NANs 230 and an X2-UP interface communicatively coupling the UP entities 231-1, 231-2 of the NANs 230 (see e.g., 3GPP TS 36.300 v16.2.0 (2020 Jul. 24) ("[TS36300]"), 3GPP TS 36.423 v16.2.0 (2020 Jul. 17) ("[TS36423]")). Note that the CP and UP entities of the NAN 230-3 are not shown for the sake of clarity. The NANs 230 (e.g., eNBs, en-gNBs, etc.) are also connected by means of an S1 interface to an Evolved Packet Core (EPC) (e.g., EPC 522 of FIG. 5). More specifically, the NANs 230 (e.g., eNBs, en-gNBs, etc.) are connected to a Mobility Management Entity (MME) 524 (see e.g., FIG. 5) by means of the S1-MME interface and to a Serving Gateway (SGW) (e.g., SGW-U 526u of FIG. 5) by means of the S1-U interface. The S1 interface supports a many-to-many relation between MMEs 524/Serving Gateways SGW-U 526u and eNBs/en-gNBs 230 (see e.g., [TS36300], and 3GPP TS 36.340 v16.2.0 (2020 Jul. 24).

In the deployment of FIG. 2, the edge nodes 140-1, 140-2 may be the same or similar to the edge node 140 of FIG. 1. The edge node 140-1 includes an edge platform 240, and although not shown by FIG. 2, edge node 140-2 may have a same or similar edge platform 240. The edge platforms 240 is/are deployed on an S1-U interface between NANs 230 and an SGW-U 526u (see e.g., FIG. 5). This edge deployment is transparent to the NANs 230, and hence, does not require any modifications in the NANs 230.

The edge platforms 240 can connect to one or more NANs 230 via the S1-U interface. For example, in FIG. 2 the edge platform 240-1 provides edge services to NAN 230-1 and NAN 230-3, while edge platform 240-2 provides edge services to NAN 230-2. The edge platforms 240 keep track of the UP traffic from/to the connected NANs 230 on a packet-by-packet basis and perform local breakout of edge-service packets depending on predetermined or configured policies.

Figure 3:
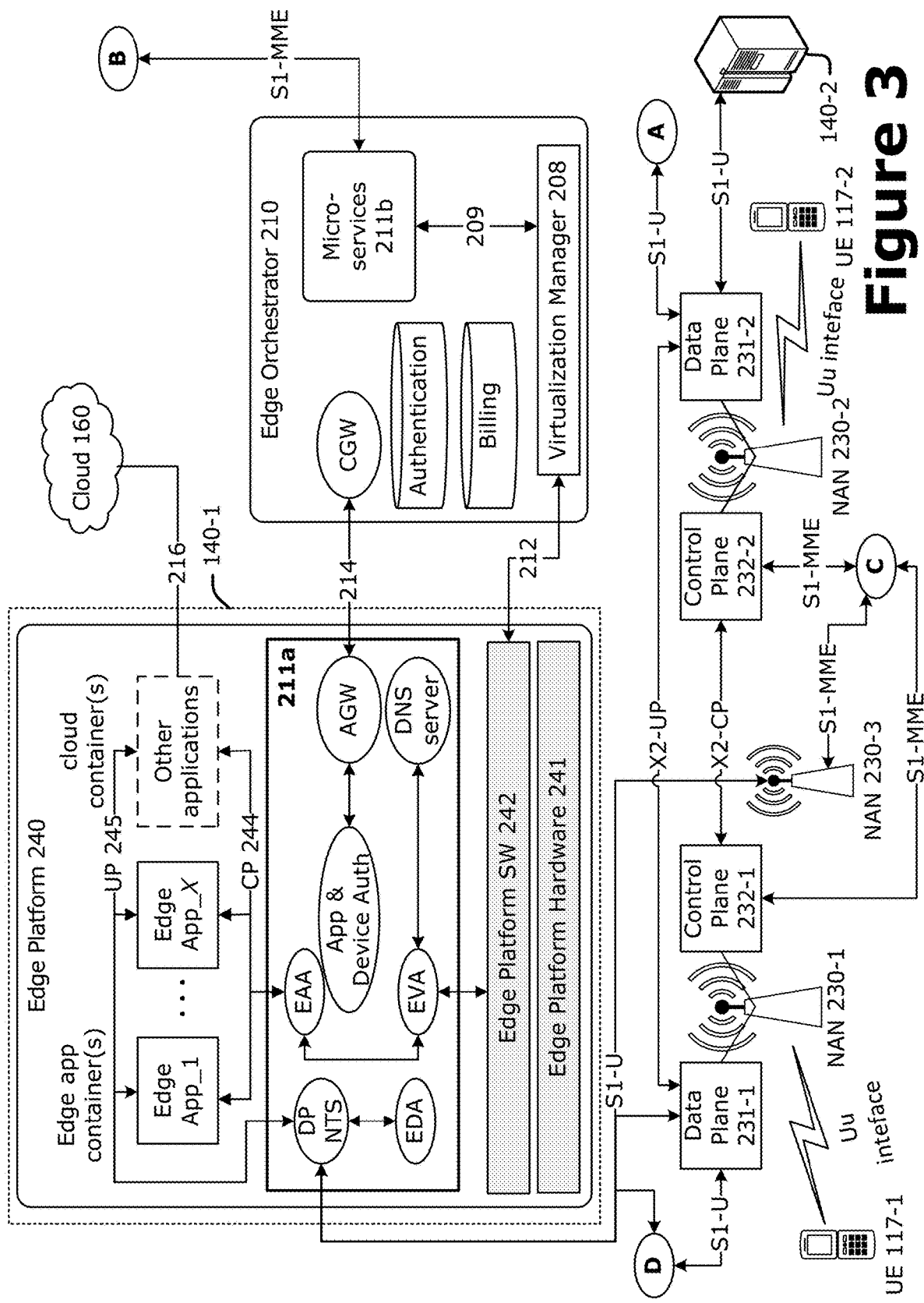

FIG. 3 illustrates an example 4G SA with a second edge computing deployment, which utilizes the local breakout mechanisms discussed herein. In this deployment, the NANs 230 may be cellular base stations such as eNBs, en-gNBs, and/or other like RAN nodes. Furthermore, the edge platforms 240 are deployed with a separate S1-U interfaces to the the NANs 230.

In the deployment of FIG. 3, the existing S1-U interfaces between the NANs 230-1, 230-2, 230-3 and the SGW-U 526u (see e.g., FIG. 5) are not changed. However, the NANs 230-1, 230-2, 230-3 are configured to support additional S1-U interface(s) to their respective edge platforms 240. For example, in FIG. 3, NANs 230-1 has two S1-U interfaces, a first S1-U interface for communicating with the SGW-U 526u (see e.g., FIG. 5) and a second S1-U interface for the edge platform 240-1. Additionally, the NANs 230-1, 230-2, 230-3 are configured to perform the local breakout of the edge-service packets and route the edge-service packets to the their respective edge platforms 240. Other (non-edge-service) packets are routed to the EPC (e.g., EPC 522 of FIG. 5).

Figure 4:
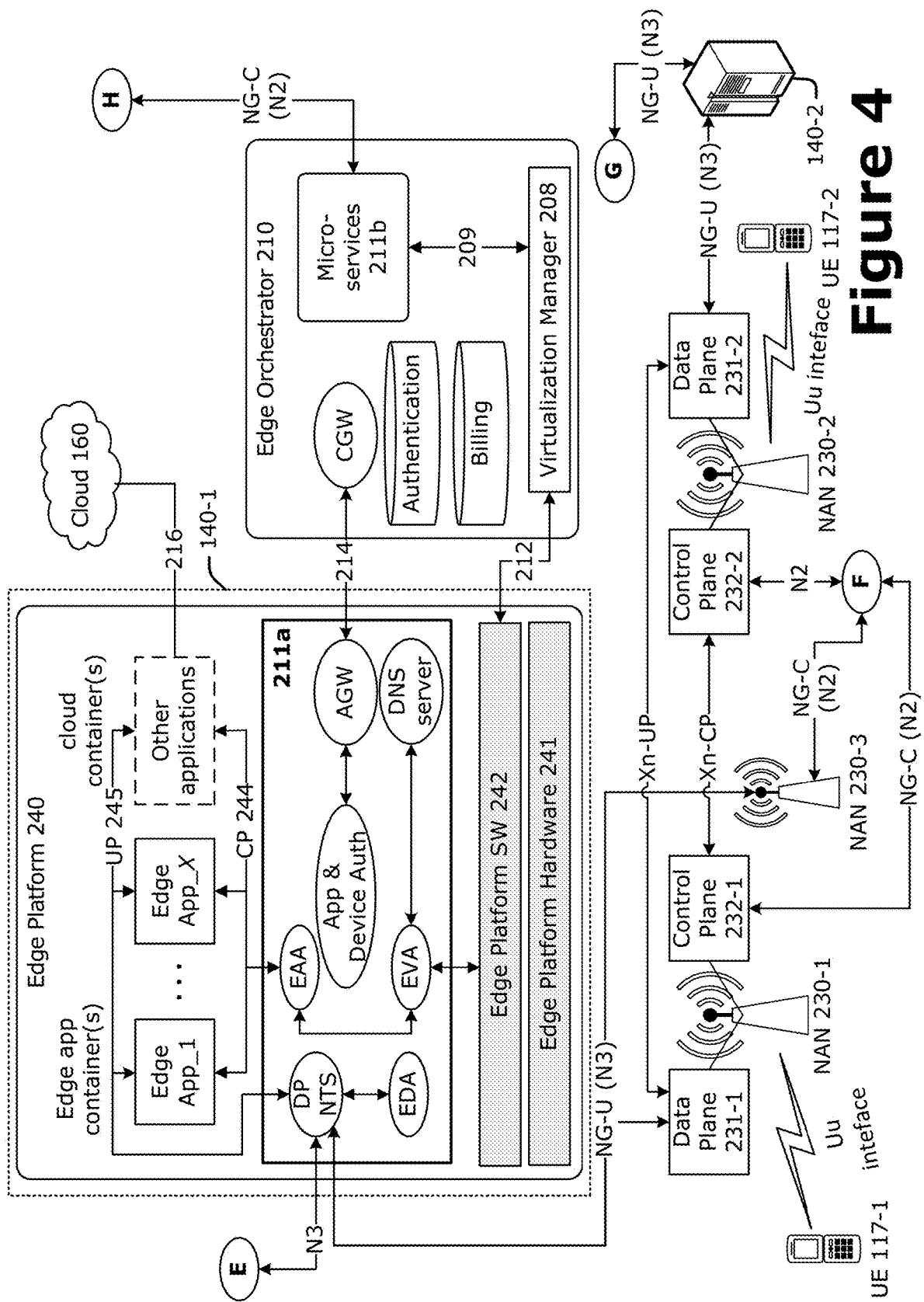

FIG. 4 illustrates an example 5G SA with an edge compute node deployment, which utilizes the local breakout mechanisms discussed herein. In this deployment scenario, the NANs 230 may be Next Generation RAN (NG-RAN) nodes such as gNBs, next generation eNBs (ng-eNBs), and/or other like RAN nodes. The NANs 230 (e.g., gNBs, ng-eNBs, etc.) are interconnected with each other by means of the Xn interface, which includes an Xn-CP interface communicatively coupling the CP entities 232-1, 232-2 of the NANs 230 and an Xn-UP interface communicatively coupling the UP entities 231-1, 231-2 of the NANs 230 (see e.g., 3GPP TS 38.300 v16.2.0 (2020 Jul. 24) ("[TS38300]")). The NANs 230 (e.g., gNBs, ng-eNBs, etc.) are also connected by means of the NG interfaces to a 5G core network (5GC) (e.g., 5GC 540 of FIG. 5), more specifically to an Access and Mobility Management Function (AMF) (e.g., AMF 544 of FIG. 5) by means of the NG-C(N2) interface and to a User Plane Function (UPF) (e.g., UPF 548 of FIG. 5) by means of the NG-U (N3) interface (see e.g., 3GPP TS 23.501 v16.5.1 (2020 Aug. 3) ("[TS23501]")).

The edge compute node deployment in 5G network architecture of FIG. 4 uses a similar strategy for edge local breakout as used for the 4G LTE network deployments discussed previously with respect to FIGS. 2 and 3. In the deployment of FIG. 4, the edge platforms 240 in deployed on the N3 interface between the NANs 230 and the UPF (e.g., UPF 548 of FIG. 5) in the 5GC (e.g., 5GC 540 of FIG. 5). The local breakout will be performed in the edge node 140 (or edge platform 240) in this scenario, and the edge orchestrator 210 is connected to the AMF (e.g., AMF 542 of FIG. 5) in the 5GC via the N2 interface to obtain control plane information.

FIG. 5 shows an example LTE network 500a and an example 5G network 500b. The LTE network 500a includes an EPC 522 and packet data network (PDN) 536a communicatively coupled to the cloud 160. The EPC 522 includes a Mobility Management Entity (MME) 524, an SGW 526 (including UP SGW (SGW-U) 526u and CP SGW (SGW-C) 526c), a Serving GPRS Support Node (SGSN) 528, a Home Subscriber Server (HSS) 530, a PDN Gateway (PGW) 532 (including UP PGW (PGW-U) 532u and CP PGW (PGW-C) 532c), and a Policy Control and Charging Rules Function (PCRF) 534 coupled with one another over interfaces (or "reference points") as shown. The NFs in the EPC 522 are briefly described as follows.

The MME 524 implements mobility management functions to track a current location of UEs 117 to facilitate paging, bearer activation/deactivation, handovers, gateway selection, authentication, etc. The S1-MME interface communicatively couples the MME 524 with the CP entities 232 of the NANs 230, and the S1-MME interface communicatively couples the MME 524 with the edge-services 211b in the edge orchestrator 210 (see e.g., FIGS. 2 and 3).

The SGW 526 terminates an S1 interface toward the Radio Access Network (RAN) and routes data packets between the RAN and the EPC 522. The SGW 526 may be a local mobility anchor point for inter-RAN node handovers and also may provide an anchor for inter-3GPP mobility. Other responsibilities may include lawful intercept, charging, and some policy enforcement. The SGW 526 is communicatively coupled with the MME 524 via an S11 interface/reference point. Furthermore, the S1-U interface communicatively couples the SGW-U 526u with the data plane entities 231 of the NANs 230, and the S1-U interface communicatively couples the SGW-U 526u with the Data Plane Network Transport Service (DP NTS) in the edge platform 240 (see e.g., FIGS. 2 and 3).

The SGSN 528 tracks a location of UEs 117 and performs security functions and access control. The SGSN 528 also performs inter-EPC node signaling for mobility between different RAT networks; PDN and SGW selection as specified by MME 524; MME 524 selection for handovers; etc. The S3 reference point between the MME 524 and the SGSN 528 enable user and bearer information exchange for inter-3GPP access network mobility in idle/active states.

The HSS 530 includes a database for network users, including subscription-related information to support the network entities' handling of communication sessions. The HSS 530 can provide support for routing/roaming, authentication, authorization, naming/addressing resolution, location dependencies, etc. An S6a reference point between the HSS 530 and the MME 524 may enable transfer of subscription and authentication data for authenticating/authorizing user access to the EPC 522.

The PGW 532 terminates an SGi interface toward the PDN 536a that may include application/content server(s), cloud computing service 160, or the like, and/or may be an external public data network (DN), a private DN, enterprise network, or an intra-operator PDN, for example, for provision of IMS services, or the like. The PGW 532 routes data packets between the EPC 522 and the PDN 536a. The PGW 532 is communicatively coupled with the SGW 526 by an S5 reference point to facilitate user plane tunneling and tunnel management. The PGW 532 may further include a node for policy enforcement and charging data collection (e.g., PCEF). Additionally, the SGi reference point is between the PGW 532 and the PDN 536a. The PGW 532 is also communicatively coupled with PCRF 534 via a Gx reference point.

The PCRF 534 is the policy and charging control element of the EPC 522. The PCRF 534 is communicatively coupled to the PDN 536a to determine appropriate QoS and charging parameters for service flows. The PCRF 534 also provisions associated rules into a PCEF (via Gx reference point) with appropriate TFT and QCI.

The 5G network 500b includes the 5GC 540, a data network (DN) 536b communicatively coupled to the cloud 160. The 5GC 540 includes an Authentication Server Function (AUSF) 542, an AMF 544, a Session Management Function (SMF) 546, a UPF 548, a Policy Control Function (PCF) 556, a Unified Data Management function (UDM) 558, and an Application Function (AF) 560 coupled with one another over various interfaces as shown. The NFs in the 5GC 540 are briefly described as follows.

The AUSF 542 stores data for authentication of UEs 117 and handles authentication-related functionality. The AUSF 542 facilitates a common authentication framework for various access types. The AUSF 542 is communicatively coupled to the UDM 558 via an N13 reference point and communicatively coupled to the AMF 544 via an N12 reference point.

The AMF 544 allows other functions of the 5GC 540 to communicate with the UEs 117 and the RAN and to subscribe to notifications about mobility events with respect to the UEs 117. The AMF 544 is also responsible for registration management (e.g., for registering UEs 117), connection management, reachability management, mobility management, lawful interception of AMF-related events, and access authentication and authorization. The AMF 544 provides transport for SM messages between the UEs 117 and the SMF 546, and acts as a transparent proxy for routing SM messages. AMF 544 also provides transport for SMS messages between UEs 117 and an SMSF. AMF 544 interacts with the AMF 544 and the UEs 117 to perform various security anchor and context management functions. Furthermore, AMF 544 is a termination point of a RAN-CP interface, which includes the N2 reference point between the RAN and the AMF 544. The AMF 544 is also a termination point of NAS (N1) signaling, and performs NAS ciphering and integrity protection. The AMF 544 is communicatively coupled to the PCF 556 via an N15 reference point, and the NG-C interface (or the N2 reference point) communicatively couples the MME 524 with the CP entities 232 of the NANs 230, and the S1-MME interface communicatively couples the AMF 544 with the edge-services 211b in the edge orchestrator 210 (see e.g., FIG. 4).

The SMF 546 is responsible for session management (SM) (e.g., session establishment, tunnel management between UPF 548 and RAN node 130); UE IP address allocation and management (including optional authorization); selection and control of UP function; configuring traffic steering at UPF 548 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 544 over N2 to RAN node 130; and determining SSC mode of a session. SM refers to management of a PDU session, and a PDU session or "session" refers to a PDU connectivity service that provides or enables the exchange of PDUs between the UEs 117 and the DN 536b. The SMF 546 is communicatively coupled to the AMF 544 via an N11 reference point, communicatively coupled to the UDM 558 via an N10 reference point, communicatively coupled to the UPF 548 via an N4 reference point, and communicatively coupled to the PCF 556 via an N7 reference point.

The UPF 548 acts as an anchor point for intra-RAT and inter-RAT mobility, an external PDU session point of interconnect to the DN 536b, and a branching point to support multi-homed PDU session. The UPF 548 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 548 may include an uplink classifier to support routing traffic flows to a data network. The UPF 548 is communicatively coupled to the DN 536b via an N6 reference point. Furthermore, the NG-U interface (or the N3 reference point) communicatively couples the UPF 548 with the data plane entities 231 of the NANs 230, and the NG-U interface (or the N3 reference point) communicatively couples the UPF 548 with the Data Plane Network Transport Service (DP NTS) in the edge platform 240 (see e.g., FIG. 4).

The PCF 556 provides policy rules to control plane functions to enforce them, and may also support unified policy framework to govern network behavior. The PCF 556 may also implement a front end to access subscription information relevant for policy decisions in a UDR of the UDM 558. In addition to communicating with functions over reference points as shown, the PCF 556 exhibit an Npcf service-based interface.

The UDM 558 handles subscription-related information to support the network entities' handling of communication sessions, and stores subscription data of UEs 117. For example, subscription data may be communicated via an N8 reference point between the UDM 558 and the AMF 544. The UDM 558 may include two parts, an application front end and a UDR. The UDR may store subscription data and policy data for the UDM 558 and the PCF 556, and/or structured data for exposure and application data (including PFDs for application detection, application request information for multiple UEs 117) for a Network Exposure Function (NEF). The Nudr service-based interface may be exhibited by the UDR 221 to allow the UDM 558, PCF 556, and NEF to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 558 may exhibit the Nudm service-based interface.

AF 560 provides application influence on traffic routing, provide access to an NEF, and interact with the policy framework for policy control. The AF 560 may influence UPF 548 (re)selection and traffic routing. Based on operator deployment, when AF 560 is considered to be a trusted entity, the network operator may permit AF 560 to interact directly with relevant NFs. Additionally, the AF 560 may be used for edge computing implementations. The AF 560 is communicatively coupled to the PCF 556 via an N5 reference point.

The 5GC 540 may enable edge computing by selecting operator/3rd party services to be geographically close to a point that the UEs 117 is attached to the network. This may reduce latency and load on the network. In edge computing implementations, the 5GC 540 may select a UPF 548 close to the UE 117 and execute traffic steering from the UPF 548 to DN 536*b* via the N6 interface. This may be based on the UE subscription data, UE location, and information provided by the AF 560, which allows the AF 560 to influence UPF (re)selection and traffic routing.

The DN 536*b* may represent various network operator services, Internet access, or third party services that may be provided by one or more servers including, for example, application/content server. DN 536*b* may include, or be similar to, application server(s) 1060 discussed infra. In some implementations, the DN 536*b* may be, or include, one or more edge compute nodes 140. The 5GS can use one or more edge compute nodes 140 to provide an interface and offload processing of wireless communication traffic. For example, the edge compute nodes 140 can provide a connection between the RAN and UPF 548 in the 5GC 540. The edge compute nodes 140 can use one or more NFV instances instantiated on virtualization infrastructure within the edge compute nodes 140 to process wireless connections to and from the RAN and UPF 548.

The interfaces of the 5GC 540 include reference points and service-based interfaces. The reference points include: N1 (between a UE 117 and AMF 544), N2 (between a RAN and AMF 544), N3 (between a RAN and UPF 548), N4 (between the SMF 546 and UPF 548), N5 (between PCF 556 and AF 560), N6 (between UPF 548 and DN 536*b*), N7 (between SMF 546 and PCF 556), N8 (between UDM 558 and AMF 544), N9 (between two UPFs 548), N10 (between the UDM 558 and the SMF 546), N11 (between the AMF 544 and the SMF 546), N12 (between AUSF 542 and AMF 544), N13 (between AUSF 542 and UDM 558), N14 (between two AMFs 544), N15 (between PCF 556 and AMF 544 in case of a non-roaming scenario, or between the PCF 556 in a visited network and AMF 544 in case of a roaming scenario), N16 (between two SMFs 546; not shown), and N22 (between AMF 544 and NSSF). Other reference point representations not shown in FIG. 5 or described previously can also be used.

Referring back to FIGS. 2, 3, and 4, the edge platform 240 may be a MEC platform (e.g., MEC platform 1732 of FIG. 17), OpenNESS Edge Platform or OpenNESS Edge Node (see e.g., FIGS. 19-23), and/or some other like edge computing framework, such as those discussed herein. The Edge Platform Hardware (HW) 241 includes various HW elements such as, for example, CPU(s), GPU(s), FPGA(s), acceleration circuitry (see e.g., acceleration circuitry 2664). The Edge Platform Software (SW) 242 includes, for example, a host operating system (OS), virtual machines (VMs), container(s), edge apps, and/or the like. The Edge Platform SW 242 is communicatively coupled with the Virtualization Manager 208 in the Edge Orchestrator 210 via an interface 212, which may be used for resource provisioning, EPA configurations, and/or the like.

The edge orchestrator 210 performs orchestration for the edge platform 240 and/or other elements of the edge node 140. Edge orchestration combines edge-cloud infrastructure, edge-cloud Communications Service Provider (CoSP) services, and edge apps and edge services into a holistic, seamless offering for users and/or other services. For example, the edge orchestrator 210 maintains an overall view of the edge system/network based on deployed edge platforms 240 and/or edge nodes 140, available resources, available edge services, and edge platform 240 and/or edge node 140 topology; manages workload resources among one or more edge platforms 240 and/or edge nodes 140, including location-sensitive workload resource management, load and/or overload distribution among the edge platforms 240 and/or edge nodes 140, provisioning edge services and/or microservices to edge platforms 240 and/or the edge orchestrator 210, on-boarding of application packages, including checking the integrity and authenticity of the packages, validating application rules and requirements and if necessary adjusting them to comply with operator policies, keeping a record of on-boarded packages, and preparing the virtualization manager(s) 208 to handle the edge apps and services; selecting appropriate edge platforms 240 and/or edge nodes 140 for edge app instantiation based on constraints, such as latency, available resources, and available services; triggering edge app and/or edge service instantiation and termination; triggering edge app and/or edge service relocation as needed when supported; selecting appropriate edge platforms 240 and/or edge nodes 140 for edge platform 240 and/or edge node 140 handovers and/or edge app and/or edge service session transfers; and/or other like management and control functions. In some implementations, the edge orchestrator 210 includes resiliency mechanisms, for example, the edge orchestrator 210 can select an edge platform 240 and/or edge node 140 to resume or take over a edge-service 211*a*, 211*b* (or micro-service) instance from an overloaded or failed edge platform 240 and/or edge node 140.

The edge-services 211*a*, 211*b* are services provided by an edge platform 240 and/or an edge node 140. The edge-services 211*a*, 211*b* enable access to one or more capabilities that may be provided by one or more edge apps, where the access is provided using a prescribed interface and is exercised consistent with constraints and policies as specified by a service description.

Each edge-service 211a, 211b may be made up of one or more microservices, which are smaller aspects of the edge-services provided by the edge platform 240 and/or edge node 140. A microservice may be the smallest granularity of an edge-service 211a, 211b, and a combination of the microservices may provide an edge-service 211a, 211b (hereinafter, one or more microservices for edge-services 211a, 211b may be referred to as "microservices 211a, 211b" or the like). Each microservice 211a, 211b could be composed of several services and/or processes such as, for example, multiple web API services or any other kind of services using HTTP and/or any other protocol. Furthermore, the microservices 211a, 211b making up an edge-service 211a, 211b, or microservices 211a, 211b among multiple edge-services 211a, 211b can share the same data. Moreover, the microservices 211a, 211b may process obtained data and provide the processed data to other microservices 211a, 211b in the same or different edge-service 211a, 211b. This data can come to either directly to the microservices 211a, 211b from users or other entities, or from other microservices 211a, 211b. For example, an edge-service 211a may be a parking service that includes a location microservice and a user interface (UI) microservice, where the location microservice provides location data to the UI microservice, which interacts with a user.

Data related to a microservice 211a, 211b and/or edge-service 211a, 211b include any type of data that may be used or consumed by the microservice 211a, 211b and/or edge-service 211a, 211b including, for example, data plane content/data, control plane content/data, content/data for management/orchestration, initialization, termination, grouping, error checking, and/or the like. Data related to a microservice 211a, 211b and/or edge-service 211a, 211b can originate from or otherwise be provided by multiple sources or entities such as, for example, data plane content from sensors, data fusion networks/applications, UEs 117, cloud services 160, other edge platforms 240, app/web servers, etc., and/or control plane content that comes from the edge orchestrator platform 210. Additionally, data related to one microservice 211a, 211b and/or edge-service 211a, 211b can be related to other microservices 211a, 211b and/or other edge-services 211a, 211b.

In this example, the microservices 211a in the edge platform 240 include a data plane (DP) Network Transport Service (NTS), Edge Dataplane Agent (EDA), Edge Application Agent (EAA), DNS Server, App & Device Authorization, a Domain Name Service (DNS) server, and an Application Gateway (AGW). Additionally or alternatively, the microservices 211a may include an edge lifecycle agent (ELA), a syslog, enhanced platform awareness (EPA), edge interface services (EIS), Application Function (AF), Network Exposure Functions (NEF), Core Network Configuration Agent (CNCA), and/or an edge virtualization agent (EVA). Additionally or alternatively, the microservices 211a may include an Open Virtual Network (OVN)/Open Virtual Switch (OVS)-Data Plane Development Kit (DPDK) dataplane instead of, or in addition to the DP NTS. The OVN/OVS-DPDK is a high-performance Data Plane microservice(s) supporting a Container Network Interface (CNI) that can be managed by a standard software-defined network (SDN) controller.

The AGW is configured to communicate with a controller gateway (CGW) in the edge orchestrator 210 via an interface 214, which communicatively couples the edge platform 240 with the edge orchestrator 210. The interface 214 between the AGW and the CGW may be based on the underlying edge computing implementation. For example, where a MEC implementation is used, the interface between the AGW and the CGW may be the Mm3 interface, the Mm5 interface, or both the Mm3 and Mm5 interfaces (see e.g., FIG. 17). Additionally or alternatively, the interface 214 may comprise an Edge Lifecycle API and/or an Edge Virtualization API.

The EAA is configured to communicate with various edge apps 1 to X (where X is a number) and various other apps via a CP interface 244. In some implementations, the CP interface 244 may be the same as the CP interface 244 used to communicatively couple the NANs 230 with the core network 150 (e.g., the S1-MME and/or N3 interfaces), or may be a different CP interface 244 (e.g., an Edge App API, EDGE Auth. API, MEC Mp1 interface, a proprietary interface/API, and/or the like). Additionally, the DP NTS is configured to communicate with the various edge apps 1 to X and the various other apps via a UP interface 245. In some implementations, the UP interface 245 may be the same as the UP interface 242 used to communicatively couple the NANs 230 with the core network 150 (e.g., the S1-U and/or N2 interfaces), or may be a different UP interface 245 (e.g., an Edge App API, EDGE Auth. API, MEC Mp1 interface, a proprietary interface/API, and/or the like). The edge apps operate within edge app containers, and may include, for example, V2X safety messages, V2X apps, and/or other like apps/services such as those discussed herein. The other apps may operate within cloud containers and/or other like virtualization services. The other apps may be cloud apps that are communicatively coupled with the cloud 160 via a cloud interface 216, which may be, for example, a cloud connector API or the like.

Edge orchestrator 210 may be a MEC orchestrator (e.g., Multi-Access Edge Orchestrator 1710 of FIG. 17), OpenNESS Edge Platform or Edge Node (see e.g., FIGS. 19-23), or the like. The Virtualization Manager 208 may be a virtualization infrastructure manager (e.g., VIM 1708 of FIG. 17 of FIG. 17), OpenNESS orchestrator, or the like. Micro-services 211b include, for example, GUI, EVA controller, Network configuration agent, Authentication and Policy and database, and/or other microservices such as those discussed previously and/or those discussed elsewhere herein. Some additional or alternative microservices 211a, 211b include AF (e.g., Control Plane entity that supports traffic influencing subscription, traffic steering, packet flow description management functionality, and policy authorization to help steer the Edge-specific traffic in UPF 548 towards the applications deployed on the edge node 140); NEF (e.g., a microservice used for validation of AF functionality in before integrating with the 5GC 540); CNCA (e.g., a microservice that provides an interface for orchestrators that interact with the CP to interact with the 5GC 540 network solution); EIS (e.g., a microservice/app that allows attachment of additional network interfaces of a node host to provide an OVS bridge, enabling external traffic scenarios for applications deployed in a VM/container/pod); Node Feature Discovery (NFD) (e.g., microservices that detects hardware and software features and labels the nodes with relevant features); accelerator microservices (e.g., High-Density Deep Learning (HDDL), Visual Compute Acceleration—Analytics (VCAC-A), FPGA, structured ASIC or eASIC, network interface controllers (NICs), Intel® Quick-Assist Technology (Intel® QAT), Single Root I/O Virtualization (SR/IOV), Visual Compute Acceleration (VCA), and/or the like); Video Transcode Service (e.g., an application and/or microservice that exposes a REST API for transcoding on the edge platform HW 241); Telemetry Aware Scheduler (TAS) (e.g., mmicroservice(s) making available HW and SW telemetry data for scheduling and de-scheduling decisions); DNS services; Service Mesh microservices (e.g., a common message bus for applications and services on the platform to publish and subscribe); multi-cloud microservices (e.g., enables deployment of Public Cloud IoT gateways on Edge platforms); Software Guare Extensions (SGX) microservices; Role-Based Access Control (RBAC) microservices; Public Key Infrastructure (PM) microservices; Intel® Security Libraries (ISEC-L) microservices; and/or other like microservices. Additionally or alternatively, any of the microservices executed/operated by a first edge node 140 (or first edge platform 240) may process the data related to the microservice and/or generate data related to the microservice, and forwards that data to a second edge node 140 (or second edge platform 240) for it to be used there as well. As in a cluster of micro services.

Furthermore, although the deployments shown by FIGS. 2, 3, and 4, show only the edge platform 240 being included in the edge node 140, in other implementations, both the edge platform 240 and the edge orchestrator 210 may be included in the edge node 140.

1.2. User-Plane Protocol Stacks for Edge LBO

Figure 6:
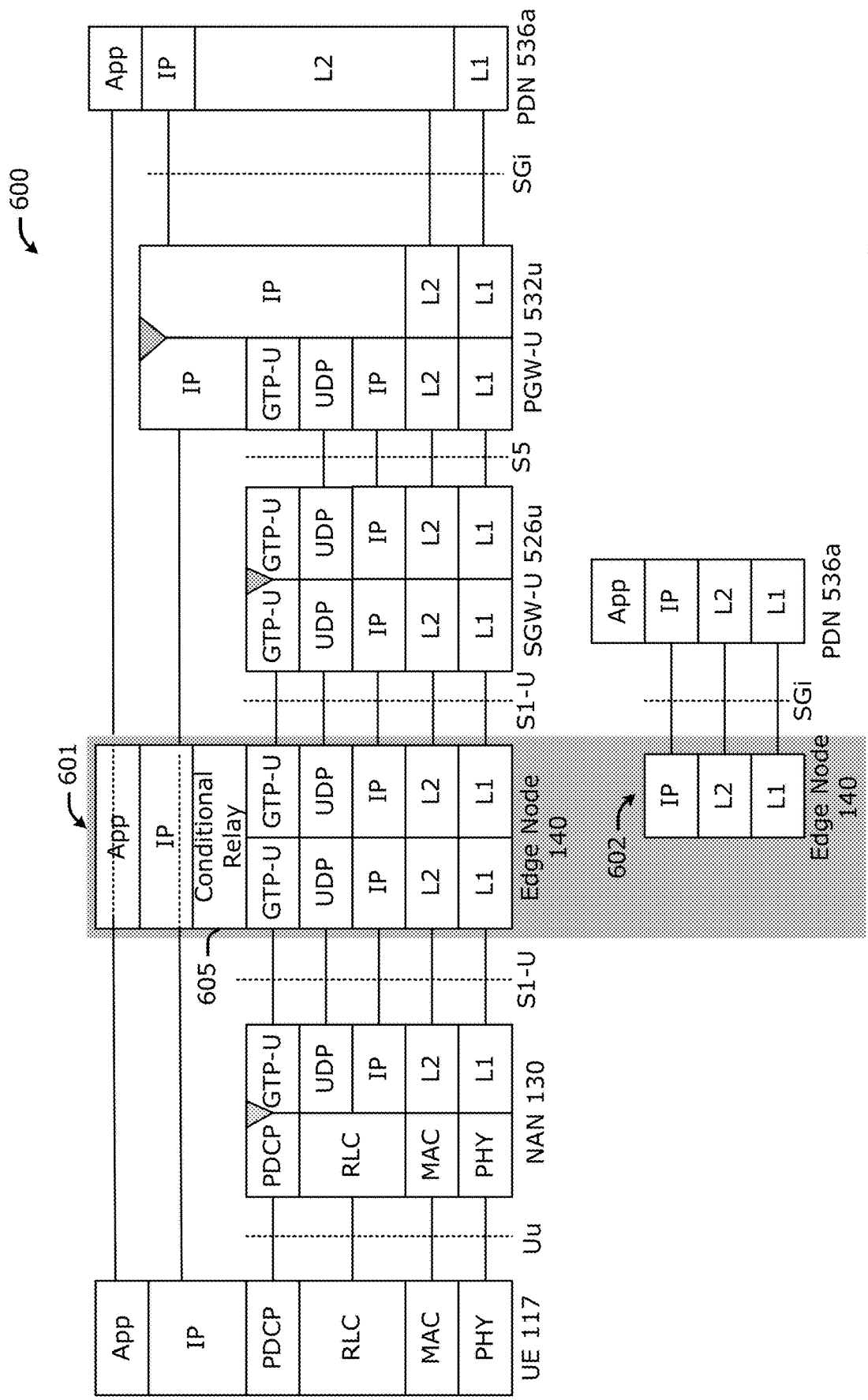
FIGS. 6 and 7 depict user-plane protocol stacks for different entities in the cellular system.
Figure 7:
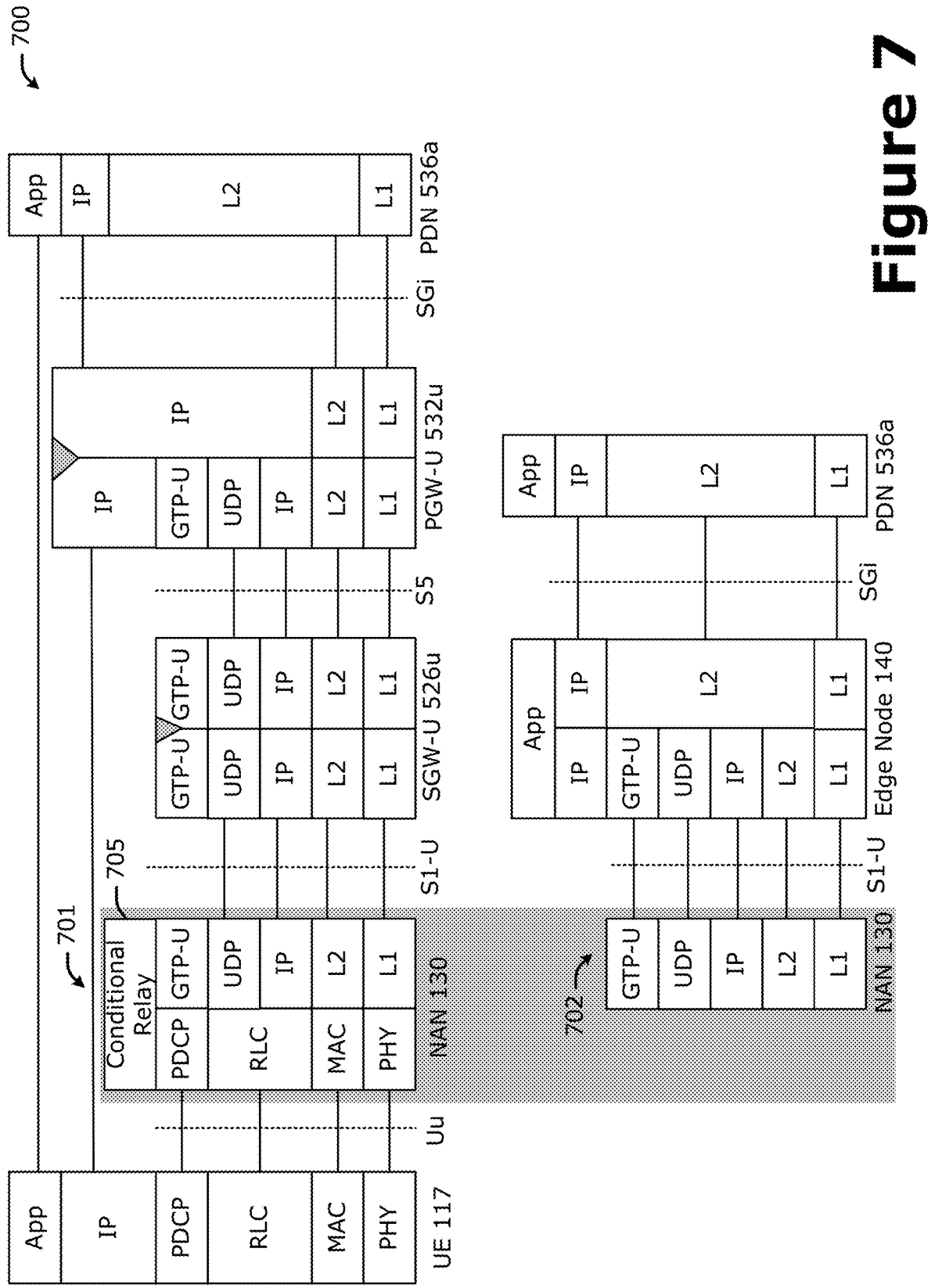

FIGS. 6 and 7 show 4G LTE UP protocol stacks 600 and 700 of the entities of FIGS. 1-3 for edge LBO. In particular, FIG. 6 illustrates a UP protocol stack 600 based on the deployment of FIG. 2 and FIG. 7 illustrates a UP protocol stack 700 based on the deployment of FIG. 3.

In examples of FIGS. 6 and 7, the UE 117 and the NAN 130 include respective PDCP, RLC, MAC, and PHY layers, which are discussed in [TS36300]. The NAN 130, the edge node 140, the SGW-U 526*u*, and the PGW-U 532*u* include respective General Packet Radio System (GPRS) Tunnelling Protocol User Plane (GTP-U) layers, which is discussed in 3GPP TS 29.281 v16.0.0 (2019 Dec. 20). The UE 117, the NAN 130, the SGW-U 526*u*, the PGW-U 532*u*, and the PDN 536*a* include respective internet protocol (IP) layers. The NAN 130, the SGW-U 526*u*, and the PGW-U 532*u* include respective User Datagram Protocol (UDP) layers; and the NAN 130, the SGW-U 526*u*, the PGW-U 532*u*, and the PDN 536*a* include respective layer 1 (L1) layers and respective layer 2 (L2) layers. Furthermore, the UE 117 and the PDN 536*a* include respective application layers (App).

In the UP protocol stack shown by FIG. 6, the edge node 140 acts as a bridge between the NAN 130, SGW-U 526*u*, edge servers/edge nodes 140, and the PDN 536*a*. Additionally, a conditional relay layer 605 is added to the edge node 140 protocol stack 601 between the GTP-U layer and the IP layer. The conditional relay layer 605 implements the local breakout policy by routing packets appropriately. The edge-service related data packets arriving at the edge node 140 are processed in the application layer ("App" in FIG. 6), which hosts edge apps using one or more edge servers. Additionally, the edge node 140 can access the PDN 536*a* (e.g., a WAN, Internet, third-party services, enterprise network, etc.) through an IP router protocol stack 602 over the SGi interface. The IP router protocol stack 602 includes the IP, L2, and L1 layers as shown by FIG. 6.

In the UP protocol stack shown by FIG. 7, the NAN 130 supports two S1-U interface protocol stacks 701 and 702, where a first protocol stack 701 is used to communicate with the SGW-U 526*u*, while a second protocol stack 702 is used to communicate with the edge node 140. Additionally, a conditional relay layer 705 is added to the NAN 130 protocol stacks (e.g., protocol stack 701). The conditional relay layer 705 performs the local breakout of edge-service related packets from UEs 117 to the edge node 140 over an S1-U interface, and relays the non-edge-service packets to the SGW-U 526*u* over the same or different S1-U interface. The conditional relay layer 705 may be the same or similar as the conditional relay layer 605 of FIG. 6. In some implementations, the conditional relay layer 705 may be specifically tailored for operation on the NAN 130 and the conditional relay layer 605 may be specifically tailored for operation on edge node 140. The edge-service related data packets arriving from the NAN 130 to the edge node 140 are processed in the App layer, which hosts the edge applications using one or more edge servers. The edge node 140 can access the PDN 536*a* (e.g., a WAN, Internet, third-party services, enterprise network, etc.) through the IP router protocol stack (e.g., IP, L2, and L1 layers) and the SGi interface.

In the embodiments of FIGS. 6 and 7, data packets arriving from NAN 130 to the edge nodes 140 are handled by the conditional relay layer 605, 705 as follows:

(1) packets identified or determined to be non-edge-service packets are forwarded to the SGW-U 526*u* via the S1-U interface;

(2) packets identified or determined to be edge-service related packets are passed to the App layer that hosts edge apps using edge server(s) of the edge node 140;

(3) edge-service and/or non-edge-service packets that need to be sent over a DN (e.g., the internet, wide area network (WAN), enterprise network, PDN 536*a*, etc.) can use an IP router protocol stack (e.g., IP, L2, and L1 layers) to forward the packets via SGi interface;

(4) the edge-service and/or non-edge-service packets arriving from the EPC 522, edge node 140, or PDN 536*a* to the edge node 140 are forwarded to the NAN 130 appropriately.

In some implementations, bearer IDs are used to route packets to the appropriate entity such as to the edge node 140 or the core network 150 and/or cloud 160. As discussed in more detail infra, an EPS bearer ID may be used to route packets to the core network 150 and/or cloud 160 and an edge bearer ID may be used to route packets including data related to one or more edge-services to the edge node 140. These implementations may be used where the core network 150 is an EPC. For implementations where the core network 150 is the 5GC, the routing may be performed using QoS Flow IDs (QFIs) and/or other flow IDs.

1.3. Messaging Procedures for Edge LBO

Figure 8:
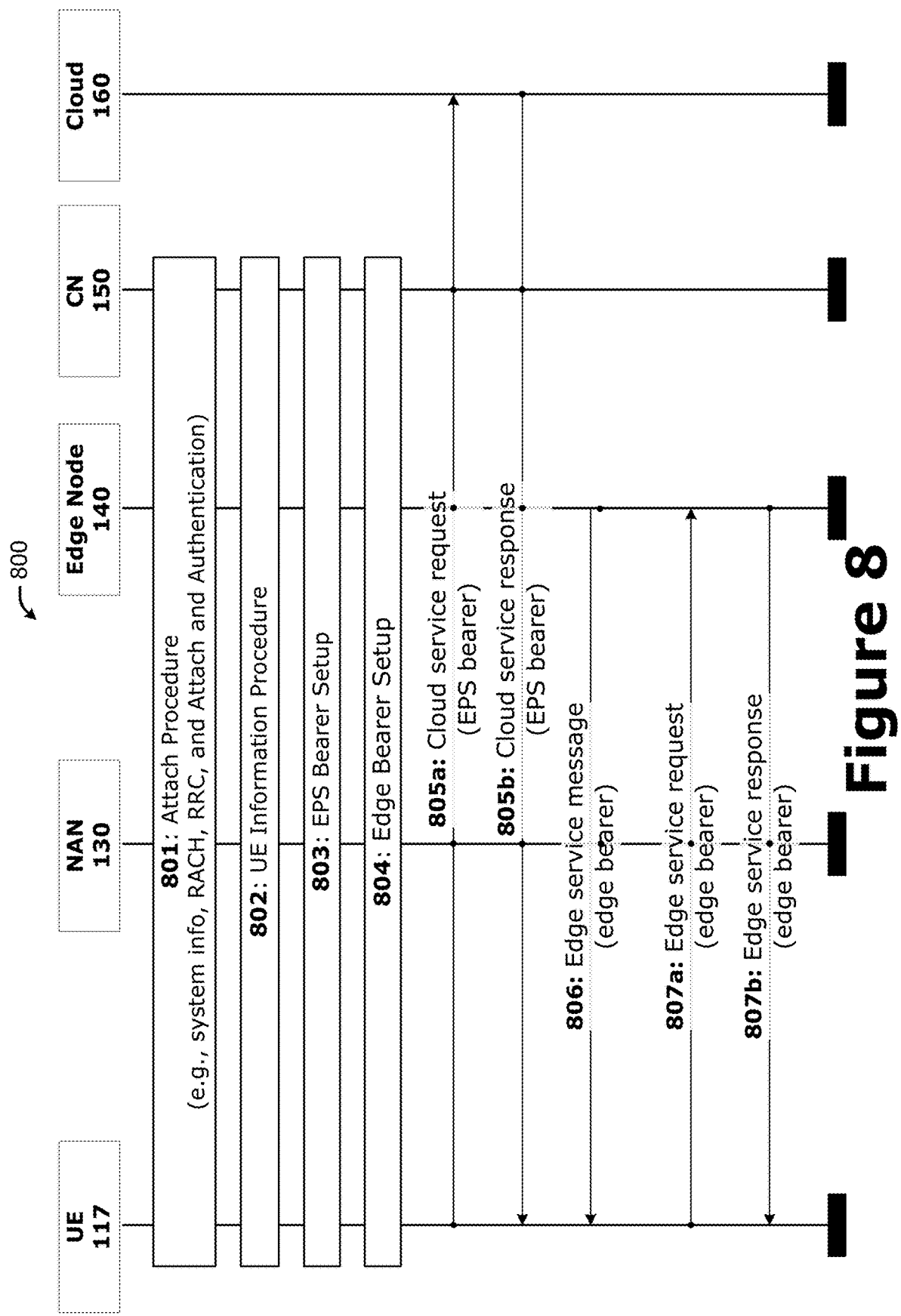
FIG. 8 illustrates an example edge LBO bearer setup procedure for the edge computing deployments of FIGS. 2 and 3.

FIG. 8 illustrates an edge LBO messaging procedure 800 performed by different elements/components of the systems discussed previously with respect to FIGS. 1-3, and FIG. 9 illustrates example Evolved Packet System (EPS) and edge node bearers setup for the deployments of FIGS. 2-3.

Referring to FIG. 8, the initial attach procedure for the UE 117 follows LTE procedures at operation 801. For example, periodic system information is broadcast from the NAN 130, a Random Access Channel (RACH) procedure is performed, and Radio Resource Control (RRC) connection setup/establishment procedure is performed, authentication/security procedures are performed (see e.g., [TS36300] and 3GPP TS 36.331 v16.1.1 (2020 Jul. 26) ("[TS36331]")). The NAN 130 indicates the availability of edge-based microservices (including safety microservices, commercial microservices, etc.) in the periodic system information broadcast.

The RACH procedure may include, for example, the UE 117 sending a Random Access preamble sent to the NAN 130, and the NAN 130 sending a Random Access Response (RAR) to the UE 117 where the RAR assigns a Cell Radio Network Temporary Identifier (C-RNTI). The RRC connection setup/establishment procedure may include, for example, the UE 117 sending an RRC Connection Request message to the NAN 130 wherein the UE 117 is identified by the C-RNTI that was assigned in the RAR message and contains a UE identity and an establishment cause for the RRC connection; and the NAN 130 sending an RRC Connection Setup message to the UE 117, which creates a signaling radio bearer (SRB) in Acknowledged mode and the message contains configuration parameters. The authentication and attach procedure may include, for example, the UE 117 sending a RRC setup complete message to the NAN 130, which is used to initiate the Attach procedure by sending an Attach Request as a Non-Access Stratum (NAS) payload that is then sent to the MME 524 within the core network 150.

At operation 802, the NAN 130 and the UE 117 perform a UE information procedure (see e.g., [TS36331]). The UE information procedure is used by E-UTRAN to request the UE 117 to report information. The NAN 130 initiates the UE information procedure by sending a UEInformationRequest message to the UE 117, and in response, the UE 117 sends a UEInformationResponse message to the NAN 130. During the UE capability information stage, the UE 117 indicates to the NAN 130 (e.g., in the UEInformationResponse message) whether it is compatible with, or supports the edge-based services. For example, the UE capability information may be updated/enhanced to include an edge-based services capability indication (indicating support for edge-based microservices) and/or include indicators for specific edge-based mircoservices). The NAN 130 forwards this information to the core network 150.

At operation 803, an Evolved Packet System (EPS) bearer setup procedure is performed. For example, the MME 524 may send a create session request to the SGW 526 including an access point name (APN) and quality of service (QoS) parameters/settings for the EPS bearer 901 of FIG. 9, and also includes an IP address of the PGW 532. The APN may be specified by the UE 117, and an IP address assigned to the UE 117 may also be included in the create session request. The SGW 526 sends the create session request to the PGW 532 including the APN, QoS parameters/settings, IP address of the SGW 526, and a selected Tunnel End Point ID (TEID) for the requested bearer. The PGW 532 selects the QoS for the EPS bearer 901 and sends it in a create session response message along with the TEID for the S5 bearer and the allocated IP address for the UE 117 thereby establishing the S5 bearer. The create session response also includes the APN, QoS parameters/settings, and the UE's 117 allocated IP address. The PGW 532 sends the create session response to the SGW 526, and the SGW 526 forwards the create session response to the MME 524. The MME 524 sends the UE's 117 IP address in an Attach Accept message to the UE 117 via the NAN 130 and an Initial Context setup request to the NAN 130 including the IP address and TEID of the SGW 526 for the NAN 130. The NAN 130 forwards the Attach Accept as part of an RRC message to the UE 117, and will also include a radio bearer ID (RB ID) to the UE 117.

At operation 804, an edge bearer setup procedure is performed. If the UE 117 is compatible with (or supports) edge-based services, then an edge bearer 902a or 902b (see e.g., FIG. 9) is setup separately from the EPS bearer 901a, 901b (see e.g., FIG. 9) to provide the supported edge-based services. The edge platform 240 sets up the required bearers 902a, 902b via the control commands from the edge orchestrator 210. The particular edge node deployment implementation may affect how the EPS bearers and edge bearers are set up, as is shown and described with respect to FIG. 9.

Figure 9:
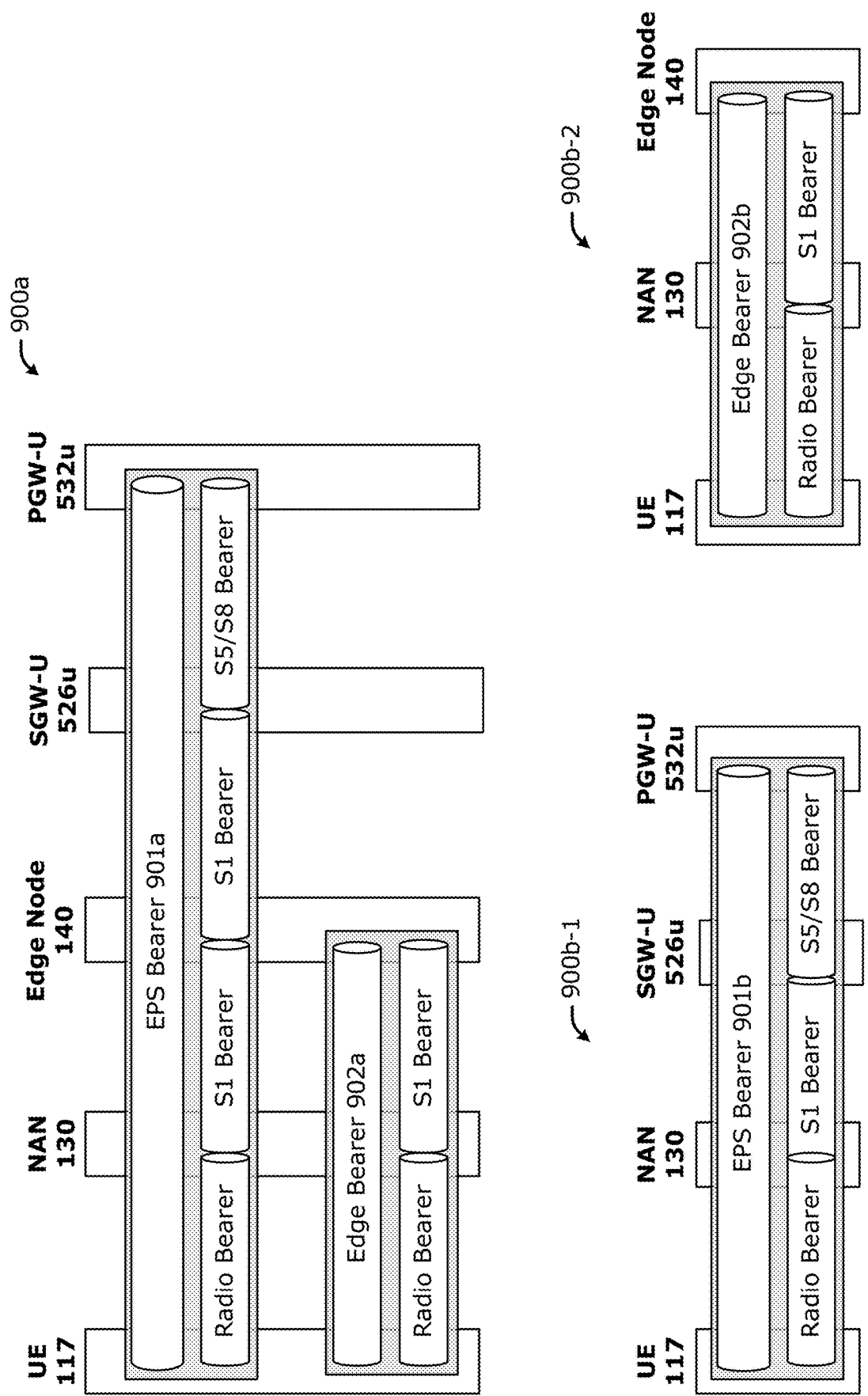
FIG. 9 illustrates Evolved Packet System (EPS) bearer and edge bearer arrangements for the edge computing deployments of FIGS. 2 and 3.

FIG. 9 shows two different bearer arrangements 900a and 900b (including both arrangements 900b-1 and 900b-2). The bearer arrangement 900a corresponds to the edge node deployment of FIG. 2. Here, the EPS bearer 901a spans through the edge node 140, and the edge bearer 902a spans through the UE 117, NAN 130, and the edge node 140. The edge bearer 902a can be configured to provide the required or specified QoS for the edge-based services. The bearer arrangement 900b corresponds to the edge node deployment of FIG. 3. Here, the EPS bearer 901b does not span through the edge node 140, and instead spans through the UE 117, NAN 130 into the CN 150 (e.g., including SGW-U 526u and PGW-U 532u). Furthermore, the edge bearer 902a spans through the UE 117, the NAN 130, and the edge node 140.

An IP connection (or other network connection) between the UE 117 and a PDN 536a is called PDN connection or EPS session. Each PDN connection (or EPS session) is represented by an IP address (or other network address) of the UE 117 and a PDN ID (also referred to as an Access Point Name (APN)). A EPS session may include one or more EPS bearers 901a, 901b to deliver user traffic (e.g., IP packets or other network data packets), and a quality of service (QoS) policy obtained from a PCRF 534 is applied to the EPS bearers 901a, 901b. The minimum bearer that an EPS session has for a PDN 536a is called a default EPS bearer. Having an established EPS session means that a PDN 536a through which a user is to use services has been selected (e.g., by the user's input or based on the subscription information provisioned by an HSS 530), an IP address (or other network address) to be used in the PDN 536a has been assigned to the user, policy rules to be applied to the user IP packets (or other data packets), QoS, and/or charging rules have been selected, and a default EPS bearer 901a, 901b for delivering IP packets (or other data packets) over the LTE network has been established. Through this EPS session established, IP packets (or other data packets) can be exchanged between the UE 117 and the PDN 536a according to the rules set by the network operator.

An EPS session is in charge of delivering and handling flows of the IP packets (or other data packets) that are labeled with the UE's 117 IP address (or other network address) and travel between the UE 117 and the PDN 536a (e.g., UE 117 to/from PGW 532 to/from PDN 536a). The EPS bearer 901a, 901b is a pipe through which IP packets (or other data packets) are delivered over the between the UE 117 and the PGW 532 (e.g., UE 117 to/from eNB 130 to/from SGW 526 to/from PGW 532). The UE 117 can have multiple EPS bearers 901a, 901b concurrently where different EPS bearers 901a, 901b are identified by their respective EPS bearer IDs, which are allocated by the MME 524.

As shown by FIG. 9, an EPS bearer 901a, 901b is a concatenation a radio bearer (or data radio bearer (DRB)), an S1 bearer and S5/S8 bearer. The DRB between the UE 117 and the eNB 130 is a bearer established over the LTE-Uu interface. User traffic (e.g., data packets) is delivered through the DRB and different DRBs are identified by respective DRB IDs, which are allocated by the eNB 130. The S1 bearer between the eNB 130 and the SGW 526 is a bearer established over S1-U interface, where user traffic is delivered through a GTP tunnel. Different S1 bearers are identified by respective TEIDs, which are allocated by the endpoints of the GTP tunnel (e.g., the eNB 130 and the SGW 526). The S5/S8 bearer between the SGW 526 and the PGW 532 is a bearer established over S5 or S8 interface, where user traffic is delivered through a GTP tunnel. Different S5/S8 bearers are identified by respective TEIDs, which are allocated by the endpoints of the GTP tunnel (e.g., the SGW 526 and the PGW 532).

In embodiments, the edge bearer 902a, 902b includes a radio bearer (DRB) and an S1 bearer, wherein may be the same or similar as the DRB and S1 bearers discussed previously. In these implementations, as long as the EPS session is maintained, the EPS bearer 901a, 901b will be maintained, and the routing of packets through the EPS bearer 901a, 901b will continue. Likewise, as long as the edge session is maintained with the edge node 140, the routing of packets including edge-service related data through the edge bearer 902a, 902b will continue. As the UE 117 moves to different service areas, the EPS bearer 901a, 901b may be set up and torn down according to known mechanisms. When the UE 117 moves to different edge service areas of a new edge node 140, a new edge bearer 902a, 902b will be established according to a suitable orchestration technique performed by the edge orchestrator 210.

For 5GC 540 implementations, the 5GC 540 establishes one or more PDU Sessions for the UE 117. The NG-RAN establishes at least one DRB together with the PDU Session, and can subsequently configure additional DRB(s) for one or more QoS flow(s) of that PDU session, and the NG-RAN maps packets belonging to different PDU sessions to different DRBs. Also, Access Stratum (AS)-level mapping rules in the UE 117 and in the NG-RAN associate uplink (UL) and downlink (DL) QoS Flows with the DRB(s), and Non-AS (NAS) level packet filters in the UE 117 and in the 5GC 540 associate UL and DL packets with the QoS Flows. The NG-RAN and 5GC 540 ensure QoS (e.g., reliability, target delay, etc.) by mapping packets to appropriate QoS Flows and DRBs, which means that there is a 2-step mapping of IP-flows to QoS flows (NAS) and from QoS flows to DRBs (Access Stratum).

A QoS flow is the finest granularity of QoS differentiation in a PDU session. A QoS flow is identified within a PDU session by a QoS Flow ID (QFI) carried in an encapsulation header over the NG-U interface. At the NAS level, a QoS flow is characterised by a QoS profile provided by 5GC to NG-RAN and QoS rule(s) provided by 5GC 540 to the UE 117. The QoS profile is used by NG-RAN to determine the treatment on the radio interface while the QoS rules dictates the mapping between uplink UP traffic and QoS flows to the UE 117. A QoS flow may either be GBR or Non-GBR depending on its profile. The QoS profile of a QoS flow contains QoS parameters, for instance. Each QoS flow is associated with a QoS flow profile, which includes a 5G QoS Identifier (5QI) and an Allocation and Retention Priority (ARP) and other QoS parameters as discussed in [TS38300]. At the AS level, the DRB defines the packet treatment on the radio (Uu) interface. A DRB serves packets with the same packet forwarding treatment. The QoS flow to DRB mapping by the NG-RAN is based on QFI and the associated QoS profiles (i.e. QoS parameters and QoS characteristics). Separate DRBs may be established for QoS flows requiring different packet forwarding treatment, or several QoS Flows belonging to the same PDU session can be multiplexed in the same DRB. Other aspects of QoS flows and QoS parameters are discussed in [TS38300]. According to various embodiments, the QFIs, 5Qis, and/or other QoS parameters are used to route the non-edge-service related data packets to the 5GC 540 and route edge-service related data packets to the edge node 140.

After the bearers are setup, the UE 117 can obtain non-edge-based services (e.g., cloud-based services) using the EPS bearer 901. This may include sending a cloud service request message to the cloud 160 at operation 805a, and receiving a cloud service response message from the cloud 160 at operation 805b. The messages communicated at operations 805a and 805b may be based on an on-going session between the UE 117 and the cloud 160 or may be used to set up a new session between the UE 117 and the cloud 160. Furthermore, the messages communicated at operations 805a and 805b may be sent/received via paths through the edge node 140 and the CN 150.

At operations 806, 807a, and 807b, the UE 117 can obtain edge-based services using the edge bearer 902. For example, at operation 806, the UE 117 may receive edge service messages such as safety broadcast messages, notifications from edge apps, local e-commerce advertisements, and/or the like, over the edge bearer 902. Additionally or alternatively, the UE 117 can send an edge service request message to the edge node 140 at operation 807a, and receive an edge service response message from the edge node 140 at operation 807b. The messages communicated at operations 806, 807a, and 807b is an example of the edge LBO of messages to/from the edge node 140. The messages communicated at operations 806, 807a, and 807b may be based on an on-going edge-services session between the UE 117 and the edge node 140 or may be used to set up a new edge-services session between the UE 117 and the edge node 140. Furthermore, the messages communicated at operations 806, 807a, and 807b may be sent/received via paths through the NAN 130 to/from edge node 140. Hence, the edge node 140 can identify the packets and/or data related to edge-based services (e.g., microservices provided by the edge node 140) and perform local breakout for such packets and route to the edge platform 240.

Although the embodiments discussed previously are described in terms of LTE deployment scenarios, it should be understood that such embodiments are also applicable to 5G deployment scenarios and/or other network architectures. Furthermore, it should be understood that any type of NAN 130 could be used such as an eNB, gNB, WiFi AP, DSL modem/router, residential gateway (RG), a 5G-RG, a Fixed Network (FN) RG (FN-RG), an FN Broadband RG (FN-BRG), an FN Cable RG (FN-CRG), a Wireline 5G Access Network (W-5GAN), a Wireline 5G Cable Access Network (W-5GCAN), a Wireline Access Gateway Function (W-AGF), WiMAX Access Service Network (ASN) node. Moreover, it should be understood that any type of edge computing technology could be used for edge node 140 such as the edge computing technologies/frameworks discussed herein.

2. Intelligent Transport System (ITS) Configurations and Arrangements

The edge LBO embodiments discussed herein may be applicable to various use cases. An example use case that can benefit from the edge LBO embodiments discussed herein includes Vehicle-to-Everything (V2X) and/or Intelligent Transport Systems (ITS) use cases. Edge Computing is an important topic V2X and ITS use cases, as many such cases ultimately require guarantees of low latency and high reliability. These use cases involve a large amount of regional data which needs to be processed and dispatched locally instead of being uploaded over the internet to its cloud services which, at scale, becomes time- and cost-intensive without generating much added value.

Figure 10:
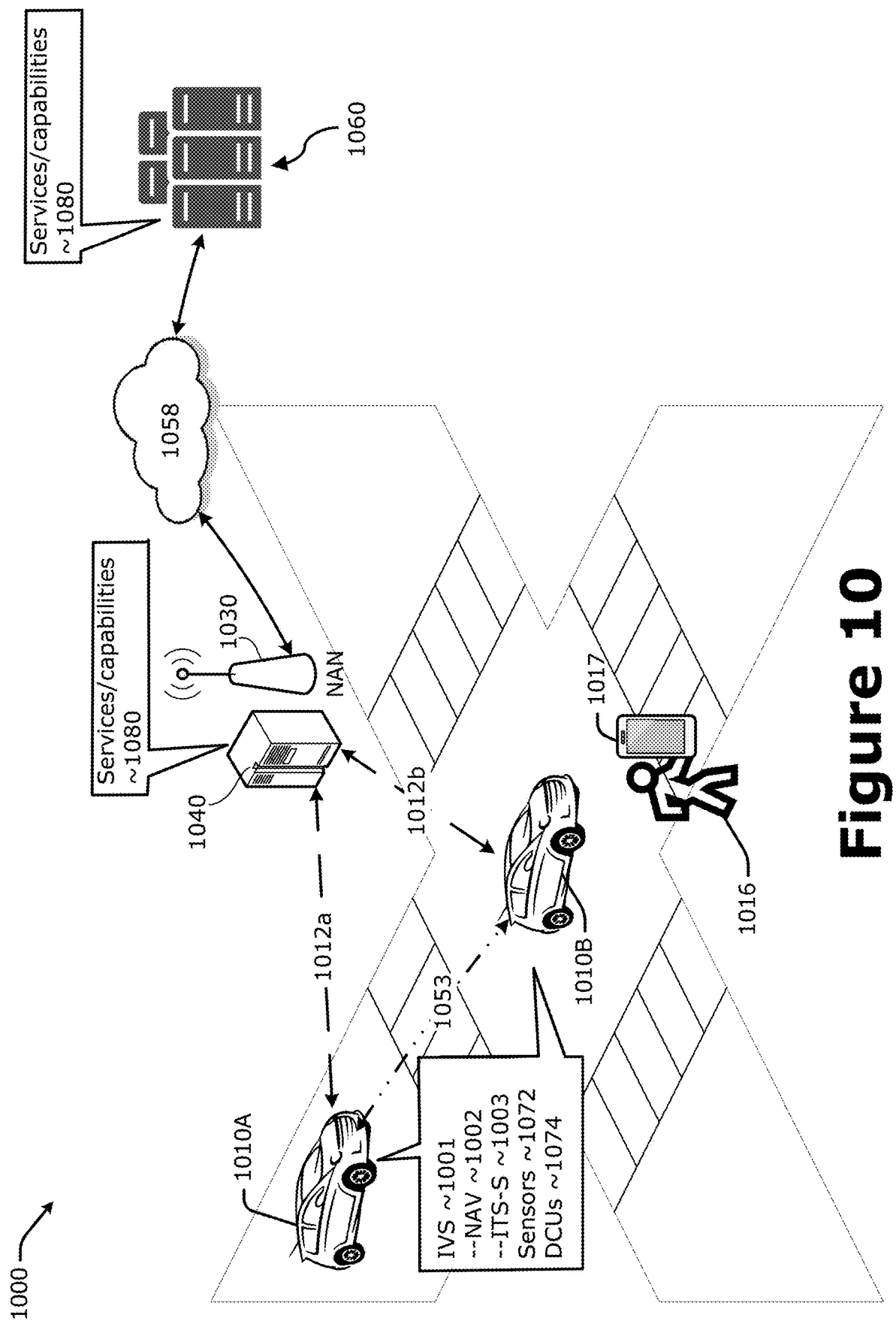
FIG. 10 illustrates an operative Intelligent Transport System arrangement.

FIG. 10 illustrates an overview of a V2X/ITS environment 1000, which includes vehicles 1010A and 1010B

(collectively "vehicle 1010"). Rapidly growing cities are under pressure to address safety of road users, congestion, environmental issues, and resulting economic impacts. Road traffic crashes result in the deaths of approximately 1.35 million people around the world each year and leave between 20 and 50 million people with non-fatal injuries (World Health Organization, Road Traffic Injuries, 2019.). More than half of all road traffic deaths and injuries involve vulnerable road users (VRU) 1016, such as pedestrians, cyclists, and motorcyclists.

The operation and control of vehicles 1010 is becoming more autonomous over time, and most vehicles will likely become fully autonomous in the future. Vehicles 1010 that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

V2X applications (referred to simply as "V2X" herein) include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X can use co-operative awareness to provide more intelligent services for end-users. This means that entities, such as vehicle stations or vehicle user equipment (vUEs) including such as CA/AD vehicles, roadside infrastructure or roadside units (RSUs), application servers, and pedestrian devices (e.g., smartphones, tablets, etc.), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like. One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, etc.). Elements of ITS are standardized in various standardization organizations, both on an international level and on regional levels.

ITS comprises advanced applications and services related to different modes of transportation and traffic to enable an increase in traffic safety and efficiency, and to reduce emissions and fuel consumption. Various forms of wireless communications and/or Radio Access Technologies (RATs) may be used for ITS. These RATs may need to coexist in one or more communication channels, such as those available in the 5.9 Gigahertz (GHz) band. Cooperative Intelligent Transport Systems (C-ITS) have been developed to enable an increase in traffic safety and efficiency, and to reduce emissions and fuel consumption. The initial focus of C-ITS was on road traffic safety and especially on vehicle safety. Recent efforts are being made to increase traffic safety and efficiency for VRUs 1016, which refers to both physical entities (e.g., pedestrians) and/or user devices 1017 (e.g., mobile stations, etc.) used by physical entities. Regulation (EU) No 168/2013 of the European Parliament and of the Council of 15 Jan. 2013 on the approval and market surveillance of two- or three-wheel vehicles and quadricycles ("EU regulation 168/2013") provides various examples of VRUs 1016. CA/AD vehicles 1010 are expected to reduce VRU-related injuries and fatalities by eliminating or reducing human-error in operating vehicles. However, to date CA/AD vehicles 1010 can do very little about detection, let alone correction of the human-error at VRUs' 1016 end, even though it is equipped with a sophisticated sensing technology suite, as well as computing and mapping technologies.

Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since any number of different RATs (including IEEE 802.11p-based RATs) may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM), and/or other wireless communication technologies.

V2X is considered to be one of the solutions to improve safety of the VRUs and improve the efficiency of the road infrastructure. The various access layer technologies discussed herein provide a conduit for safety or traffic efficiency related services. Facilities layer protocols were mainly developed for safety and traffic efficiency purposes by ETSI Intelligent Transportation System (ITS) and the Society of Automotive Engineers (SAE). In particular, collaborative awareness messages (CAM), Decentralized environmental notification message (DENM), Signal phase and timing message (SPAT), among others, were developed by ETSI ITS, and basic safety messages (BSM) and pedestrian safety messages (PSM) were developed by SAE.

Road infrastructure solutions play an important part in helping cities become safer, greener, and smarter. Governments throughout the world have initiated plans to deploy Information and Communication Technologies (ICT) for smart city, traffic management, ITS, and road safety projects to mitigate the challenges faced due to rapid urbanization. However, business models for deploying these V2X based safety and efficiency services are not compelling for consumers and deployers (e.g., cities, local governments, network operators, etc.) yet. Delivering various services, including commercial services (e.g., advertisement, parking, etc.), from roadside infrastructure using edge computing technologies could create additional benefits to infrastructure owners/operators (IOOs) to accelerate these deployments.

The environment 1000 in FIG. 10 includes vehicles 1010A and 1010B (collectively "vehicle 1010"). Each vehicle 1010 includes an engine, transmission, axles, wheels and so forth (not shown). The vehicles 1010 may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. as used herein refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 1010 shown by FIG. 10 may represent motor vehicles of varying makes, models, trim, etc. For illustrative purposes, the following description is provided for deployment scenarios including vehicles 1010 in a 2D freeway/highway/roadway environment wherein the vehicles 1010 are automobiles. However, other types of vehicles are also applicable, such as trucks, busses, motorboats, motorcycles, electric personal transporters, and/or any other motorized devices capable of transporting people or goods. 3D deployment scenarios are also applicable where some or all of the vehicles 1010 are implemented as flying objects, such as aircraft, drones, UAVs, and/or to any other like motorized devices.

Each of the vehicles 1010 include an in-vehicle systems (IVS) 1001, one or more sensors 1072, and one or more driving control units (DCUs) 1074. The IVS 1001 includes a number of vehicle computing hardware subsystems and/or applications including, for example, various hardware and software elements to implement navigation circuitry 1002 and an ITS-S 1003. Additionally, some or all of the vehicles 1010 may be computer-assisted or autonomous driving (CA/AD) vehicles, which may include artificial intelligence (AI) and/or robotics to assist vehicle operation. The CA/AD vehicles 1010 may be any one of a number of in-vehicle systems and CA/AD vehicles, from computer-assisted to partially or fully autonomous vehicles. Additionally or alternatively, the vehicles 1010 could include additional or alternative types of computing devices/systems such as smartphones, tablets, wearables, laptops, laptop computer, Upgradeable Vehicular Compute Systems (UVCS), in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, engine management system, and the like that may be operable to perform the functionality discussed herein. Vehicles 1010 including a computing system (e.g., IVS 1001) as well as the vehicles referenced throughout the present disclosure, may be referred to as vehicle user equipment (vUE) 1010, vehicle stations 1010, vehicle ITS stations (V-ITS-S) 1010, CA/AD vehicles 1010, and/or the like. Additionally, the IVS 1001 and CA/AD vehicle 1010 may include other components/subsystems not shown by FIG. 10 such as the elements shown and described throughout the present disclosure.

The subsystems/applications of the IVS 1001 may also include instrument cluster subsystems, front-seat and/or back-seat infotainment subsystems and/or other like media subsystems, a navigation subsystem (NAV) 1002, a vehicle status subsystem/application, a HUD subsystem, an EMA subsystem, and so forth. The NAV 1002 may be configurable or operable to provide navigation guidance or control, depending on whether vehicle 1010 is a computer-assisted vehicle, partially or fully autonomous driving vehicle. NAV 1002 may be configured with computer vision to recognize stationary or moving objects (e.g., a pedestrian, another vehicle, or some other moving object) in an area surrounding vehicle 1010, as it travels enroute to its destination. The NAV 1002 may be configurable or operable to recognize stationary or moving objects in the area surrounding vehicle 1010, and in response, make its decision in guiding or controlling DCUs of vehicle 1010, based at least in part on sensor data collected by sensors 1072

The ITS-S 1003 employs one or more V2X RATs, which allow the vehicles 1010 to communicate directly with one another and with infrastructure equipment (e.g., network access node (NAN) 1030). The V2X RATs may refer to 3GPP cellular V2X RAT (e.g., LTE, 5G/NR, and beyond), a WLAN V2X (W-V2X) RAT (e.g., DSRC in the USA or ITS-G5 in the EU), and/or some other RAT such as those discussed herein. Some or all of the vehicles 1010 may include positioning circuitry to (coarsely) determine their respective geolocations and communicate their current position with the NAN 1030 in a secure and reliable manner. This allows the vehicles 1010 to synchronize with one another and/or the NAN 1030.

The ITS-S 1003 (or the underlying V2X RAT circuitry on which the ITS-S 1003 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

In addition to the functionality discussed herein, the ITS-S 1003 (or the underlying V2X RAT circuitry on which the ITS-S 1003 operates) is capable of measuring various signals or determining/identifying various signal/channel characteristics. Signal measurement may be performed for cell selection, handover, network attachment, testing, and/or other purposes. The measurements/characteristics collected by the ITS-S 1003 (or V2X RAT circuitry) may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 1030 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0 (2019 September), 3GPP TS 38.215 v16.1.0 (2020 April), IEEE 802.11, Part 11: "Wireless LAN Medium Access Control (MAC) and Physical Layer (PHY) specifications, IEEE Std.", and/or the like. The same or similar measurements may be measured or collected by the NAN 1030.

The DCUs 1074 include hardware elements that control various systems of the vehicles 1010, such as the operation of the engine, the transmission, steering, braking, etc. DCUs 1074 are embedded systems or other like computer devices that control a corresponding system of a vehicle 1010. The DCUs 1074 may each have the same or similar components as devices/systems of FIG. 2674 discussed infra, or may be some other suitable microcontroller or other like processor device, memory device(s), communications interfaces, and the like. Individual DCUs 1074 are capable of communicating with one or more sensors 1072 and actuators (e.g., actuators 2674 of FIG. 26).

The sensors 1072 are hardware elements configurable or operable to detect an environment surrounding the vehicles 1010 and/or changes in the environment. The sensors 1072 are configurable or operable to provide various sensor data to the DCUs 1074 and/or one or more AI agents to enable the DCUs 1074 and/or one or more AI agents to control respective control systems of the vehicles 1010. Some or all of the sensors 1072 may be the same or similar as the sensor circuitry 2672 of FIG. 26. In particular, the IVS 1001 may include or implement a facilities layer and operate one or more facilities within the facilities layer.

The sensors 1072 include(s) devices, modules, and/or subsystems whose purpose is to detect events or changes in its environment and send the information (sensor data) about the detected events to some other a device, module, subsystem, etc. Examples of such sensors 1072 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like. Additionally or alternatively, some of the sensors 1072 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; wheel speed sensors; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 1072 may include other sensors such as an accelerator pedal position sensor (APP), accelerometers, magnetometers, level sensors, flow/fluid sensors, barometric pressure sensors, and/or any other sensor(s) such as those discussed herein. Sensor data from sensors 1072 of the host vehicle may include engine sensor data collected by various engine sensors (e.g., engine temperature, oil pressure, and so forth).

IVS 1001, on its own or in response to user interactions, communicates or interacts with one or more vehicles 1010 via interface 1053, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, etc.). Other technologies could be used, such as Bluetooth/Bluetooth Low Energy (BLE) or the like. The vehicles 1010 may exchange ITS protocol data units (PDUs) or other messages (e.g., VAMs, CPMs, etc.) with one another over the interface 1053.

IVS 1001, on its own or in response to user interactions, communicates or interacts with one or more remote/cloud servers 1060 via NAN 1030 over interface 1012 and over network 1058. The NAN 1030 is arranged to provide network connectivity to the vehicles 1010 via respective interfaces 1012 between the NAN 1030 and the individual vehicles 1010. The NAN 1030 is, or includes, an ITS-S, and may be a roadside ITS-S(R-ITS-S). The NAN 1030 is a network element that is part of an access network that provides network connectivity to the end-user devices (e.g., V-ITS-Ss 1010 and/or VRU ITS-Ss 1017). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. All or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. The CRAN, CR, or vBBUP may implement a RAN function split, wherein one or more communication protocol layers are operated by the CRAN/CR/vBBUP and other communication protocol entities are operated by individual RAN nodes 1030. This virtualized framework allows the freed-up processor cores of the NAN 1030 to perform other virtualized applications, such as virtualized applications for the VRU 1016/V-ITS-S 1010.

Environment 1000 also includes VRU 1016, which includes a VRU ITS-S 1017. The VRU 1016 is a non-motorized road users as well as L class of vehicles (e.g., mopeds, motorcycles, Segways, etc.), as defined in Annex I of Regulation (EU) No 168/2013 of the European Parliament and of the Council of 15 Jan. 2013 on the approval and market surveillance of two- or three-wheel vehicles and quadricycles ("EU regulation 168/2013") (see e.g., International Organization for Standardization (ISO) "Road vehicles—Vehicle dynamics and road-holding ability—Vocabulary", ISO, TC 22, SC 33, Ed. 2 (2011 December) ("[ISO-8855:2011]")). SAE International, "Taxonomy and Classification of Powered Micromobility Vehicles", Powered Micromobility Vehicles Committee, SAE Ground Vehicle Standard J3194 (20 Nov. 2019) ("[SAE-J3194]") also proposes a taxonomy and classification of powered micro-mobility vehicles: powered bicycle (e.g., electric bikes); powered standing scooter (e.g., Segway®); powered seated scooter; powered self-balancing board sometimes referred to as "self-balancing scooter" (e.g., Hoverboard® self-balancing board, and Onewheel® self-balancing single wheel electric board.); powered skates; and/or the like. Their main characteristics are their kerb weight, vehicle width, top speed, power source (electrical or combustion). Human powered micro-mobility vehicles (bicycle, standing scooter) should be also considered. Transitions between engine powered vehicles and human powered vehicles may occur, changing the motion dynamic of the vehicle. Both, human powered and engine powered may also occur in parallel, also impacting the motion dynamic of the vehicle.

A VRU 1016 is an actor that interacts with a VRU system 1017 in a given use case and behavior scenario. For example, if the VRU 1016 is equipped with a personal device, then the VRU 1016 can directly interact via the personal device with other ITS-Stations and/or other VRUs 1016 having VRU devices 1017. The VRU ITS-S 1017 could be either pedestrian-type VRU or vehicle-type (on bicycle, motorbike) VRU. The term "VRU ITS-S" as used herein refers to any type of VRU device or VRU system. Before the potential VRU 1016 can even be identified as a VRU 1016, it may be referred to as a non-VRU and considered to be in IDLE state or inactive state in the ITS.

In general, there are four types of VRU equipment 1017 including non-equipped VRUs (e.g., a VRU 1016 not having a device); VRU-Tx (e.g., a VRU 1016 equipped with an ITS-S 1017 having only a transmission (Tx) but no reception (Rx) capabilities that broadcasts awareness messages or beacons about the VRU 1016); VRU-Rx (e.g., a VRU 1016 equipped with an ITS-S 1017 having only an Rx (but no Tx) capabilities that receives broadcasted awareness messages or beacons about the other VRUs 1016 or other non-VRU ITS-Ss); and VRU-St (e.g., a VRU 1016 equipped with an ITS-S 1017 that includes the VRU-Tx and VRU-Rx functionality). The use cases and behavior scenarios consider a wide set of configurations of VRU systems 1017 based on the equipment of the VRU 1016 and the presence or absence of V-ITS-S 1010 and/or R-ITS-S 1030 with a VRU application. Examples of the various VRU system configurations are shown by table 2 of ETSI TR 103 300-1 v2.1.1 (2019 September) ("[TR103300-1]").

If the VRU 1016 is not equipped with a device, then the VRU 1016 interacts indirectly, as the VRU 1016 is detected by another ITS-Station in the VRU system 1017 via its sensing devices such as sensors and/or other components. However, such VRUs 1016 cannot detect other VRUs 1016 (e.g., a bicycle). In ETSI TS 103 300-2 V0.3.0 (2019 December) ("[TS103300-2]"), the different types of VRUs 1016 have been categorized into the following four profiles: VRU Profile-1 (pedestrians including pavement users, children, pram, disabled persons, elderly, etc.); VRU Profile-2 (bicyclists including light vehicles carrying persons, wheelchair users, horses carrying riders, skaters, e-scooters, Segways, etc.), VRU Profile-3 (motorcyclists including motorbikes, powered two wheelers, mopeds, etc.), and VRU Profile-4 (animals posing safety risk to other road users such as dogs, wild animals, and livestock (e.g., horses, cows, sheep, etc.)). These profiles further define the VRU functional system and communications architectures for VRU ITS-S 1017. Additionally, VRU device types may include VRU-Tx (VRU device 1017 is equipped with transmitter only and can broadcast beacon messages about the VRU 1016), VRU-Rx (VRU device 1017 is equipped with a receiver only and application to receive message from other ITS-Ss and capable of warning/notifying the VRU 1016), and VRU-St (VRU device 1017 contains and ITS-S including both VRU-Tx and VRU-Rx capabilities).

A VRU 1016 can be equipped with a portable device (e.g., device 1017). The term "VRU" may be used to refer to both a VRU 1016 and its VRU device 1017 unless the context dictates otherwise. The VRU device 1017 may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

A "VRU system" (e.g., VRU ITS-S 1017) comprises ITS artefacts that are relevant for VRU use cases and scenarios such as those discussed herein, including the primary components and their configuration, the actors and their equipment, relevant traffic situations, and operating environments. The terms "VRU device," "VRU equipment," and "VRU system" refers to a portable device (e.g., mobile stations such as smartphones, tablets, wearable devices, fitness tracker, etc.) or an IoT device (e.g., traffic control devices) used by a VRU 1016 integrating ITS-S technology, and as such, the VRU ITS-S 1017 may include or refer to a "VRU device," "VRU equipment," and/or "VRU system".

The VRU systems 1017 are Cooperative Intelligent Transport Systems (C-ITS) that comprise at least one VRU 1016 and one ITS-Station with a VRU application. The ITS-S can be a V-ITS-S 1010 or an R-ITS-S 1013 that is processing the VRU application logic based on the services provided by the lower communication layers (Facilities, Networking & Transport and Access layer (see e.g., ETSI EN 302 665 V1.1.1 (2010 September) ("[EN302665]")), related hardware components, other in-station services and sensor subsystems. A VRU system may be extended with other VRUs 1016, other ITS-S and other road users involved in a scenario such as vehicles, motorcycles, bikes, and pedestrians. VRUs 1016 may be equipped with ITS-S or with different technologies (e.g., IoT) that enable them to send or receive alerts. The VRU system 1017 considered is thus a heterogeneous system. A definition of a VRU system is used to identify the system components that actively participate in a use case and behavior scenario. The active system components are equipped with ITS-Stations, while all other components are passive and form part of the environment of the VRU system.

The VRU ITS-S 1017 may operate one or more VRU applications. A VRU application is an application that extends the awareness of and/or about VRUs and/or VRU clusters in or around other traffic participants. VRU applications can exist in any ITS-S, meaning that VRU applications can be found either in the VRU itself or in non-VRU ITS stations, for example cars, trucks, buses, road-side stations or central stations. These applications aim at providing VRU-relevant information to actors such as humans directly or to automated systems. VRU applications can increase the awareness of vulnerable road users, provide VRU-collision risk warnings to any other road user or trigger an automated action in a vehicle. VRU applications make use of data received from other ITS-Ss via the C-ITS network and may use additional information provided by the ITS-S own sensor systems and other integrated services.

The message specified for VRUs 1016/1017 is the VRU awareness message (VAM). VAMs are messages transmitted from VRU ITSs 1017 to create and maintain awareness of VRUs 1016 participating in the VRU/ITS system. VAMs are harmonized in the largest extent with the existing Cooperative Awareness Messages (CAM). The transmission of the VAM is limited to the VRU profiles specified in clause 6.1 of [TS103300-2] The VAMs contain all required data depending on the VRU profile and the actual environmental conditions. The VRU system 1017 supports the flexible and dynamic triggering of messages with generation intervals from X milliseconds (ms) at the most frequent, where X is a number (e.g., X=100 ms).

A VAM contains status and attribute information of the originating VRU ITS-S 1017. The content may vary depending on the profile of the VRU ITS-S 1017. A typical status information includes time, position, motion state, cluster status, and others. Typical attribute information includes data about the VRU profile, type, dimensions, and others. The generation, transmission and reception of VAMs are managed by a VRU basic service (VBS). The VBS is a facilities layer entity that operates the VAM protocol. The VBS provides the following services: handling the VRU role, sending and receiving of VAMs to enhance VRU safety. The VBS also specifies and/or manages VRU clustering in presence of high VRU 1016/1017 density to reduce VAM communication overhead. In VRU clustering, closely located VRUs with coherent speed and heading form a facility layer VRU cluster and only cluster head VRU 1016/1017 transmits the VAM. Other VRUs 1016/1017 in the cluster skip VAM transmission. Active VRUs 1016/1017 (e.g., VRUs 1016/1017 not in a VRU cluster) send individual VAMs (called single VRU VAM or the like). An "individual VAM" is a VAM including information about an individual VRU 1016/1017. A VAM without a qualification can be a cluster VAM or an individual VAM.

The RATs employed by the NAN 1030, the V-ITS-Ss 1010, and the VRU ITS-S 1017 may include one or more V2X RATs, which allow the V-ITS-Ss 1010 to communicate directly with one another, with infrastructure equipment (e.g., NAN 1030), and with VRU devices 1017. In the example of FIG. 10, any number of V2X RATs may be used for V2X communication. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 1012a and the WLAN V2X RAT may utilize an air interface 1012b.

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Intl "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018-03-02) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer comprises IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[IEEE80211]") (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020 January), 3GPP TS 23.285 v16.2.0 (2019 December); and 3GPP 5G/NR-V2X is outlined in, inter alia, 3GPP TR 23.786 v16.1.0 (2019 June) and 3GPP TS 23.287 v16.2.0 (2020 March).

In V2X scenarios, a V-ITS-Ss 1010 or a NAN 1030 may be or act as a RSU or R-ITS-S 1030, which refers to any transportation infrastructure entity used for V2X communications. In this example, the RSU 1030 may be a stationary RSU, such as an gNB/eNB-type RSU or other like infrastructure, or relatively stationary UE. Additionally or alternatively, the RSU 1030 may be a mobile RSU or a UE-type RSU, which may be implemented by a vehicle (e.g., V-ITS-Ss 1010), pedestrian, or some other device with such capabilities. In these cases, mobility issues can be managed in order to ensure a proper radio coverage of the translation entities. Additionally or alternatively, RSU 1030 may be a road embedded reflector, a smart street or traffic light, a road side tag, smart signage, or other like traffic control device/element.

The NAN 1030 or an edge compute node 1040 may provide one or more services/capabilities 1080. In an example implementation, RSU 1030 is a computing device coupled with radio frequency circuitry located on a roadside that provides connectivity support to passing V-ITS-Ss 1010. The RSU 1030 may also include internal data storage circuitry to store intersection map geometry, traffic statistics, media, as well as applications/software to sense and control ongoing vehicular and pedestrian traffic. The RSU 1030 provides various services/capabilities 1080 such as, for example, very low latency communications required for high speed events, such as crash avoidance, traffic warnings, and the like. Additionally or alternatively, the RSU 1030 may provide other services/capabilities 1080 such as, for example, cellular/WLAN communications services. In some implementations, the components of the RSU 1030 may be packaged in a weatherproof enclosure suitable for outdoor installation, and may include a network interface controller to provide a wired connection (e.g., Ethernet) to a traffic signal controller and/or a backhaul network. Further, RSU 1030 may include wired or wireless interfaces to communicate with other RSUs 1030 (not shown by FIG. 10)

In arrangement 1000, V-ITS-S 1010a may be equipped with a first V2X RAT communication system (e.g., C-V2X) whereas V-ITS-S 1010b may be equipped with a second V2X RAT communication system (e.g., W-V2X which may be DSRC, ITS-G5, or the like). Additionally or alternatively, the V-ITS-S 1010a and/or V-ITS-S 1010b may each be employed with one or more V2X RAT communication systems. The RSU 1030 may provide V2X RAT translation services among one or more services/capabilities 1080 so that individual V-ITS-Ss 1010 may communicate with one another even when the V-ITS-Ss 1010 implement different V2X RATs. The RSU 1030 (or edge compute node 1040) may provide communication services among the one or more services/capabilities 1080 wherein the R-ITS-S 1030 shares CPMs, MCMs, VAMs DENMs, CAMs, etc., with V-ITS-Ss 1010 and/or VRUs for VRU safety purposes. The V-ITS-Ss 1010 may also share such messages with each other, with RSU 1030, and/or with VRUs. These messages may include the various data elements and/or data fields as discussed herein. Additionally or alternatively, the R-ITS-S 1030 may provide edge LBO related services as discussed herein.

In this example, the NAN 1030 may be a stationary RSU, such as an gNB/eNB-type RSU or other like infrastructure. Additionally or alternatively, the NAN 1030 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 1030 that enables the connections 1012 may be referred to as a "RAN node" or the like. The RAN node 1030 may comprise ground stations (e.g., terrestrial access points) or satellite stations providing coverage within a geographic area (e.g., a cell). The RAN node 1030 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1030 is embodied as a NodeB, evolved NodeB (eNB), or a next generation NodeB (gNB), one or more relay nodes, distributed units, or Road Side Unites (RSUs). Any other type of NANs can be used. Additionally, the RAN node 1030 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc.

The network 1058 may represent a network such as the Internet, a wireless local area network (WLAN), or a wireless wide area network (WWAN) including proprietary and/or enterprise networks for a company or organization, a cellular core network (e.g., an evolved packet core (EPC) network, a NextGen Packet Core (NPC) network, a 5G core (5GC), or some other type of core network), a cloud computing architecture/platform that provides one or more cloud computing services, and/or combinations thereof. As examples, the network 1058 and/or access technologies may include cellular technology such as LTE, MuLTEfire, and/or NR/5G (e.g., as provided by Radio Access Network (RAN) node 1030), WLAN (e.g., WiFi®) technologies (e.g., as provided by an access point (AP) 1030), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The remote/cloud servers 1060 may represent one or more application servers, a cloud computing architecture/platform that provides cloud computing services, and/or some other remote infrastructure. The remote/cloud servers 1060 may include any one of a number of services and capabilities 1080 such as, for example, ITS-related applications and services, driving assistance (e.g., mapping/navigation), content provision (e.g., multi-media infotainment streaming), and/or the like.

Additionally, the NAN 1030 is co-located with an edge compute node 1040 (or a collection of edge compute nodes 1040), which may provide any number of services/capabilities 1080 to vehicles 1010 such as ITS services/applications, driving assistance, and/or content provision services 1080. The edge compute node 1040 may include or be part of an edge network or "edge cloud." The edge compute node 1040 may also be referred to as an "edge host 1040," "edge server 1040," or "compute platforms 1040." The edge compute nodes 1040 may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Servlets, servers, and/or other like computation abstractions. The edge compute node 1040 may be implemented in a data center or cloud installation; a designated edge node server, an enterprise server, a roadside server, a telecom central office; or a local or peer at-the-edge device being served consuming edge services. The edge compute node 1040 may provide any number of driving assistance and/or content provision services 1080 to vehicles 1010. The edge compute node 1040 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 1040 and/or edge computing network/cloud are discussed infra. Additionally or alternatively, the edge compute node 1040 may provide the edge LBO related services as discussed herein.

Moreover, the various elements of the ITS environment 1000 may correspond to the various elements discussed previously with respect to FIGS. 1-9. Here, the vehicles (or V-ITS-Ss) 1010 and/or the VRU 1016/1017 correspond to the UEs 117; the R-ITS-S 1030 corresponds to the NAN 130; the edge compute node 1040 corresponds to the edge node 140; the network 1058 corresponds to the core network 150; and the remote/cloud servers 1060 corresponds to the cloud 160.

3. Edge Computing Systems, Arrangements, and Configurations

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The present disclosure provides specific examples relevant to edge computing configurations provided within Multi-Access Edge Computing (MEC) and 5G network implementations. However, many other standards and network implementations are applicable to the edge and service management concepts discussed herein. For example, many other edge computing/networking technologies may be applicable to the present disclosure in various combinations and layouts of devices located at the edge of a network. Examples of such other edge computing/networking technologies include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/ or the like. Further, the techniques disclosed herein may relate to other IoT edge network systems and configurations, and other intermediate processing entities and architectures may also be used for purposes of the present disclosure.

Figure 11:
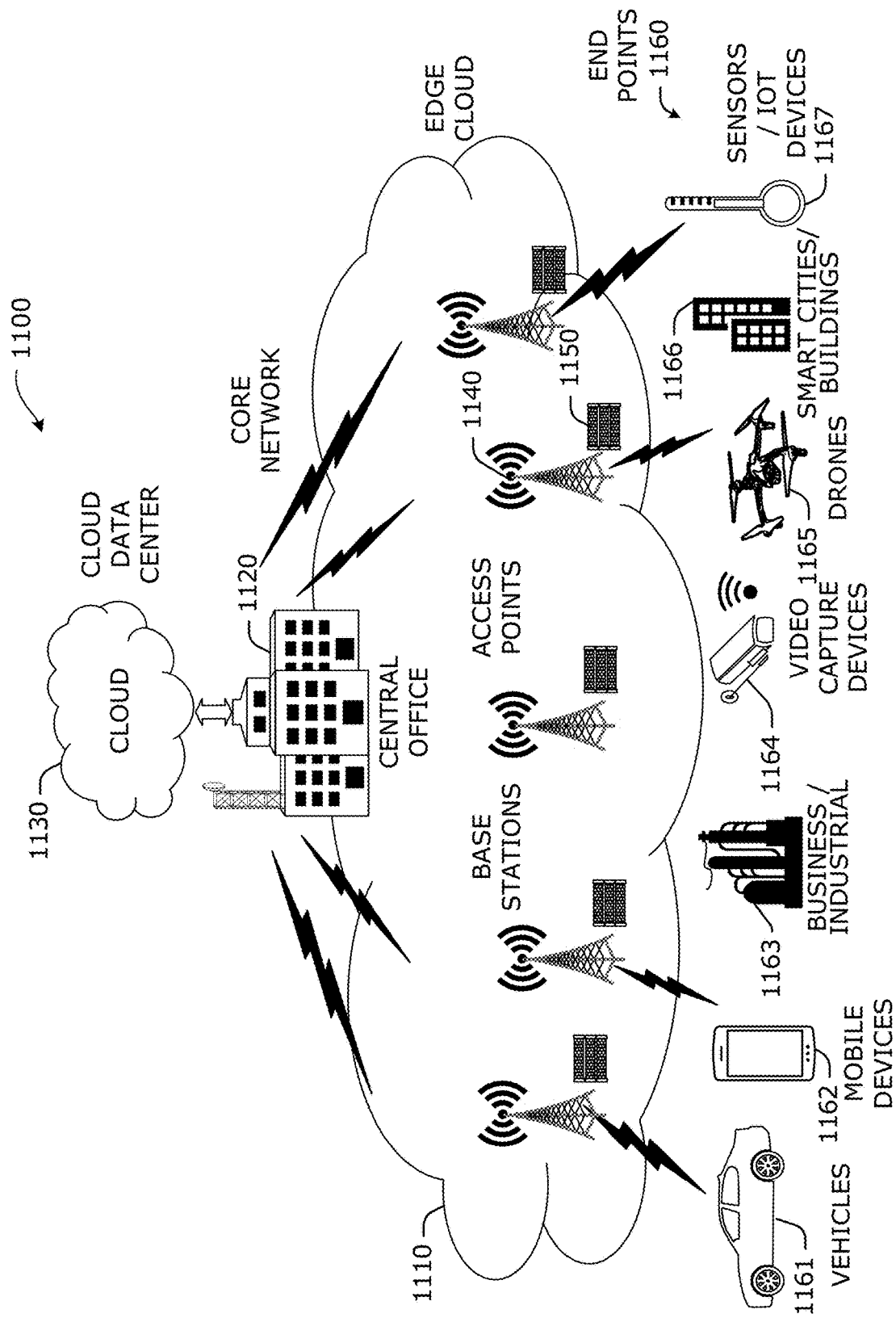
FIG. 11 illustrates an overview of an edge cloud configuration for edge computing. FIG. a12 illustrates operational layers among endpoints, an edge cloud, and cloud computing environments.
Figure 12:
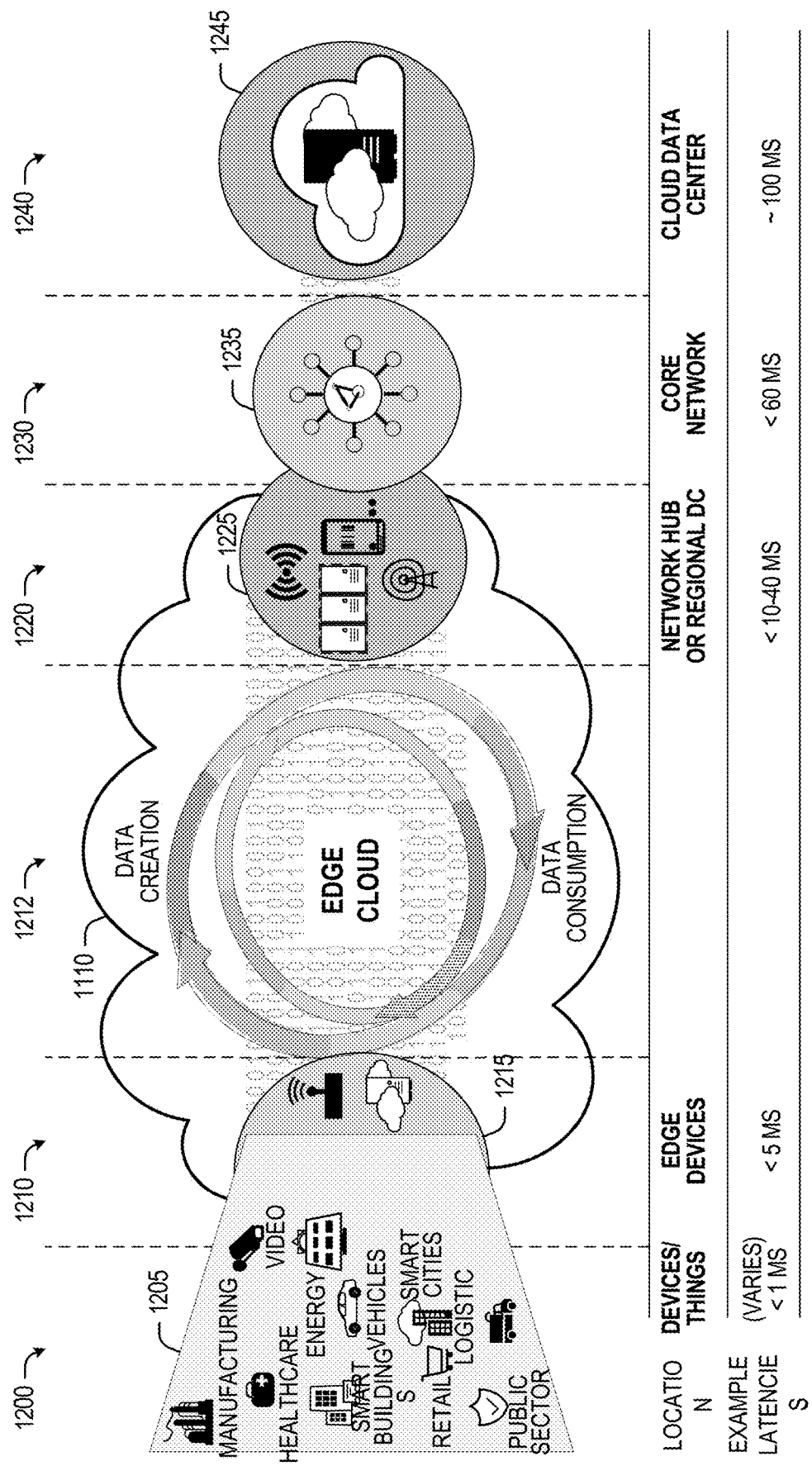

FIG. 11 is a block diagram 1100 showing an overview of a configuration for edge computing, which includes a layer of processing referred to in many of the following examples as an "edge cloud". As shown, the edge cloud 1110 is co-located at an edge location, such as an access point or base station 1140, a local processing hub 1150, or a central office 1120, and thus may include multiple entities, devices, and equipment instances. The edge cloud 1110 is located much closer to the endpoint (consumer and producer) data sources 1160 (e.g., autonomous vehicles 1161, user equipment 1162, business and industrial equipment 1163, video capture devices 1164, drones 1165, smart cities and building devices 1166, sensors and IoT devices 1167, etc.) than the cloud data center 1130. Compute, memory, and storage resources which are offered at the edges in the edge cloud 1110 are critical to providing ultra-low latency response times for services and functions used by the endpoint data sources 1160 as well as reduce network backhaul traffic from the edge cloud 1110 toward cloud data center 1130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of an appropriately arranged compute platform (e.g., x86, ARM, Nvidia or other CPU/GPU based compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Alternatively, an arrangement with hardware combined with virtualized functions, commonly referred to as a hybrid arrangement may also be successfully implemented. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure a12 illustrates operational layers among endpoints, an edge cloud, and cloud computing environments. Specifically, Figure a12 depicts examples of computational use cases a1205, utilizing the edge cloud 1110 among multiple illustrative layers of network computing. The layers begin at an endpoint (devices and things) layer a1200, which accesses the edge cloud 1110 to conduct data creation, analysis, and data consumption activities. The edge cloud 1110 may span multiple network layers, such as an edge devices layer a1210 having gateways, on-premise servers, or network equipment (nodes a1215) located in physically proximate edge systems; a network access layer a1220, encompassing base stations, radio processing units, network hubs, regional data centers (DC), or local network equipment (equipment a1225); and any equipment, devices, or nodes located therebetween (in layer a1212, not illustrated in detail). The network communications within the edge cloud 1110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer a1200, under 5 ms at the edge devices layer a1210, to even between 10 to 40 ms when communicating with nodes at the network access layer a1220. Beyond the edge cloud 1110 are core network a1230 and cloud data center a1240 layers, each with increasing latency (e.g., between 50-60 ms at the core network layer a1230, to 100 or more ms at the cloud data center layer). As a result, operations at a core network data center a1235 or a cloud data center a1245, with latencies of at least 50 to 100 ms or more, will not be able to accomplish many time-critical functions of the use cases a1205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center a1235 or a cloud data center a1245, a central office or content data network may be considered as being located within a "near edge" layer ("near" to the cloud, having high latency values when communicating with the devices and endpoints of the use cases a1205), whereas an access point, base station, on-premise server, or network gateway may be considered as located within a "far edge" layer ("far" from the cloud, having low latency values when communicating with the devices and endpoints of the use cases a1205). It will be understood that other categorizations of a particular network layer as constituting a "close", "local", "near", "middle", or "far" edge may be based on latency, distance, number of network hops, or other measurable characteristics, as measured from a source in any of the network layers a1200-a1240.

The various use cases a1205 may access resources under usage pressure from incoming streams, due to multiple services utilizing the edge cloud. To achieve results with low latency, the services executed within the edge cloud 1110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1110 may provide the ability to serve and respond to multiple applications of the use cases a1205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1110 (network layers a1200-a1240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Here, a "producer" refers to an entity or element that provides a service to other entities or elements on the same edge node or on different edge nodes, and a "consumer" refers to an entity or element that can consumer end user traffic and/or user services from a producer on the same or different edge nodes. For example, a producer app may provide location services, mapping services, transcoding services, AI/ML services, and/or other like services. Additionally or alternatively, a consumer app may be a content delivery network (CDN) node, AR or VR apps, gaming apps, and/or some other type of app. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1110.

As such, the edge cloud 1110 is formed from network components and functional features operated by and within edge gateway nodes, edge aggregation nodes, or other edge compute nodes among network layers a1210-a1230. The edge cloud 1110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1110 may be servers, multi-tenant servers, appliance computing devices, and/or any other type of computing devices. For example, the edge cloud 1110 may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 26. The edge cloud 1110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 13:
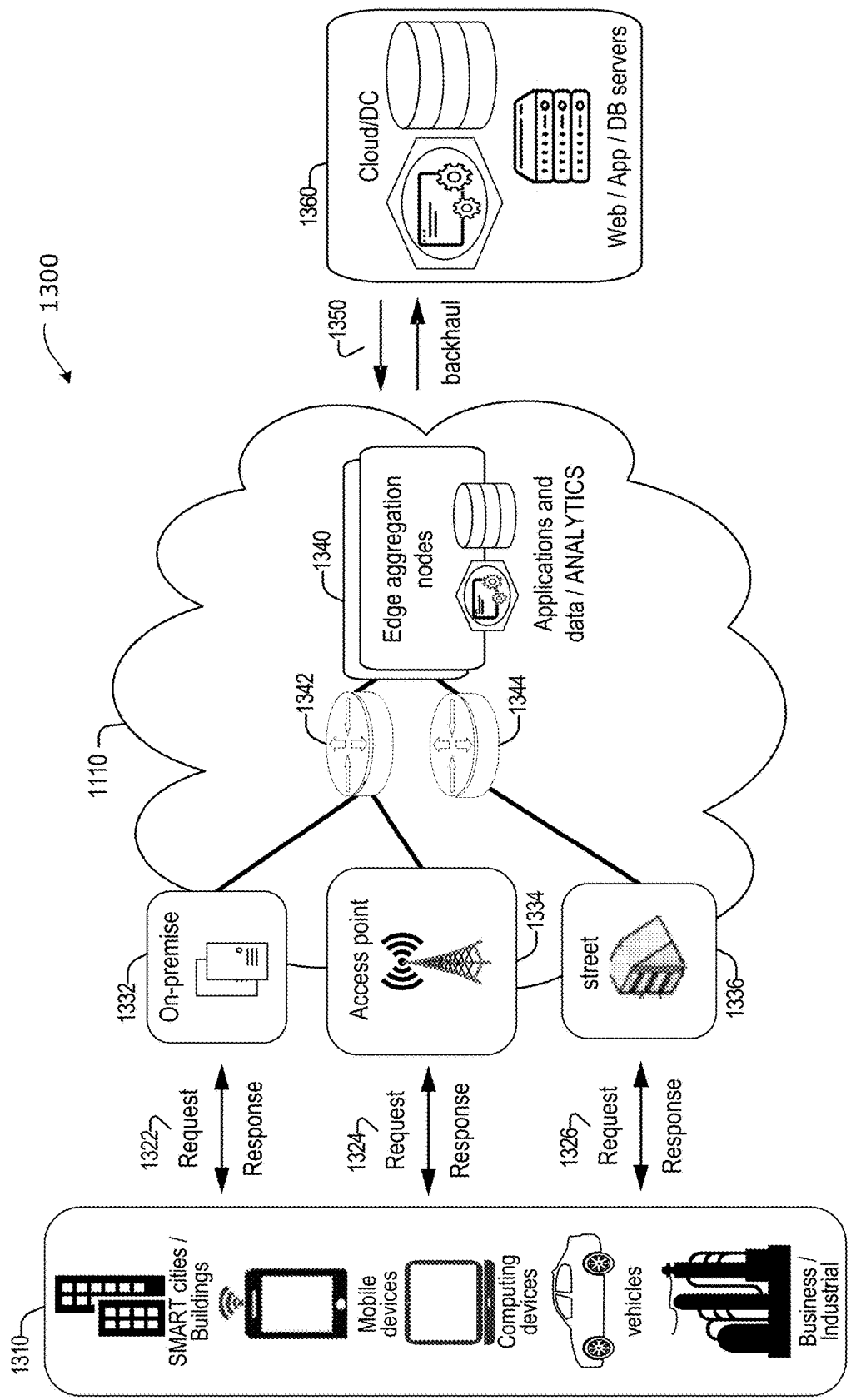
FIG. 13 illustrates an example approach for networking and services in an edge computing system.

In FIG. 13, various client endpoints 1310 (in the form of mobile devices, computers, autonomous vehicles, business computing equipment, industrial processing equipment) exchange requests and responses that are specific to the type of endpoint network aggregation. For instance, client endpoints 1310 may obtain network access via a wired broadband network, by exchanging requests and responses 1322 through an on-premise network system 1332. Some client endpoints 1310, such as mobile computing devices, may obtain network access via a wireless broadband network, by exchanging requests and responses 1324 through an access point (e.g., cellular network tower) 1334. Some client endpoints 1310, such as autonomous vehicles may obtain network access for requests and responses 1326 via a wireless vehicular network through a street-located network system 1336. However, regardless of the type of network access, the TSP may deploy aggregation points 1342, 1344 within the edge cloud 1110 to aggregate traffic and requests. Thus, within the edge cloud 1110, the TSP may deploy various compute and storage resources, such as at edge aggregation nodes 1340, to provide requested content. The edge aggregation nodes 1340 and other systems of the edge cloud 1110 are connected to a cloud or data center 1360, which uses a backhaul network 1350 to fulfill higher-latency requests from a cloud/data center for websites, applications, database servers, etc. Additional or consolidated instances of the edge aggregation nodes 1340 and the aggregation points 1342, 1344, including those deployed on a single server framework, may also be present within the edge cloud 1110 or other areas of the TSP infrastructure.

Figure 14:
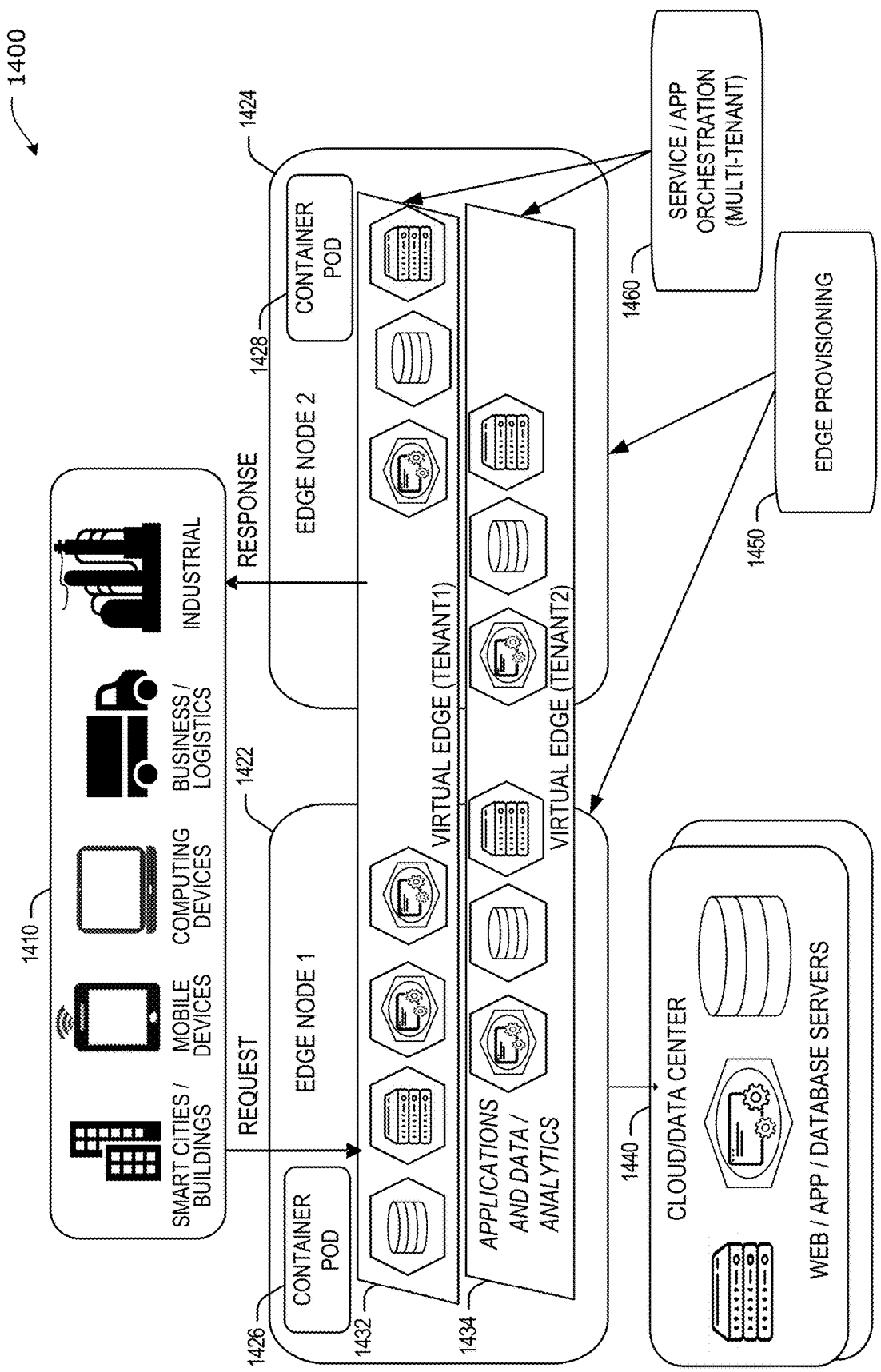
FIG. 14 illustrates deployment of a virtual edge configuration in an edge computing system operated among multiple edge nodes and multiple tenants.

FIG. 14 illustrates deployment and orchestration for virtualized and container-based edge configurations across an edge computing system operated among multiple edge nodes and multiple tenants (e.g., users, providers) which use such edge nodes. Specifically, FIG. 14 depicts coordination of a first edge node 1422 and a second edge node 1424 in an edge computing system 1400, to fulfill requests and responses for various client endpoints 1410 (e.g., smart cities/building systems, mobile devices, computing devices, business/logistics systems, industrial systems, etc.), which access various virtual edge instances. Here, the virtual edge instances 1432, 1434 provide edge compute capabilities and processing in an edge cloud, with access to a cloud/data center 1440 for higher-latency requests for websites, applications, database servers, etc. However, the edge cloud enables coordination of processing among multiple edge nodes for multiple tenants or entities.

In FIG. 14, these virtual edge instances include: a first virtual edge 1432, offered to a first tenant (Tenant 1), which offers a first combination of edge storage, computing, and services; and a second virtual edge 1434, offering a second combination of edge storage, computing, and services. The virtual edge instances 1432, 1434 are distributed among the edge nodes 1422, 1424, and may include scenarios in which a request and response are fulfilled from the same or different edge nodes. The configuration of the edge nodes 1422, 1424 to operate in a distributed yet coordinated fashion occurs based on edge provisioning functions 1450. The functionality of the edge nodes 1422, 1424 to provide coordinated operation for applications and services, among multiple tenants, occurs based on orchestration functions 1460.

Some of the devices in 1410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1422, 1424 may operate as security feature enforcement points for local resources allocated to multiple tenants per node. Additionally, tenant runtime and application execution (e.g., in instances 1432, 1434) may serve as an enforcement point for a security feature that creates a virtual edge abstraction of resources spanning potentially multiple physical hosting platforms. Finally, the orchestration functions 1460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 1410, 1422, and 1440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 14. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 1422, 1424 may implement the use of containers, such as with the use of a container "pod" 1426, 1428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1432, 1434 are partitioned according to the needs of each container.

With the use of container pods, a pod controller oversees the partitioning and allocation of containers and resources. The pod controller receives instructions from an orchestrator (e.g., orchestrator 1460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 15:
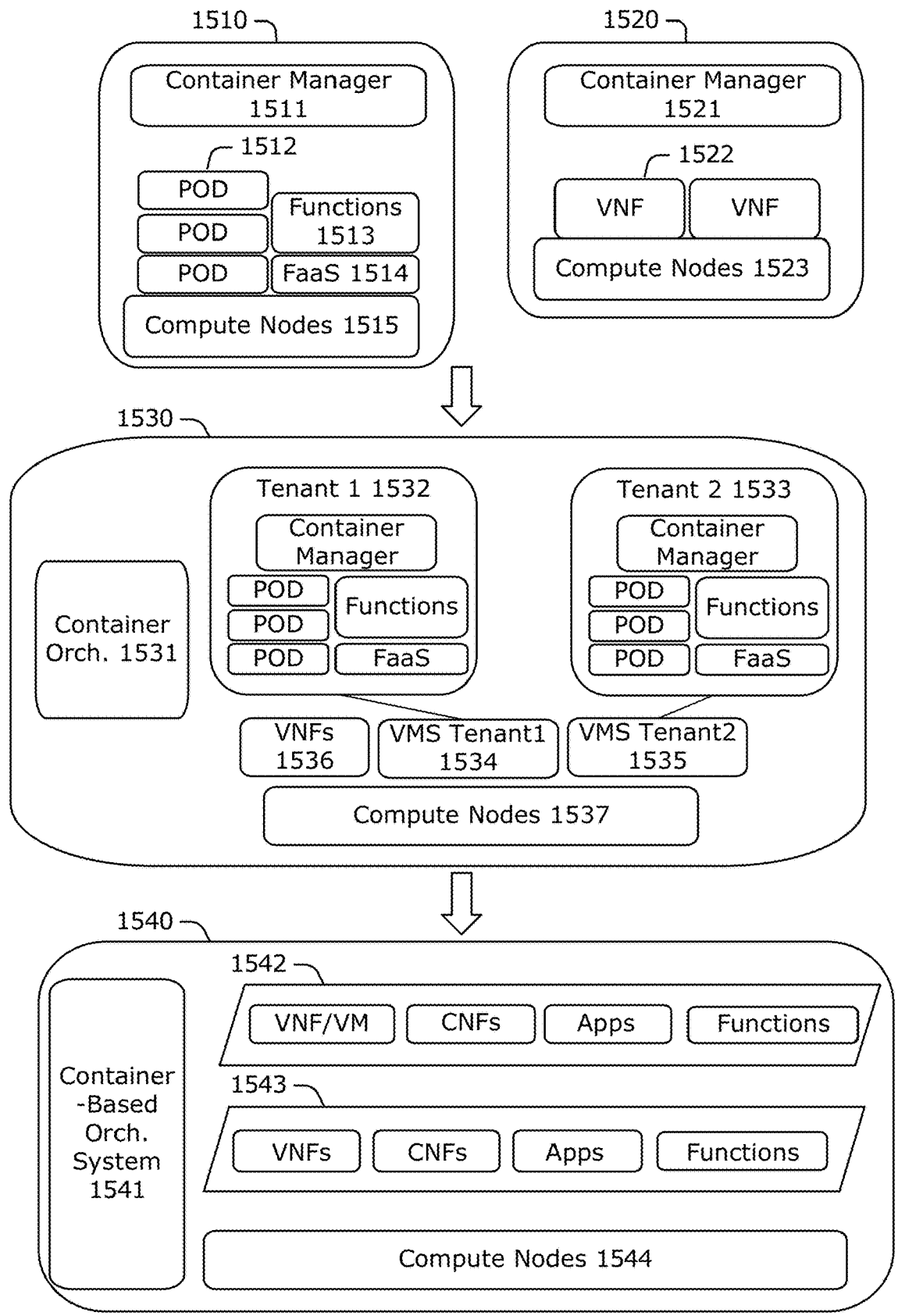
FIG. 15 illustrates various compute arrangements deploying containers in an edge computing system.

FIG. 15 illustrates additional compute arrangements deploying containers in an edge computing system. As a simplified example, system arrangements 1510, 1520 depict settings in which a pod controller (e.g., container managers 1511, 1521, and container orchestrator 1531) is adapted to launch containerized pods, functions, and functions-as-a-service instances through execution via compute nodes (1515 in arrangement 1510), or to separately execute containerized virtualized network functions through execution via compute nodes (1523 in arrangement 1520). This arrangement is adapted for use of multiple tenants in system arrangement 1530 (using compute nodes 1537), where containerized pods (e.g., pods 1512), functions (e.g., functions 1513, VNFs 1522, 1536), and functions-as-a-service instances (e.g., FaaS instance 1514) are launched within virtual machines (e.g., VMs 1534, 1535 for tenants 1532, 1533) specific to respective tenants (aside the execution of virtualized network functions). This arrangement is further adapted for use in system arrangement 1540, which provides containers 1542, 1543, or execution of the various functions, applications, and functions on compute nodes 1544, as coordinated by an container-based orchestration system 1541.

The system arrangements of depicted in FIG. 15 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 15, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 16:
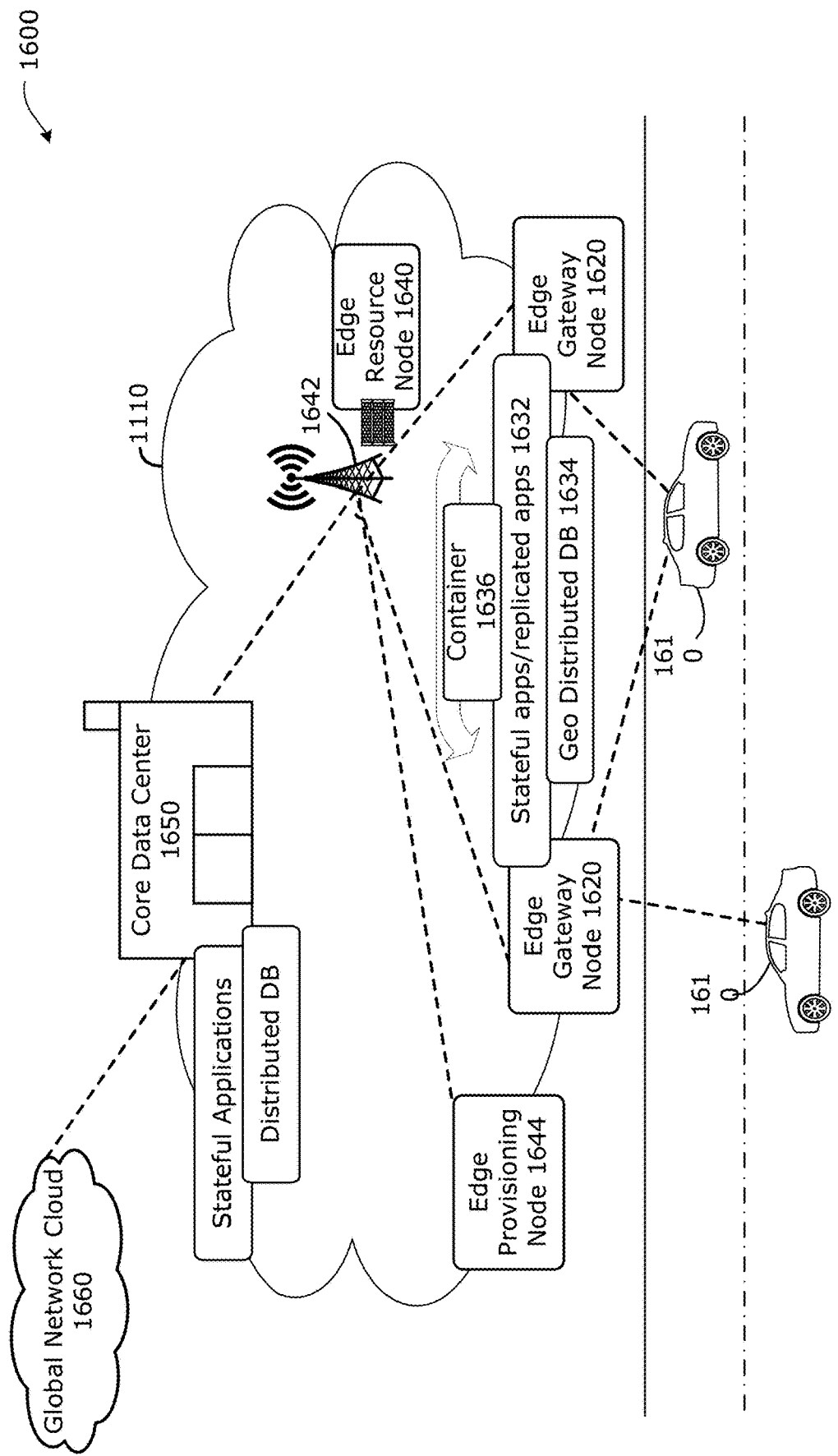
FIG. 16 illustrates a compute and communication use case involving mobile access to applications in an edge computing system.

The edge computing systems and arrangements discussed herein may be applicable in various solutions, services, and/or use cases involving mobility. FIG. 16 shows vehicle compute and communication use case involving mobile access to applications in an edge computing system 1600 that implements an edge cloud 1110. In this use case, respective client compute nodes 1610 may be embodied as in-vehicle compute systems (e.g., in-vehicle navigation and/or infotainment systems) located in corresponding vehicles which communicate with the edge gateway nodes 1620 during traversal of a roadway. For instance, the edge gateway nodes 1620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 1610 and a particular edge gateway device 1620 may propagate so as to maintain a consistent connection and context for the client compute node 1610. Likewise, mobile edge nodes may aggregate at the high priority services or according to the throughput or latency resolution requirements for the underlying service(s) (e.g., in the case of drones). The respective edge gateway devices 1620 include an amount of processing and storage capabilities and, as such, some processing and/or storage of data for the client compute nodes 1610 may be performed on one or more of the edge gateway devices 1620.

The edge gateway devices 1620 may communicate with one or more edge resource nodes 1640, which are illustratively embodied as compute servers, appliances or components located at or in a network access node (NAN) 1642 (e.g., a base station of a cellular network). As discussed above, the respective edge resource nodes 1640 include an amount of processing and storage capabilities and, as such, some processing and/or storage of data for the client compute nodes 1610 may be performed on the edge resource node 1640. For example, the processing of data that is less urgent or important may be performed by the edge resource node 1640, while the processing of data that is of a higher urgency or importance may be performed by the edge gateway devices 1620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 1640 also communicate with the core data center 1650, which may include compute servers, appliances, and/or other components located in a central location (e.g., a central office of a cellular communication network). The core data center 1650 may provide a gateway to the global network cloud 1660 (e.g., the Internet) for the edge cloud 1110 operations formed by the edge resource node(s) 1640 and the edge gateway devices 1620. Additionally, in some examples, the core data center 1650 may include an amount of processing and storage capabilities and, as such, some processing and/or storage of data for the client compute devices may be performed on the core data center 1650 (e.g., processing of low urgency or importance, or high complexity).

The edge gateway nodes 1620 or the edge resource nodes 1640 may offer the use of stateful applications 1632 and a geographic distributed database 1634. Although the applications 1632 and database 1634 are illustrated as being horizontally distributed at a layer of the edge cloud 1110, it will be understood that resources, services, or other components of the application may be vertically distributed throughout the edge cloud (including, part of the application executed at the client compute node 1610, other parts at the edge gateway nodes 1620 or the edge resource nodes 1640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 1636 (or pod of containers) may be flexibly migrated from an edge node 1620 to other edge nodes (e.g., 1620, 1640, etc.) such that the container with an application and workload does not need to be reconstituted, re-compiled, re-interpreted in order for migration to work. However, in such settings, there may be some remedial or "swizzling" translation operations applied. For example, the physical hardware at node 1640 may differ from edge gateway node 1620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 16 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 1620, some others at the edge resource node 1640, and others in the core data center 1650 or global network cloud 1660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 1600 can include or be in communication with an edge provisioning node 1644. The edge provisioning node 1644 can distribute software such as the example computer readable instructions 2682 of FIG. 26, to various receiving parties for implementing any of the methods described herein. The example edge provisioning node 1644 may be implemented by any computer server, home server, content delivery network, virtual server, software distribution system, central facility, storage device, storage disk, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 1644. For example, the entity that owns and/or operates the edge provisioning node 1644 may be a developer, a seller, and/or a licensor (or a customer and/or consumer thereof) of software instructions such as the example computer readable instructions 2682 of FIG. 26. The receiving parties may be consumers, service providers, users, retailers, OEMs, etc., who purchase and/or license the software instructions for use and/or re-sale and/or sub-licensing.

In an example, edge provisioning node 1644 includes one or more servers and one or more storage devices/disks. The storage devices and/or storage disks host computer readable instructions such as the example computer readable instructions 2682 of FIG. 26, as described below. Similarly to edge gateway devices 1620 described above, the one or more servers of the edge provisioning node 1644 are in communication with a NAN 1642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 2682 from the edge provisioning node 1644. For example, the software instructions, which may correspond to the example computer readable instructions 2682 of FIG. 26, may be downloaded to the example processor platform/s, which is to execute the computer readable instructions 2682 to implement the methods described herein.

In some examples, the processor platform(s) that execute the computer readable instructions 2682 can be physically located in different geographic locations, legal jurisdictions, etc. In some examples, one or more servers of the edge provisioning node 1644 periodically offer, transmit, and/or force updates to the software instructions (e.g., the example computer readable instructions 2682 of FIG. 26) to ensure improvements, patches, updates, etc. are distributed and applied to the software instructions implemented at the end user devices. In some examples, different components of the computer readable instructions 2682 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

3.1. Multi-Access Edge Computing (MEC)

Figure 17:
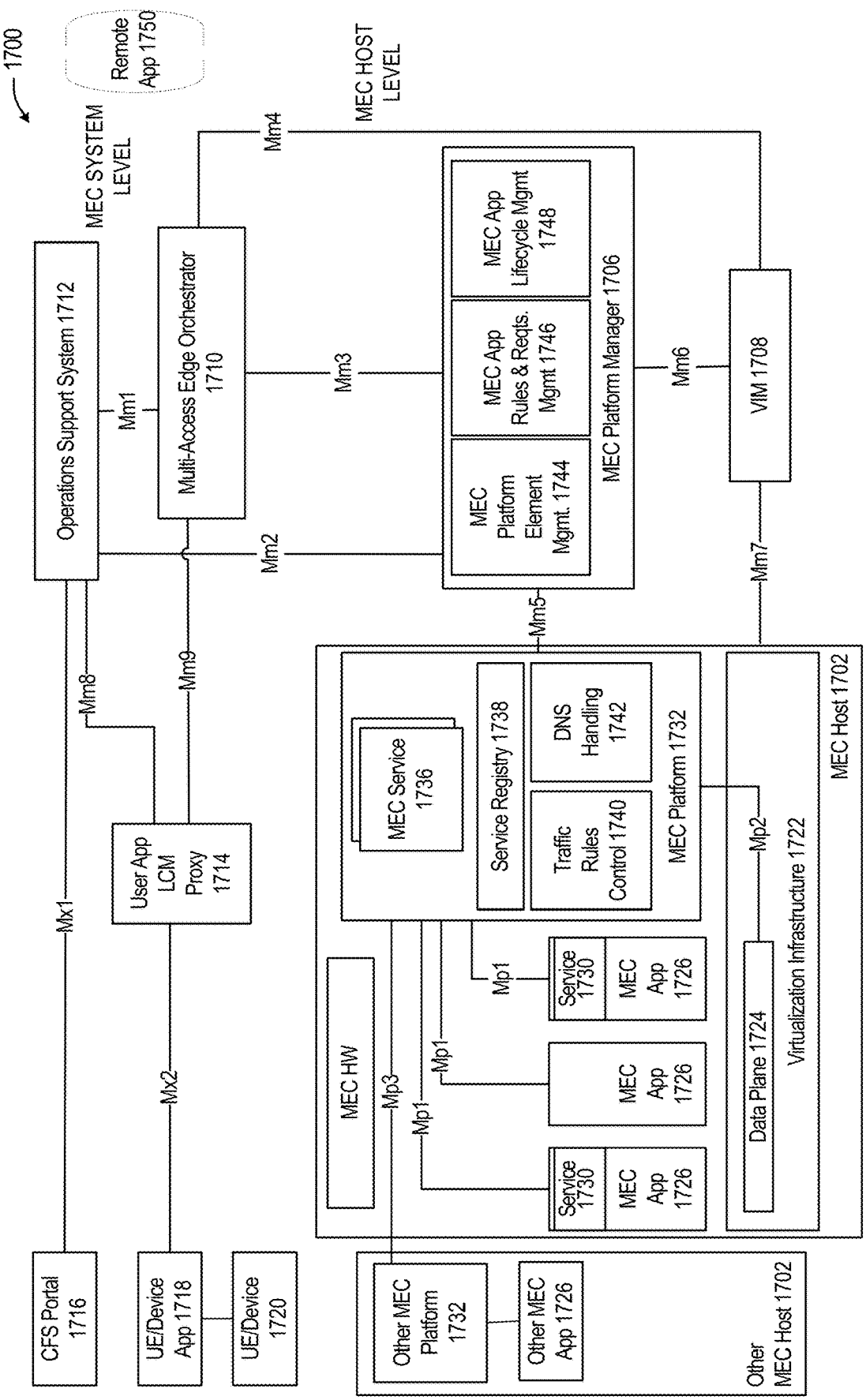
FIG. 17 illustrates a MEC system reference architecture.

FIG. 17 illustrates a MEC system reference architecture (or MEC architecture) 1700 providing functionalities in accordance with ETSI GS MEC 003 v2.1.1 (2019 January) ("[MEC003]"); ETSI GS MEC 009 V2.1.1 (2019 January) ("[MEC009]"); ETSI GS MEC 010-1 V1.1.1 (2017 October) ("[MEC010-1]"); ETSI GS MEC 010-2 V2.1.1 (2019 November) ("[MEC010-2]"); ETSI GS MEC 011 V1.1.1 (2017 July) ("[MEC011]"); ETSI GS MEC 012 V2.1.1 (2019 December) ("[MEC012]"); ETSI GS MEC 013 v2.1.1 (2019 September) ("[MEC013]"); ETSI GS MEC 014 V1.1.1 (2018 February) ("[MEC014]"); ETSI GS MEC 015 v2.1.1 (2020 June) ("[MEC015]"); ETSI GS MEC 028 v2.1.1 (2020 July) ("[MEC028]"); ETSI GS MEC 029 v2.1.1 (2019 July) ("[MEC029]"); ETSI MEC GS 030 v2.1.1 (2020 April) ("[MEC030]"); ETSI GS MEC 040 ("[MEC040]"); among many other ETSI MEC standards. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X need to exchange data, provide data to aggregation points and access to data in databases which provide an overview of the local situation derived from a multitude of sensors (by various cars, roadside units, etc.).

The MEC architecture 1700 includes MEC hosts 1702, a virtualization infrastructure manager (VIM) 1708, an MEC platform manager 1706, an MEC orchestrator 1710, an operations support system (OSS) 1712, a user app proxy 1714, a UE app 1718 running on UE 1720, and CFS portal 1716. The MEC host 1702 can include a MEC platform 1732 with filtering rules control component 1740, a DNS handling component 1742, a service registry 1738, and MEC services 1736. The MEC services 1736 can include at least one scheduler, which can be used to select resources for instantiating MEC apps (or Virtual Network Functions (NFVs)) 1726 upon virtualization infrastructure (VI) 1722. The MEC apps 1726 can be configured to provide services 1730, which can include processing network communications traffic of different types associated with one or more wireless connections (e.g., connections to one or more RANs or core network functions) and/or some other services such as those discussed herein. The other MEC host 1702 may have a same or similar configuration/implementation as the MEC host 1702, and the other MEC app 1726 instantiated within other MEC host 1702 can be similar to the MEC apps 1726 instantiated within MEC host 1702. The VI 17 22 includes a data plane 1724 coupled to the MEC platform 1722 via an MP2 interface. Additional interfaces between various network entities of the MEC architecture 1700 are illustrated in FIG. 17.

The MEC system 1700 includes three groups of reference points, including "Mp" reference points regarding the MEC platform functionality; "Mm" reference points, which are management reference points; and "Mx" reference points, which connect MEC entities to external entities. The interfaces/reference points in the MEC system 1700 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 1700 may be access-agnostic and not dependent on a particular deployment. MEC enables implementation of MEC apps 1726 as software-only entities that run on top of a VI 1722, which is located in or close to the network edge. A MEC app 1726 is an application that can be instantiated on a MEC host 1702 within the MEC system 1700 and can potentially provide or consume MEC services 1736.

The MEC entities depicted by FIG. 17 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE 1720, and is discussed in more detail infra. The MEC host level includes one or more MEC hosts 1702, 1704 and MEC management entities, which provide functionality to run MEC Apps 1726 within an operator network or a subset of an operator network. The MEC management entities include various components that handle the management of the MEC-specific functionality of a particular MEC platform 1732, MEC host 1702, and the MEC Apps 1726 to be run.

The MEC platform manager 1706 is a MEC management entity including MEC platform element management component 1744, MEC app rules and requirements management component 1746, and MEC app lifecycle management component 1748. The various entities within the MEC architecture 1700 can perform functionalities as discussed in [MEC003]. The remote app 1750 is configured to communicate with the MEC host 1702 (e.g., with the MEC apps 1726) via the MEC orchestrator 1710 and the MEC platform manager 1706.

The MEC host 1702 is an entity that contains an MEC platform 1732 and VI 1722 which provides compute, storage, and network resources for the purpose of running MEC Apps 1726. The VI 1722 includes a data plane (DP) 1724 that executes traffic rules 1740 received by the MEC platform 1732, and routes the traffic among MEC Apps 1726, MEC services 1736, DNS server/proxy (see e.g., via DNS handling entity 1742), 3GPP network, local networks, and external networks. The MEC DP 1724 may be connected with the (R)AN nodes and the 3GPP core network, and/or may be connected with an access point via a wider network, such as the internet, an enterprise network, or the like.

The MEC platform 1732 is a collection of essential functionality required to run MEC Apps 1726 on a particular VI 1722 and enable them to provide and consume MEC services 1736, and that can provide itself a number of MEC services 937a. The MEC platform 1732 can also provide various services and/or functions, such as offering an environment where the MEC Apps 1726 can discover, advertise, consume and offer MEC services 1736 (discussed infra), including MEC services 1736 available via other platforms when supported. The MEC platform 1732 may be able to allow authorized MEC Apps 1726 to communicate with third party servers located in external networks. The MEC platform 1732 may receive traffic rules from the MEC platform manager 1706, applications, or services, and instruct the data plane accordingly (see e.g., Traffic Rules Control 1740). The MEC platform 1732 may send instructions to the DP 1724 within the VI 1722 via the Mp2 reference point. The Mp2 reference point between the MEC platform 1732 and the DP 1724 of the VI 1722 may be used to instruct the DP 1734 on how to route traffic among applications, networks, services, etc. The MEC platform 1732 may translate tokens representing UEs 1720 in the traffic rules into specific IP addresses. The MEC platform 1732 also receives DNS records from the MEC platform manager 1706 and configures a DNS proxy/server accordingly. The MEC platform 1732 hosts MEC services 1736 including the multi-access edge services discussed infra, and provide access to persistent storage and time of day information. Furthermore, the MEC platform 1732 may communicate with other MEC platforms 1732 of other MEC servers 1702 via the Mp3 reference point.

The VI 1722 represents the totality of all hardware and software components which build up the environment in which MEC Apps 1726 and/or MEC platform 1732 are deployed, managed and executed. The VI 1722 may span across several locations, and the network providing connectivity between these locations is regarded to be part of the VI 1722. The physical hardware resources of the VI 1722 includes computing, storage and network resources that provide processing, storage and connectivity to MEC Apps 1726 and/or MEC platform 1732 through a virtualization layer (e.g., a hypervisor, VM monitor (VMM), or the like).

The virtualization layer may abstract and/or logically partition the physical hardware resources of the MEC server 1702 as a hardware abstraction layer. The virtualization layer may also enable the software that implements the MEC Apps 1726 and/or MEC platform 1732 to use the underlying VI 1722, and may provide virtualized resources to the MEC Apps 1726 and/or MEC platform 1732, so that the MEC Apps 1726 and/or MEC platform 1732 can be executed.

The MEC Apps 1726 are applications that can be instantiated on a MEC host/server 1702 within the MEC system 1700 and can potentially provide or consume MEC services 1736. The term "MEC service" refers to a service provided via a MEC platform 1732 either by the MEC platform 1732 itself or by a MEC App 1726. MEC Apps 1726 may run as VM on top of the VI 1722 provided by the MEC server 1702, and can interact with the MEC platform 1732 to consume and provide the MEC services 1736. The Mp1 reference point between the MEC platform 1732 and the MEC Apps 1726 is used for consuming and providing service specific functionality. Mp1 provides service registration 1738, service discovery, and communication support for various services, such as the MEC services 1736 provided by MEC host 1702. Mp1 may also provide application availability, session state relocation support procedures, traffic rules and DNS rules activation, access to persistent storage and time of day information, and/or the like.

The MEC Apps 1726 are instantiated on the VI 1722 of the MEC server 1702 based on configuration or requests validated by the MEC management (e.g., MEC platform manager 1706). The MEC Apps 1726 can also interact with the MEC platform 1732 to perform certain support procedures related to the lifecycle of the MEC Apps 1726, such as indicating availability, preparing relocation of user state, etc. The MEC Apps 1726 may have a certain number of rules and requirements associated to them, such as required resources, maximum latency, required or useful services, etc. These requirements may be validated by the MEC management, and can be assigned to default values if missing. MEC services 1736 are services provided and/or consumed either by the MEC platform 1732 and/or MEC Apps 1726. The service consumers (e.g., MEC Apps 1726 and/or MEC platform 1732) may communicate with particular MEC services 1736 over individual APIs (including the various MEC APIs discussed herein). When provided by an application, a MEC service 1736 can be registered in a list of services in the service registries 1738 to the MEC platform 1732 over the Mp1 reference point. Additionally, a MEC App 1726 can subscribe to one or more services 1730/1736 for which it is authorized over the Mp1 reference point.

Communication between applications and services in the MEC server is designed according to the principles of Service-oriented Architecture (SOA). The communication services allow applications hosted on a single MEC server to communicate with the application-platform services through well-defined APIs and with each other through a service-specific API. The service registry 1738 provides visibility of the services available on the MEC server 1702. The service registry 1738 uses the concept of loose coupling of services, providing flexibility in application deployment. In addition, the service registry presents service availability (status of the service) together with the related interfaces and versions. It is used by applications to discover and locate the end-points for the services they require, and to publish their own service end-point for other applications to use. The access to the service registry 1738 is controlled (authenticated and authorized). Additionally or alternatively, for the communication services, a lightweight broker-based 'publish and subscribe' messaging protocol is used. The 'publish and subscribe' capability provides one-to-many message distribution and application decoupling. Subscription and publishing by applications are access controlled (authenticated and authorized). The messaging transport should be agnostic to the content of the payload. Mechanisms should be provided to protect against malicious or misbehaving applications.

Examples of MEC services 1736 include the VIS, RNIS [MEC012], LS [MEC013], UE ID Services [MEC014], BWMS [MEC015], WAIS [MEC028], FAIS [MEC029], and/or other MEC services. The RNIS, when available, provides authorized MEC Apps 1726 with radio network related information, and expose appropriate up-to-date radio network information to the MEC Apps 1726. The RNI may include, inter alia, radio network conditions, measurement and statistics information related to the user plane, information related to UEs 1720 served by the radio node(s) associated with the MEC host 1702 (e.g., UE context and radio access bearers), changes on information related to UEs 1720 served by the radio node(s) associated with the MEC host 1702, and/or the like. The RNI may be provided at the relevant granularity (e.g., per UE 1720, per cell, per period of time).

The service consumers (e.g., MEC Apps 1726, MEC platform 1732, etc.) may communicate with the RNIS over an RNI API to obtain contextual information from a corresponding RAN. RNI may be provided to the service consumers via a NAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 1732 (not shown). A MEC App 1726 may query information on a message broker via a transport information query procedure, wherein the transport information may be pre-provisioned to the MEC App 1726 via a suitable configuration mechanism. The various messages communicated via the RNI API may be in XML, JSON, Protobuf, or some other suitable format.

The VIS provides supports various V2X applications. The RNI may be used by MEC Apps 1726 and MEC platform 1732 to optimize the existing services and to provide new types of services that are based on up to date information on radio conditions. As an example, a MEC App 1726 may use RNI to optimize current services such as video throughput guidance. In throughput guidance, a radio analytics MEC App 1726 may use MEC services to provide a backend video server with a near real-time indication on the throughput estimated to be available at the radio DL interface in a next time instant. The throughput guidance radio analytics application computes throughput guidance based on the required radio network information it obtains from a multi-access edge service running on the MEC server 1702. RNI may be also used by the MEC platform 1732 to optimize the mobility procedures required to support service continuity, such as when a certain MEC App 1726 requests a single piece of information using a simple request-response model (e.g., using RESTful mechanisms) while other MEC Apps 1726 subscribe to multiple different notifications regarding information changes (e.g., using a pub/sub mechanism and/or message broker mechanisms).

The LS, when available, may provide authorized MEC Apps 1726 with location-related information, and expose such information to the MEC Apps 1726. With location related information, the MEC platform 1732 or one or more MEC Apps 1726 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 1720 currently served by the radio node(s) associated with the MEC server 1702, information about the location of all UEs 1720 currently served by the radio node(s) associated with the MEC host 1702, information about the location of a certain category of UEs 1720 currently served by the radio node(s) associated with the MEC host 1702, a list of UEs 1720 in a particular location, information about the location of all radio nodes currently associated with the MEC host 1702, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 1702, or a subset thereof, according to a desired deployment. In this regard, the OMA Zonal Presence API provides means for MEC Apps 1726 to retrieve information about a zone, the access points associated to the zones and the users that are connected to the access points. In addition, the OMA Zonal Presence API, allows authorized application to subscribe to a notification mechanism, reporting about user activities within a zone. A MEC server 1702 may access location information or zonal presence information of individual UEs 1720 using the OMA Zonal Presence API to identify the relative location or positions of the UEs 1720.

The Traffic Management Service (TMS) allows edge applications to get informed of various traffic management capabilities and multi-access network connection information, and allows edge applications to provide requirements, e.g., delay, throughput, loss, for influencing traffic management operations. In some implementations, the TMS includes Multi-Access Traffic Steering (MTS), which seamlessly performs steering, splitting, and duplication of application data traffic across multiple access network connections. The BWMS provides for the allocation of bandwidth to certain traffic routed to and from MEC Apps 1726, and specify static/dynamic up/down bandwidth resources, including bandwidth size and bandwidth priority. MEC Apps 1726 may use the BWMS to update/receive bandwidth information to/from the MEC platform 1732. Different MEC Apps 1726 running in parallel on the same MEC server 1702 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism.

The purpose of the UE Identity feature is to allow UE specific traffic rules in the MEC system 1700. When the MEC system 1700 supports the UE Identity feature, the MEC platform 1732 provides the functionality (e.g., UE Identity API) for a MEC App 1726 to register a tag representing a UE 1720 or a list of tags representing respective UEs 1720. Each tag is mapped into a specific UE 1720 in the MNO's system, and the MEC platform 1732 is provided with the mapping information. The UE Identity tag registration triggers the MEC platform 1732 to activate the corresponding traffic rule(s) 1740 linked to the tag. The MEC platform 1732 also provides the functionality (e.g., UE Identity API) for a MEC App 1726 to invoke a de-registration procedure to disable or otherwise stop using the traffic rule for that user.

The WAIS is a service that provides WLAN access related information to service consumers within the MEC System 1700. The WAIS is available for authorized MEC Apps 1726 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 1700. The FAIS is available for the authorized MEC Apps 1726 and is discovered over the Mp1 reference point. The FAI may be used by MEC Apps 1726 and the MEC platform 1732 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 1726 and the MEC platform 1732 may consume the FAIS; and both the MEC platform 1732 and the MEC Apps 1726 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 1706 and the VI manager (VIM) 1708, and handles the management of MEC-specific functionality of a particular MEC server 1702 and the applications running on it. In some implementations, some or all of the multi-access edge management components may be implemented by one or more servers located in one or more data centers, and may use virtualization infrastructure that is connected with Network Function Virtualization (NFV) infrastructure used to virtualize Network Functions (NFs), or using the same hardware as the NFV infrastructure.

The MEC platform manager 1706 is responsible for managing the life cycle of applications including informing the multi-access edge orchestrator (MEO) 1710 of relevant application related events. The MEC platform manager 1706 may also provide MEC Platform Element management functions 1744 to the MEC platform 1732, manage MEC App rules and requirements 1746 including service authorizations, traffic rules, DNS configuration and resolving conflicts, and manage MEC App lifecycles mgmt 1748. The MEC platform manager 1706 may also receive virtualized resources, fault reports, and performance measurements from the VIM 1708 for further processing. The Mm5 reference point between the MEC platform manager 1706 and the MEC platform 1732 is used to perform platform configuration, configuration of the MEC Platform element mgmt 1744, MEC App rules and reqts 1746, MEC App lifecycles mgmt 1748, and management of application relocation.

The VIM 1708 may be an entity that allocates, manages and releases virtualized (compute, storage and networking) resources of the VI 1722, and prepares the VI 1722 to run a software image. To do so, the VIM 1708 may communicate with the VI 1722 over the Mm7 reference point between the VIM 1708 and the VI 1722. Preparing the VI 1722 may include configuring the VI 1722, and receiving/storing the software image. When supported, the VIM 1708 may provide rapid provisioning of applications, such as described in "Openstack++ for Cloudlet Deployments", available at http://reports-archive.adm.cs.cmu.edu/anon/2015/CMU-CS-15-123.pdf. The VIM 1708 may also collect and report performance and fault information about the virtualized resources, and perform application relocation when supported. For application relocation from/to external cloud environments, the VIM 1708 may interact with an external cloud manager to perform the application relocation, for example using the mechanism described in "Adaptive VM Handoff Across Cloudlets", and/or possibly through a proxy. Furthermore, the VIM 1708 may communicate with the MEC platform manager 1706 via the Mm6 reference point, which may be used to manage virtualized resources, for example, to realize the application lifecycle management. Moreover, the VIM 1708 may communicate with the MEC-O 1710 via the Mm4 reference point, which may be used to manage virtualized resources of the MEC server 1702, and to manage application images. Managing the virtualized resources may include tracking available resource capacity, etc.

The MEC system level management includes the MEC-O 1710, which has an overview of the complete MEC system 1700. The MEC-O 1710 may maintain an overall view of the MEC system 1700 based on deployed MEC hosts 1702, available resources, available MEC services 1736, and topology. The Mm3 reference point between the MEC-O 1710 and the MEC platform manager 1706 may be used for the management of the application lifecycle, application rules and requirements and keeping track of available MEC services 1736. The MEC-O 1710 may communicate with the user application lifecycle management proxy (UALMP) 1714 via the Mm9 reference point in order to manage MEC Apps 1726 requested by UE app 1718.

The MEC-O 1710 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1708 to handle the applications. The MEC-O 1710 may select appropriate MEC host(s) 901 for application instantiation based on constraints, such as latency, available resources, and available services. The MEC-O 1710 may also trigger application instantiation and termination, as well as trigger application relocation as needed and when supported.

The Operations Support System (OSS) 1712 is the OSS of an operator that receives requests via the Customer Facing Service (CFS) portal 1716 over the Mx1 reference point and from UE apps 1718 for instantiation or termination of MEC Apps 1726. The OSS 1712 decides on the granting of these requests. The CFS portal 1716 (and the Mx1 interface) may be used by third-parties to request the MEC system 1700 to run apps 1718 in the MEC system 1700. Granted requests may be forwarded to the MEC-O 1710 for further processing. When supported, the OSS 1712 also receives requests from UE apps 1718 for relocating applications between external clouds and the MEC system 1700. The Mm2 reference point between the OSS 1712 and the MEC platform manager 1706 is used for the MEC platform manager 1706 configuration, fault and performance management. The Mm1 reference point between the MEC-O 1710 and the OSS 1712 is used for triggering the instantiation and the termination of MEC Apps 1726 in the MEC system 1700.

The UE app(s) 1718 (also referred to as "device applications" or the like) is one or more apps running in a device 1720 that has the capability to interact with the MEC system 1700 via the user application lifecycle management proxy 1714. The UE app(s) 1718 may be, include, or interact with one or more client applications, which in the context of MEC, is application software running on the device 1718 that utilizes functionality provided by one or more specific MEC Apps 1726. The user app LCM proxy 1714 may authorize requests from UE apps 1718 in the UE 1720 and interacts with the OSS 1712 and the MEC-O 1710 for further processing of these requests. The term "lifecycle management," in the context of MEC, refers to a set of functions required to manage the instantiation, maintenance and termination of a MEC App 1726 instance. The user app LCM proxy 1714 may interact with the OSS 1712 via the Mm8 reference point, and is used to handle UE 1718 requests for running applications in the MEC system 1700. A user app may be an MEC App 1726 that is instantiated in the MEC system 1700 in response to a request of a user via an application running in the UE 1720 (e.g., UE App 1718). The user app LCM proxy 1714 allows UE apps 1718 to request on-boarding, instantiation, termination of user applications and when supported, relocation of user applications in and out of the MEC system 1700. It also allows informing the user apps about the state of the user apps. The user app LCM proxy 1714 is only accessible from within the mobile network, and may only be available when supported by the MEC system 1700. A UE app 1718 may use the Mx2 reference point between the user app LCM proxy 1714 and the UE app 1718 to request the MEC system 1700 to run an application in the MEC system 1700, or to move an application in or out of the MEC system 1700. The Mx2 reference point may only be accessible within the mobile network and may only be available when supported by the MEC system 1700.

In order to run an MEC App 1726 in the MEC system 1700, the MEC-O 1710 receives requests triggered by the OSS 1712, a third-party, or a UE app 1718. In response to receipt of such requests, the MEC-O 1710 selects a MEC server/host 1702 to host the MEC App 1726 for computational offloading, etc. These requests may include information about the application to be run, and possibly other information, such as the location where the application needs to be active, other application rules and requirements, as well as the location of the application image if it is not yet on-boarded in the MEC system 1700.

The MEC-O 1710 may select one or more MEC servers 1702 for computational intensive tasks. The selected one or more MEC hosts 1702 may offload computational tasks of a UE app 1718 based on various operational parameters, such as network capabilities and conditions, computational capabilities and conditions, application requirements, and/or other like operational parameters. The application requirements may be rules and requirements associated to/with one or more MEC Apps 1726, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 1726 to be able to run; multi-access edge services that the MEC Apps 1726 can take advantage of, if available; connectivity or mobility support/requirements (e.g., application state relocation, application instance relocation); required multi-access edge features, such as VM relocation support or UE identity; required network connectivity (e.g., connectivity to applications within the MEC system 1700, connectivity to local networks, or to the Internet); information on the operator's MEC system 1700 deployment or mobile network deployment (e.g., topology, cost); requirements on access to user traffic; requirements on persistent storage; traffic rules 1740; DNS rules 1742; etc.

The MEC-O 1710 considers the requirements and information listed above and information on the resources currently available in the MEC system 1700 to select one or several MEC servers 1702 to host MEC Apps 1726 and/or for computational offloading. After one or more MEC hosts 1702 are selected, the MEC-O 1710 requests the selected MEC host(s) 1702 to instantiate the application(s) or application tasks. The actual algorithm used to select the MEC servers 1702 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1710 may decide to select one or more new MEC hosts 1702 to act as a master node, and initiates the transfer of an application instance or application-related state information from the one or more source MEC hosts 1702 to the one or more target MEC hosts 1702.

Additionally or alternatively, MEC system 1700 can be flexibly deployed depending on the use case/vertical segment/information to be processed. Some components of the MEC system 1700 can be co-located with other elements of the system. As an example, in certain use cases (e.g., enterprise), a MEC app 1726 may need to consume a MEC service locally, and it may be efficient to deploy a MEC host locally equipped with the needed set of APIs. In another example, deploying a MEC server 1702 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. In some other aspects, a bandwidth management API may be present both at the access level edge and also in more remote edge locations, in order to set up transport networks (e.g., for CDN-based services).

Additionally or alternatively, MEC system 1700 can be deployed in a Network Function Virtualization (NFV) environment. In these implementations, the MEC platform 1732 is deployed as a VNF and is communicatively connected to a MEC platform manager—NFV via an Mm5 interface, MEC app—VNFs via Mp1 interface(s), a VNF data plane via an Mp2 interface, NFV infrastructure (NFVI) via an Nf-Vn interface, and one or more VNF managers (VNFMs) via Ve-Vnfm-vnf interface(s). The MEC platform 1732 can be communicatively coupled to another MEC platform 1732 via an Mp3 interface. Furthermore, the MEC apps 1726 can appear like VNFs (e.g., MEC app—VNFs) towards ETSI NFV MANO components. This allows re-use of ETSI NFV MANO functionality. The full set of MANO functionality may be unused and certain additional functionality may be needed. The virtualization infrastructure is deployed as an NFVI and its virtualized resources are managed by the VIM 1708. For that purpose, one or more of the procedures defined by ETSI NFV Infrastructure specifications can be used (see e.g., ETSI GS NFV-INF 003 V2.4.1 (2018 February), ETSI GS NFV-INF 004 V2.4.1 (2018 February), ETSI GS NFV-INF 005 V3.2.1 (2019 April), and ETSI GS NFV-IFA 009 V1.1.1 (2016 July) (collectively "[ETSINFV]")). The VNF MEC apps are managed like individual VNFs, allowing that a MEC-in-NFV deployment can delegate certain orchestration and LCM tasks to the NFV orchestrator (NFVO) and VNFMs as defined by ETSI NFV MANO. Various other aspects of the MEC deployment in an NFV environment are discussed in [AD1894-Z] and [MEC003].

Figure 18:
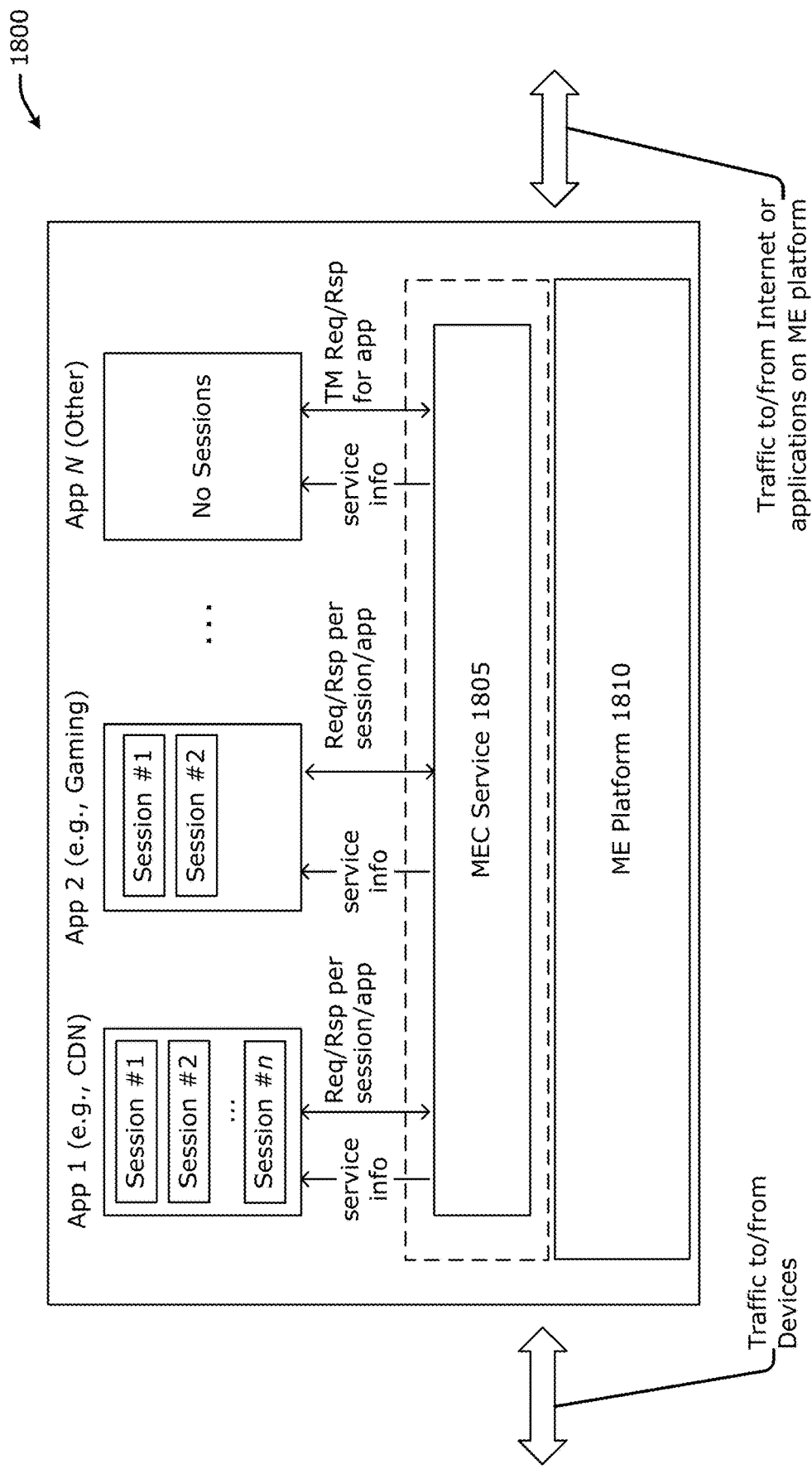
FIG. 18 illustrates an example MEC service architecture.

FIG. 18 illustrates an example MEC service architecture 1800. MEC service architecture 1800 includes the MEC service 1805, ME platform 1810 (corresponding to MEC platform 1832), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 1810) and consumers (e.g., UEs 101, user apps instantiated by individual UEs 1801, other servers/services, network functions, application functions, etc.). Each session represents an interactive information exchange between two or more elements, such as a client-side app and its corresponding server-side app, a user app instantiated by a UE 1801 and a MEC app instantiated by the ME platform 1810, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE 117 and a DN that provides a PDU connectivity service, which is a service that provides for the exchange of PDUs between a UE 117 and a Data Network. Furthermore, each session may be associated with a session identifier (ID) which is data the uniquely identifies a session, and each App (or App instance) may be associated with an App ID (or App instance ID) which is data the uniquely identifies an App (or App instance).

The MEC service 1705 provides one or more MEC services 1736 to MEC service consumers (e.g., Apps 1 to N). The MEC service 1705 may optionally run as part of the platform (e.g., ME platform 1710) or as an application (e.g., ME app). Different Apps 1 to N, whether managing a single instance or several sessions (e.g., CDN), may request specific service info per their requirements for the whole application instance or different requirements per session. The MEC service 1705 may aggregate all the requests and act in a manner that will help optimize the BW usage and improve Quality of Experience (QoE) for applications.

The MEC service 1705 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of [MEC009]). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 1738 in FIG. 17). It includes the scheme ("http" or "https"), host and optional port, and an optional prefix string. For the a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI. The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

3.2. Open Network Edge Services Software (Openness)

OpenNESS is an open source software toolkit to enable easy orchestration of edge services and network functions across diverse network platform(s) and access technologies in multi-cloud environments. "Orchestration" in the context of OpenNESS refers to exposing northbound APIs for Deploying, Managing, Automating the Edge compute cluster and Applications that run on the cluster (e.g., OpenNESS northbound APIs that can be used by Orchestrators like ONAP for managing the OpenNESS edge solution). "Edge services" in the context of OpenNESS refers to the applications that service end-user traffic and Applications that provide services to other Edge compute applications (e.g., CDN is an Edge application that services end-user traffic whereas Transcoding services is an application that provides service to CDN application). "Network platform" in the context of OpenNESS refers to nodes that are deployed in Network or On-Premises edge compute processing, which may be COTS platforms that can host both Applications and VNFs. "Access technologies" in the context of OpenNESS refers to various types of traffic that OpenNESS solution can be handled. They include 5G, LTE (GTP/IP), Wireline (IP), WiFi (IP), and/or the like. "Multi-cloud" and/or "multi-cloud environments" in the context of OpenNESS refers to support in OpenNESS to host multiple Public or Private cloud application on the same node or in the OpenNESS compute cluster. These cloud applications can come from (e.g., Amazon AWS Greengrass, Baidu cloud, etc.).

OpenNESS leverages major industry edge orchestration frameworks, such as Kubernetes and OpenStack, to implement a cloud-native architecture that is multi-platform, multi-access, and multi-cloud. OpenNESS goes beyond these frameworks by providing the ability for applications to publish their presence and capabilities on the platform, and for other applications to subscribe to those services. Services may be very diverse, from providing location and radio network information, to operating a computer vision system that recognize pedestrians and cars, and forwards metadata from those objects to downstream traffic safety applications.

OpenNESS is access network agnostic, as it provides an architecture that interoperates with LTE, 5G, WiFi, and wired networks. In edge computing, dataplane flows must be routed to Edge Nodes with regard to physical location (e.g., proximity to the endpoint, system load on the Edge Node, special hardware requirements). OpenNESS provides APIs that allow network orchestrators and edge computing controllers to configure routing policies in a uniform manner. Because it is an open source platform, OpenNESS enables operators, ISVs, and OSVs to innovate with new technologies and services. Field trials may be run with platforms implemented via OpenNESS, or Microservices and functionality from the OpenNESS platform may be imported into existing third-party products.

OpenNESS is intended for customers/users such as operators to conduct lab/field trials of edge compute in network edge and On-Premises Edge, ISVs, or OSVs to develop edge compute infrastructure solutions that take advantage of the COTS Architecture, and/or application developers who intend to develop applications for the edge, port the applications from public cloud to edge to take advantage of being closer to user.

Figure 19:
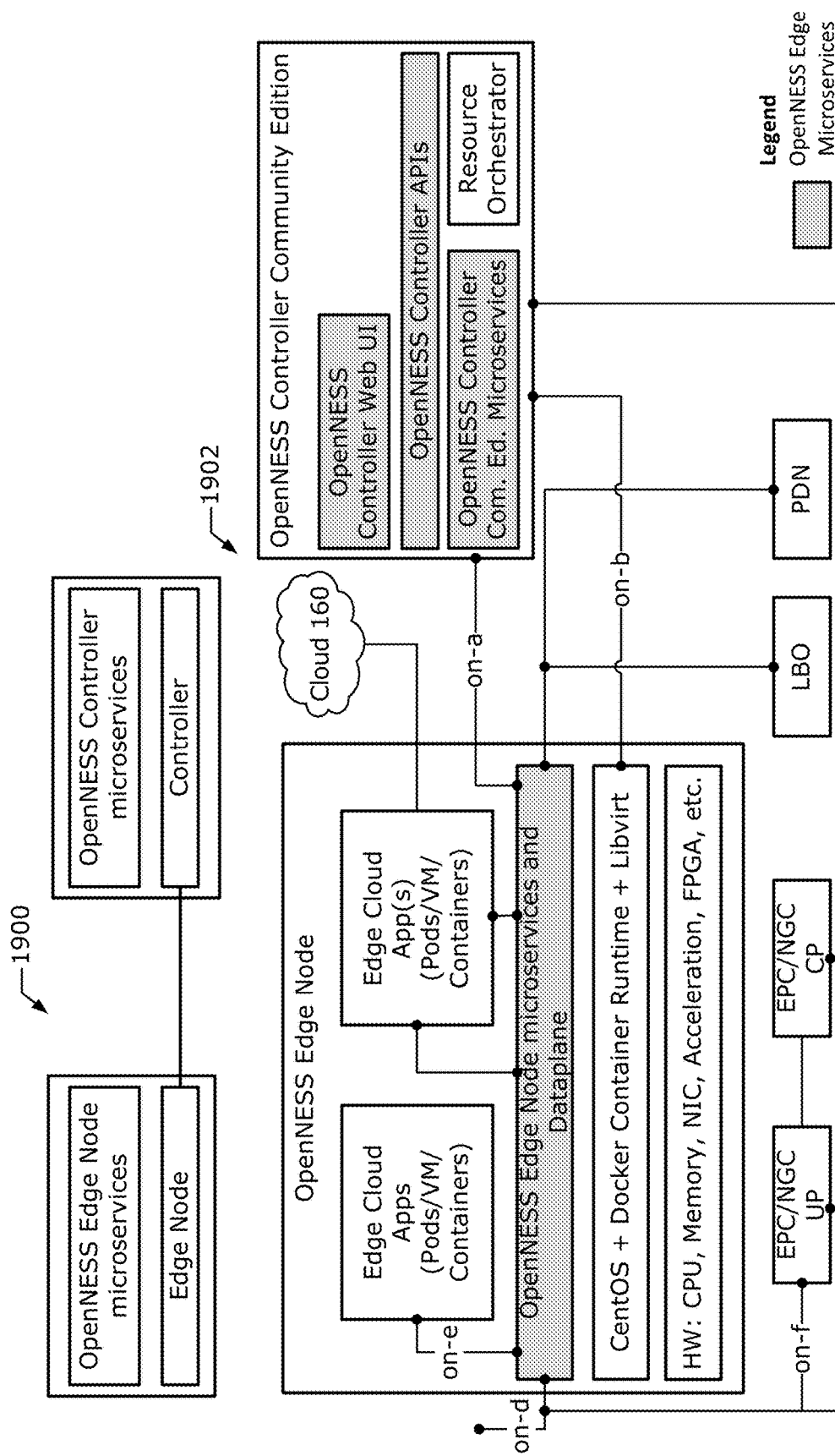
FIG. 19 depicts an Open Network Edge Services Software (OpenNESS) subsystem.

FIG. 19 shows an example OpenNESS subsystem 1900 comprising one or more OpenNESS Edge Nodes and a Controller Node that hosts OpenNESS Controller microservices. The Edge Node hosts a set of OpenNESS Microservices, Edge compute applications, and network functions (NFs). Network Functions (NFs) in the context of OpenNESS refers to Container Networking Functions (CNFs) that enable edge cloud deployment in wireless access, wireline, and WiFi deployments. For example, the 5G UPF (e.g., UPF 548 of FIG. 5) is a CNF that supports steering application traffic towards edge cloud applications (apps), gNBs that serve UEs in 5G NR millimeter wave (mmWave) and/or Sub-6 GHz deployments, etc. The edge cloud apps operate within cloud-based containers, VMs, and/or pods, and may include, for example, AWS Green grass and Baidu edge apps/containers.

OpenNESS Edge Node Microservices address the following functionality: management of application lifecycles; enforcement of DNS and network policies; steering dataplane traffic to Edge Node applications; steering dataplane traffic to local breakout (LBO) hosts that may be attached to the Edge Node; and supporting microservices or enhancements that expose platform capabilities (a.k.a., Enhanced Platform Awareness (EPA)) to the Edge compute applications and NFs.

The Controller, depending on the deployment, either operates the Edge Nodes by invoking the Edge Node APIs or uses the existing orchestrator to manage the Edge Node. The controller exposes APIs to allow network orchestrators to operate the OpenNESS subsystem. OpenNESS microservices could also be integrated in to pre-existing cloud platform hosting edge services. The OpenNESS controller (community edition) manages the OpenNESS edge compute nodes leveraging the existing resource orchestrator.

FIG. 19 also shows an example OpenNESS Architecture 1902 according to various embodiments. The OpenNESS reference edge stack combines the cloud-native and NFV infrastructure optimizations for Virtual machine and Container cloud on COTS Architecture (e.g., CPU, Memory, IO, and Acceleration) from various open-source projects with essential amount of Edge compute specific APIs and network abstraction on to provide a unique and one-stop-shop development solution for edge compute.

The on-a interface comprises Edge Lifecycle Management API(s) and Edge Virtualization Infrastructure API(s). The on-b interface comprises Cloudnative Infrastructure Management (Mgmt) API(s) (API calls) that are used to manage virtualized and/or containerized resources. The on-c interface comprises core network configuration API(s) for edge compute such as, for example, traffic steering request(s) for EPC/5GC control plane and/or the like. The on-d interface comprises UP interface(s) (e.g., S1-U or NG-U), which may be a bump in the wire for LTE/5G access network. The on-e interface comprises Edge app API(s) and Edge app authentication API(s). The on-f interface comprises SGi and IP interfaces that terminate access network and forward edge and non-edge traffic. User traffic is communicated over the on-g interface. The OpenNESS Edge Node microservices and Dataplane is communicatively coupled with local breackout (LBO) and a PDN. The PDN may be the same or similar as PDN 536a of FIG. 5, and the LBO may be the LBO technique discussed herein.

The OpenNESS Controller Community Edition includes a set of microservices that enables existing Edge compute Cloud orchestration and application lifecycle management. These microservices are Web-UI, Controller API back-end and Database. When the OpenNESS Controller interfaces to an existing orchestrator like Kubernetes, it does not duplicate the implementation of lifecycle management and traffic policy APIs of the Containers but it uses the existing Kubernetes APIs to execute lifecycle management and traffic policy tasks. OpenNESS Controller deployment is described in these two modes: OpenNESS Native deployment (OpenNESS deployed using controller which interfaces NFV infrastructure directly (libvirt/docker runtime)); and OpenNESS Infrastructure deployment: OpenNESS deployed using Kubernetes as an orchestrator.

Details of Edge Controller Microservices functionality in Native deployment mode: Web UI front end—Reference HTML5 based web front end for Administrator management of Edge Nodes; User account management—Create administrator and user accounts for Edge Node management; Edge compute application catalogue—Provide capability of adding applications to Controller catalogue; Core Network Configuration—Configure the access network (e.g., LTE/CUPS, 5G) control plane; Edge Node Lifecycle Management—support the Edge Node throughout its deployment lifecycle—Authentication and enrollment of Edge Nodes, Configuration of interfaces and microservices on Edge Nodes, Configuration of traffic policy for the interfaces including Local Breakout (LBO) interface; Edge Application Lifecycle Management—Support applications through their lifecycle—Expose the silicon micro architecture features on CPU, HW Accelerator, Network interface, etc. through Enhanced Platform Awareness (EPA) framework to the applications for lower overhead and high performance execution, Deploy edge compute applications from the image repository, Configure the Edge compute application specific Traffic policy, and Configure the Edge compute application specific DNS policy; Node Feature Discovery (NFD)—Contains two microservices, one on the controller (master) and one on the edge nodes (worker)—NFD workers gets the hardware and software features on the edge node and the information is passed on to the NFD Master on the controller node—This information can be used by the user to deploy the applications to the edge node which meets the specific resource requirement, and ensures reliable performance; Enhanced Platform Awareness—is a subsystem of the application life cycle management that enables users to provide key hardware or software features that needs to be made available to the applications when deployed on the edge node—The user is presented with a key:Value pair to choose from the supported EPA features—NFD when combined with EPA provides a powerful mechanism for achieving application performance reliability; Edge virtualization infrastructure management—Use underlying virtualization infrastructure, whether directly via libvirt or Docker, or indirectly via Kubernetes, to manage the Edge Node platform and applications; and Telemetry—Get basic edge compute microservices telemetry from connected Edge Nodes—The Controller microservices make extensive use of the Go programming language and its runtime libraries.

Details of Edge Controller Microservices functionality in Infrastructure deployment mode: Core Network Configuration—Configure the access network (e.g., LTE/CUPS, 5G) control plane; Telemetry—Get basic edge compute microservices telemetry from connected Edge Nodes; and Microservices and Enhancements for K8s master—Set of microservice as daemon set deployed on Master to enable deployment. E.g. NFD (master), SRI-OV device plugin, etc.

OpenNESS when deployed using Kubernetes supports key features that expose the silicon micro architecture features of the platform to the applications and network functions to achieve better and reliable performance. This will be described in the Enhanced Platform Awareness (EPA) section later in the document.

The OpenNESS Controller addresses the essential functionalities of a multi-access edge orchestrator and MEC Platform manger as defined in the ETSI MEC Framework and Reference Architecture and as discussed herein. In the following discussion, the "OpenNESS Controller Community Edition" will be referred to as "Controller" or "OpenNESS Controller".

The operations and components involved in Edge Application Onboarding is described in two modes: OpenNESS Native deployment; and OpenNESS Infrastructure deployment.

For application onboarding in OpenNESS Native deployment mode, the OpenNESS Controller is used to onboard an application to the OpenNESS Edge Node. OpenNESS support applications that can run in a docker container or Virtual machine. Docker image tar.gz and VM image qcow2 are supported. The image source link needs to be over HTTPS. The image repository can be an external image server or one that can be deployed on the controller. For application onboarding in OpenNESS Infrastructure deployment mode, the OpenNESS users may need to use the Kubernetes Master to onboard and application to the OpenNESS Edge Node. OpenNESS support applications that can run in a docker container (Docker image tar.gz). The image source can be a docker registry or HTTPS image repository. The image repository can be an external image server or one that can be deployed on the controller.

The OpenNESS Edge Node hosts a set of microservices ("Edge Node Microservices") to enable Edge compute deployment. The type of OpenNESS microservices deployed on the Edge Node depends on the type of deployment—OpenNESS Infrastructure deployment or OpenNESS Native deployment. This is similar to OpenNESS controller deployment types described above.

For Edge Node Microservices in OpenNESS Native deployment mode include Edge Lifecycle Agent (ELA), Edge virtualization Agent (EVA), Edge Application Agent (EAA), Syslog, DNS Server and Open Virtual Network (OVN)/Open Virtual Switch (OVS)-DPDK dataplane or optionally NTS Dataplane.

OpenNESS Edge Node microservices implement functionality to enable execution of edge compute applications natively on the Edge Node or forward the user traffic to applications running on platforms connected to the Edge Node on a Local Breakout.

The Edge Node Microservices includes the following functionality: Edge Node Enrollment, Edge Node interface configuration, DNS service, Edge Node Virtualization infrastructure, Edge application traffic policy, and Dataplane Service.

Edge Node Enrollment: During the initial boot, connect to the designated OpenNESS Controller and request to enroll. This functionality is implemented in the Edge Lifecycle Agent (ELA) microservice. As part of enrolling, the Edge Node is provided a TLS based certificate, which is used for further API communication. Figure below depicts this behavior. ELA is implemented using Go lang.

Edge Node interface configuration: During initial bootup, the Edge Node sends a map of the existing Network interfaces to the Controller to be configured as Upstream, Downstream or on local breakout. This functionality is implemented in the ELA microservice.

DNS service: Support DNS resolution and forwarding services for the application deployed on the edge compute. DNS server is implemented based on Go DNS library. DNS service supports resolving DNS requests from UE and Applications on the edge cloud.

Edge Node Virtualization infrastructure: Receive commands from the controller/NFV infrastructure managers to start and stop Applications. This functionality is implemented in the EVA (Edge virtualization Agent) microservice and is implemented in Go lang.

Edge application traffic policy: Interface to set traffic policy for application deployed on the Edge Node. This functionality is implemented in the Edge Dataplane Agent (EDA) microservice and is implemented in Go lang.

Dataplane Service: Steers traffic towards applications running on the Edge Node or the Local Break-out Port.

Network Transport Service (NTS) is the primary dataplane supported, which is mainly developed to support S1u deployments. When NTS is used as Dataplane, OVS-DPDK can be used as inter-app service. Utilizing the Data Plane NTS, which runs on every Edge Node, it is implemented in C lang (or some other suitable programming language) using DPDK for high performance IO. This is the recommended dataplane when incoming and outgoing flows are a mix of pure IP+S1u (GTPu).

The NTS also provides Reference ACL based Application specific packet tuple filtering; Provide reference GTPU base packet learning for S1 deployment; Provide reference Simultaneous IP and S1 deployment; Provide Reference API for REST/grpc to C API; Future enhancement of UE based traffic steering for authentication; Reference implementation which does not depend on EPC implementation; Reference Packet forwarding decision independent of IO; Implement KNI based interface to Edge applications running as Containers/POD; Implement DPDK vHost user based interface to Edge applications running as Virtual Machine; Implement Scatter and Gather in upstream and downstream; Dedicated interface created for dataplane based on vhost-user for VM, dpdk-kni for Containers; Container or VM default Interface can be used for Inter-App, management and Internet access from application; and dedicated OVS-DPDK interface for inter-apps communication can be created in case of On-Premises deployment.

The OVN/OVS-DPDK is the secondary dataplane that is supported in native mode is OVN/OVS-DPDK. In some implementations, the OVN/OVS-DPDK is the primary dataplane supported. For non-S1u deployments this should be the dataplane of choice. OVN manages the IP addresses allocated to the applications. In this mode both north-south and east-west traffic is supported by OVS-DPDK. vEth pair is used as interface for container and vitrio for VMs.

Application Authentication is the ability to authenticate an Edge compute application deployed from the Controller so that application can avail/call Edge Application APIs. Only applications that intend to call the Edge Application APIs need to be authenticated. TLS certificate based Authentication is implemented.

Edge Node Microservices. OpenNESS Infrastructure deployment mode includes EAA, Edge Interface Service (EIS), and DNS, which are OpenNESS microservices deployed in this mode on the Edge Node. The rest of the functionality is achieved by leveraging the Kubernetes components or other containerization technology.

OpenNESS Edge Node microservices implement functionality to enable execution of edge compute applications natively on the Edge Node or forward the user traffic to applications running on platforms connected to the Edge Node on a Local Breakout. Edge Node Microservices include the following functionality: Edge Node Enrollment, Edge Node interface configuration, DNS service, Dataplane Service, Application Authentication, and Microservices and Enhancements for node.

Edge Node Enrollment: Edge Node enrollment is supported using K8s cluster join.

Edge Node interface configuration: Edge Node interface configuration is implemented using EIS Daemonset and it is controlled by K8s/kubectl.

DNS service: Support DNS resolution and forwarding services for the application deployed on the edge compute. DNS server is implemented based on Go DNS library. DNS service supports resolving DNS requests from UE and Applications on the edge cloud.

Dataplane Service: Steers traffic towards applications running on the Edge Node or the Local Break-out Port. Using OVN/OVS as Dataplane—recommended dataplane when incoming and outgoing flows are based on pure IP. Dataplane is supported in both OVS only or OVS-DPDK mode for higher performance. Implemented using kube-ovn. Provides IP 5-tuple based flow filtering and forwarding. Same Interface can be used for Inter-App, management, Internet and Dataplane interface.

Application Authentication: Ability to authenticate Edge compute application deployed from the Controller so that the application can avail/call of Edge Application APIs. Only applications that intend to call the Edge Application APIs need to be authenticated. TLS certificate based Authentication is implemented.

Microservices and Enhancements for node: Set of microservice as daemon/replica set deployed on node to enable Cloud Native deployment (e.g., NFD (worker), multus, SRI-OV device plugin, etc.).

There may be two types of applications that can be deployed on the Edge Node: a producer and a consumer. An OpenNESS Producer app is an edge compute application that provides services to other applications running on the edge compute platform (e.g., Location Services, Mapping Services, Transcoding Services, etc.). An OpenNESS Consumer app is an edge compute application that serves end users traffic directly (e.g., CDN App, Augmented Reality (AR) App, VR Application, Infotainment Application, etc. Pre-existing cloud applications that do not intend to call the EAA APIs but would like to serve the users (without any changes to the implementation) on the edge also fall into this category).

3.2.1. Edge Application API Support

API endpoints for edge applications is/are implemented in the EAA microservice and may be implemented in Go lang. APIs are classified as shown by the following table

| Edge Application API | Description | Example |
| --- | --- | --- |
| Edge Service Activation/ Deactivation | This API endpoint enables a Producer App on the Edge Node to register and activate on the Edge Node. After this API execution the Producer App will be discoverable to Consumer Apps on the Edge Node. | Location Service Producer app will call this API first after being deployed from the controller. |
| Edge Service Discovery | This API Endpoint enables a Consumer application to discover all the active Producer Applications on the Edge Node. | A CDN App will be able to discover Location Service Application on the Edge Node. |
| Edge Service Subscription/ Unsubscription | This API Endpoint enables a Consumer application to subscribe to Producer application service and notification updates. | A CDN application can subscribe to the Location Service application and Notification update from the service. |
| Edge Service Notification update | This is a Web socket connection that needs to be created by a Consumer Application which intends to subscribe to services from Producer Applications. This WebSocket will be used for push-notification when there is update from the Producer Application. | Location update is sent as Push Notification update to the CDN Application. |

| Edge Application API | Description | Example |
| --- | --- | --- |
| Edge Service data update | This API endpoint enables a Producer Application to publish the data to the Edge Node when it has an update to its service, | Location Service Producer App publishes Location update of a user to the Edge Node. |
| Edge Service list subscription | This API endpoint allows a Consumer Application to get the list of Producer Application services it has availed of. | CDN Application can call this API to check if it has subscribed to Location and Transcoding services. |

Edge Node telemetry utilizes the rsyslog, all OpenNESS microservices send telemetry updates which includes the logging and packet forwarding statistics data from the dataplane. This is also the mechanism that is encouraged for OpenNESS users for Debugging and Troubleshooting.

Edge Compute Applications: Native on the Edge Node—OpenNESS supports execution of an application on the Edge Node as a VM/Container instance. This is typically the case when customers are looking for high density edge compute platforms with the expectation of resource pooling across Edge Applications (in some cases Edge Applications co-existing with VNFs). OpenNESS supports both native edge compute apps and IOT Gateways to run as edge compute applications co-existing on the same platform with VNFs and share platform resources.

Figure 20:
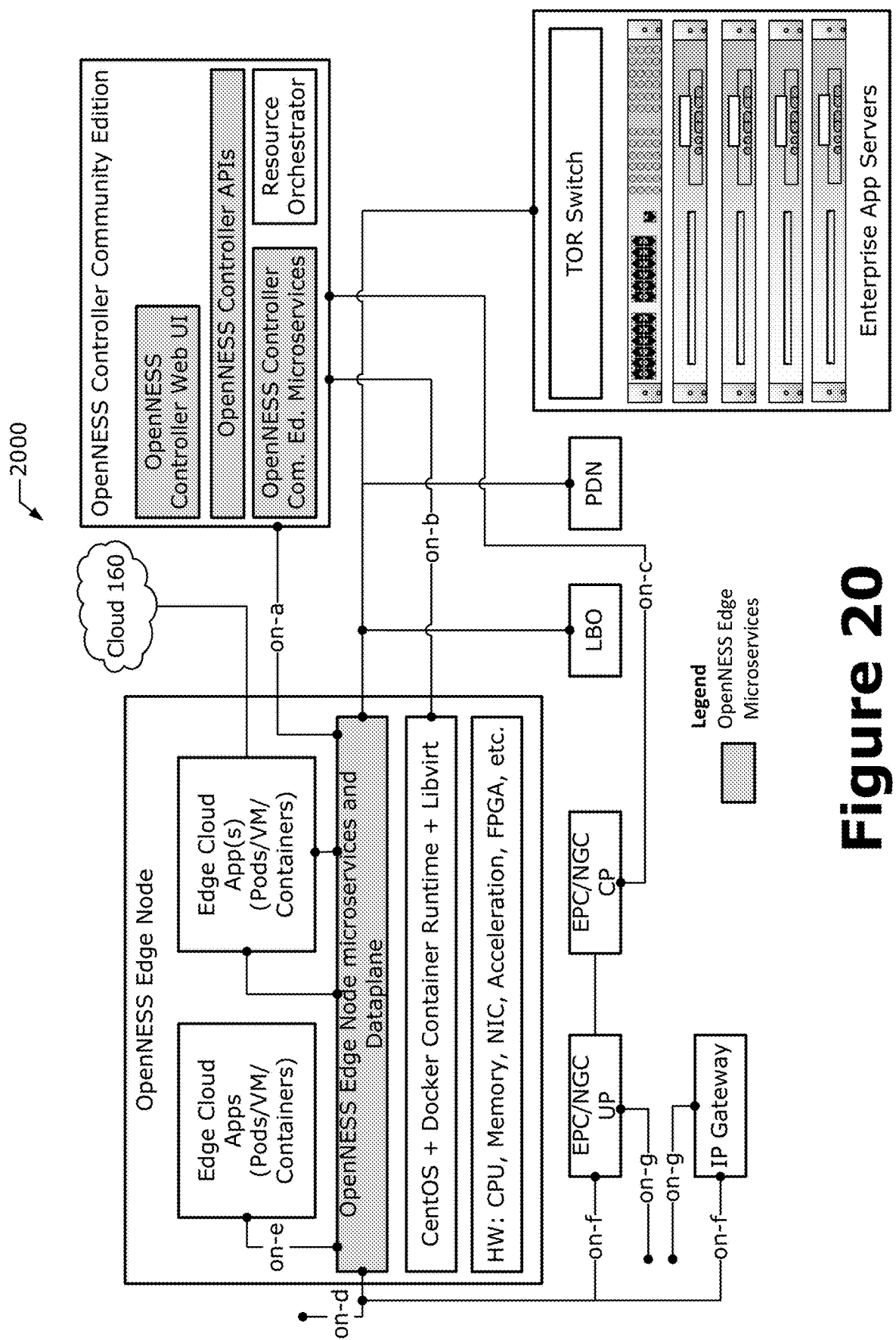
FIG. 20 depicts an OpenNESS deployment of Local Breakout Port (LBP) servers and/or of Enterprise App Servers racks.

FIG. 20 shows a possible deployment 2000 of Local Breakout Port (LBP) servers, in this case a rack of Enterprise App Servers routed through a Top-of-Rack (TOR) switch. OpenNESS supports steering traffic to applications that are already running on the customer IT infrastructure. Such applications are referred to as Applications on LBP. In the FIG. 20, the Edge Node data plane is connected to a Local Breakout (LBO) which is terminated on a Switch. There is an Enterprise Application server that is running enterprise apps connected to the TOR. Users can use OpenNESS Controller to configure certain users application traffic to be steered to the Enterprise Application servers. This deployment removes restriction of creating Edge Compute Apps from scratch and reuses the existing Enterprise Application software and Hardware infrastructure. OpenNESS also supports traffic steering to applications already running on a customer IT infrastructure. The infrastructure is attached to the Edge Node via an LBP, and traffic steering rules are defined to direct traffic to the LBP, rather than to an edge application running on the Edge Node.

Figure 21:
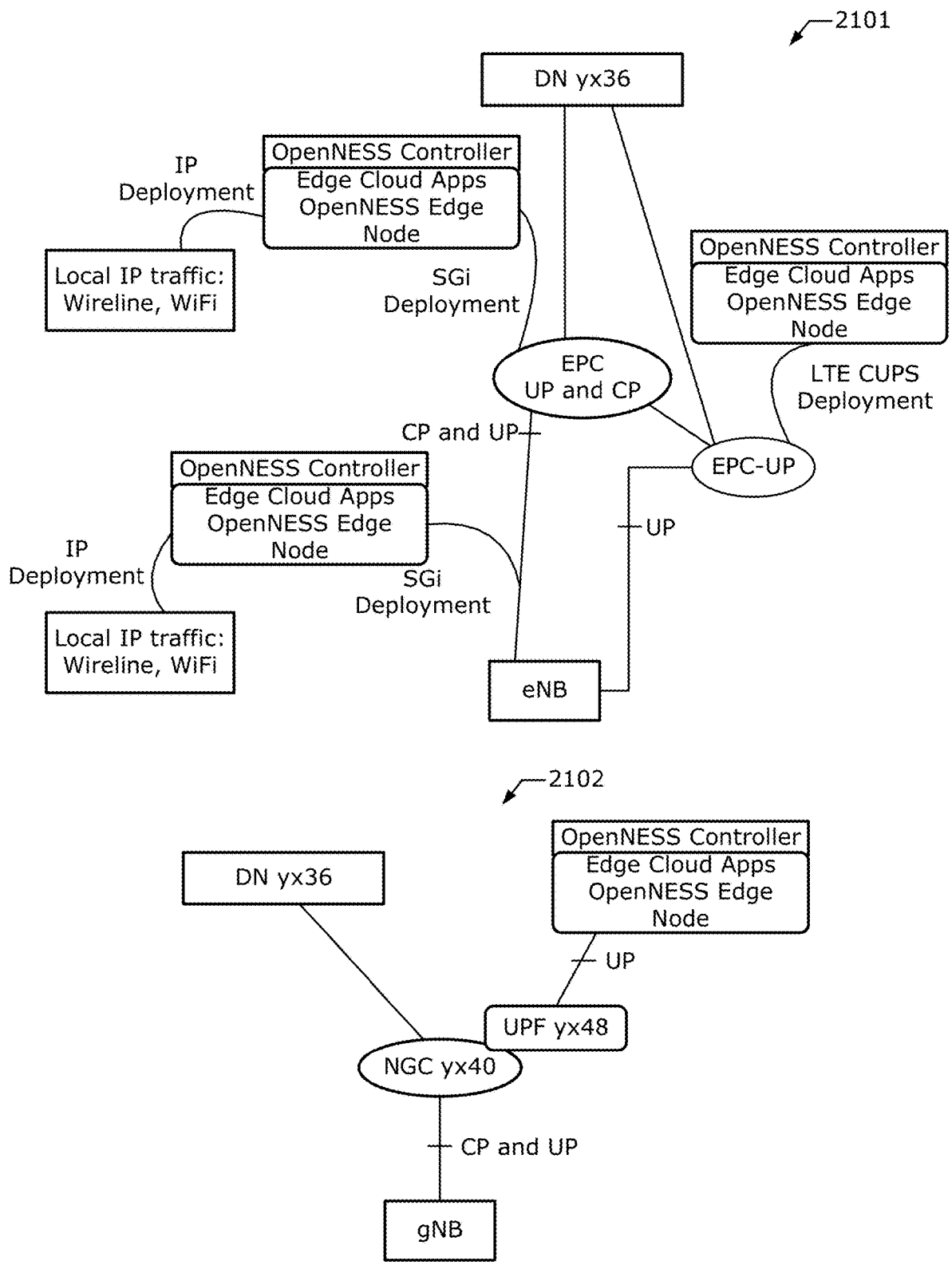
FIG. 21 depicts OpenNESS edge cloud deployments including Multi-Access Support.

FIG. 21 shows example edge cloud deployments including Multi-Access Support including an OpeNESS LTE Edge Cloud Deployment model support 2101 and an OpenNESS 5G SA Edge Cloud Deployment Model support 2102. OpenNESS supports multiple deployment options on an 5G Stand alone and LTE cellular network, as shown in FIG. 21. In these examples, OpenNESS may be deployed on 5G, LTE or IP (wireless or wireline) networks. The networking abstraction provided by the Edge Node Dataplane, network policy configuration and the Core Network Configuration Agent (CNCA) abstracts the protocol, access technology and access technology configuration differences such that edge applications see standard IP traffic as though they are deployed in the cloud.

The 5G Standalone edge cloud deployment involves an OpenNESS deployment of the Edge cloud as per 3GPP standards (see e.g., 3GPP TS 29.522 v15.3.0). In this mode, OpenNESS uses the 3GPP defined Service Based Architecture (SBA) REST APIs. The APIs use the "traffic influence" feature of the Application Function (AF) for Local Data Network (Edge cloud) processing.

OpenNESS may also include an edge cloud deployment on Control-User Plane Separation (CUPS) or SGi. The Edge Node may be attached to the SGi interface of an EPC. Traffic from the EPC arrives as IP traffic, and is steered as appropriate to edge applications. EPCs may combine the control or user plane, or they may follow the CUPS architecture (see e.g., 3GPP TS 23.214), which provides for greater flexibility in routing data plane traffic through the LTE network. When EPC CUPS is deployed OpenNESS supports reference Core Network Configuration for APN based traffic steering for local edge cloud.

OpenNESS may also include an S1-U deployment in On-Premises Private LTE deployments. Following 3GPP TS 23.401, the Edge Node may be deployed on the S1 interface from an eNB. In this mode, traffic is intercepted by the Edge Node dataplane, which either redirects the traffic to edge applications or passes it through an upstream EPC. In this option, arriving traffic is encapsulated in a GTP tunnel; the dataplane handles decapsulation/encapsulation as required.

Deployment Scenarios. The edge computing industry has devoted much effort to defining a taxonomy of edge computing deployment scenarios, based on physical location (e.g., street fixtures, central offices, data centers), logical location (e.g., on premises, far edge, near edge), and physical properties (e.g., end-to-end transmission latency). OpenNESS, as an open source platform, has taken the strategy of categorizing major characteristics of these deployment scenarios in terms of their impact on the design of a particular solution. Two primary deployment scenarios, On-Premises" and "Network Edge", have been identified, and are described in the following sub-sections.

These scenarios are not strict; an enterprise customer may have a special case in which a network edge deployment is appropriate, and a carrier may have a special case in which an on-premises deployment is appropriate.

On-Premises Edge Deployment Scenario. The on-premises edge deployment scenario is depicted in the Figure below. In this scenario, Edge Nodes are located in a customer premises, which may be an office, factory, stadium, or other single-tenant facility. It is also typical for using Private LTE in such deployments.

An on-premises deployment is likely to have a single tenant, and is likely to be subordinate to an enterprise-wide IT infrastructure. It is likely to have strict latency requirements or environmental requirements that require an Edge Node to be located very close to the endpoints that it serves. In this environment, it may not be necessary to add another level of infrastructure management; the OpenNESS Controller will have the capacity to manage its Edge Nodes directly, via libvirt or Docker. Such OnPrem deployments are supported through OpenNESS Native deployment mode.

The OpenNESS Controller may be hosted locally, or be hosted in an enterprise or public cloud to manage Edge Nodes in multiple physical locations. Certain On-Premises Edge deployments might not have a dedicated infrastructure manager (Kubernetes, Openstack, docker swarm etc.) in such cases OpenNESS Controller Community Edition provides some basic lifecycle management of Application and services using ELA and EVA microservices (for docker and libvirt) as a reference.

Network Edge Deployment Scenario. The network edge deployment scenario is depicted in Figure below. In this scenario, Edge Nodes are located in facilities owned by a network operator (e.g., a central office, Regional Data Center), and to be part of a data network including access network (e.g., 4G, 5G/NR), core network (EPC, NGC), and edge computing infrastructure owned by a network operator. For economy of scale, this network is likely to be multi-tenant, and to be of very large scale (a national network operator may have thousands, or tens of thousands, of Edge Nodes). This network is likely to employ managed virtualization (e.g., OpenStack, Kubernetes) and be integrated with an operations and support system through which not only the edge computing infrastructure, but the network infrastructure, is managed.

In this environment, OpenNESS leverages Kubernetes based cloud-native Container orchestration stack to deploy edge cloud that can host Applications, Services and Network functions.

When the OpenNESS Controller interfaces to an existing orchestrator such as Kubernetes, it does not duplicate the implementation of lifecycle management and traffic policy APIs of the Containers but it uses the existing Kubernetes APIs to execute lifecycle management and traffic policy tasks.

OpenNESS supports network overlay and dataplane using OVN/OVS. This is the recommended dataplane when incoming and outgoing flows are based on pure IP. This is implemented using kube-ovn. In this mode, the OVN/OVS can support IP based Five tuple based flow filtering and forwarding, and/or the same Interface used for Inter-App, management, Internet and Dataplane interface.

OpenNESS Support for Deployment flavors. In addition to the Deployment scenarios discussed previously, OpenNESS also supports individual Deployment flavors. Deployment flavors are the types of nodes that typically are deployed at the edge using OpenNESS. Flavors are mainly categorized by the workloads that is running on the node. Below are the example of Flavors supported on the network edge.

RAN node flavor. RAN node here typically refers to RAN DU and CU 4G/5G nodes deployed on the edge or far edge. In some cases DU might be integrated in to the radio. The example RAN deployment flavor uses FlexRAN as reference DU.

Core node flavor. Core nodes here typically refers to User plane and Control plane Core workloads for 4G and 5G deployed on the edge and central location. In most of the edge deployments UPF/SPGW-U plane is located on the edge along with the applications and services. For the ease of representation the diagram shows how OpenNESS can be used to deploy both User plane and Control plane Core nodes.

Application node flavor. Application nodes here typically refers to nodes running edge applications and services. The Applications can be Smart City, CDN, AR/VR, Cloud Gaming, etc. In the example flavor below Smart City application pipeline is used.

OnPremises application node flavor. OnPremises node typically host userplane core network function and edge applications.

OnPremises all-in-one node—CERA. CERA (Converged Edge Reference Architecture) is another flavor of OnPremises where along with userplane even the Wireless access/RAN is part of the node.

Enhanced Platform Awareness through OpenNESS. Enhanced Platform Awareness (EPA) represents a methodology and a related suite of changes across multiple layers of the orchestration stack targeting intelligent platform capability, configuration & capacity consumption. EPA features include Huge Pages support, NUMA topology awareness, CPU pinning, integration with OVS-DPDK, support for I/O Pass-through via Single Root I/O Virtualization (SR-IOV), High Density Deep Learning (HDDL) support, FPGA resource allocation support and many others.

To achieve the optimal performance and efficiency characteristics, EPA extensions to Data Models, Orchestrators and VIMs facilitates Automation of advanced selection of capabilities and tuning parameters during the deployment of NFV solutions. EPA also enables service providers to offer differentiating and/or revenue generating services that require leveraging of specific hardware features.

OpenNESS provides a one-stop solution to integrate key EPA features that are critical for Applications (CDN, AI Inference, Transcoding, Gaming etc.) and CNF (RAN L1, L2L3 and Core) to work optimally for edge deployments.

Edge Compute EPA—feature for Network edge and availability for CNF, Apps and Services on the edge may include:
  CPU Manager: Support deployment of a POD with dedicated pinning using CPU manager for K8s
  SR-IOV NIC: Support deployment of a POD with dedicated SR-IOV Virtual Function (VF) from Network Interface Card (NIC)
  SR-IOV FPGA: Support deployment of a POD with dedicated SR-IOV VF from FPGA (Demonstrated through Intel® FPGA Programmable Acceleration Card PAC N3000 with FPGA IP Wireless 5G FEC/LDPC)
  Topology Manager: Supports k8s to manage the resources allocated to workloads in a Non-uniform memory access (NUMA) topology-aware manner
  BIOS/Firmware Configuration service: Use intel syscfg tool to build a Pod that is scheduled by K8s as a job that configures the BIOS/FW with the given specification
  Hugepages: Support for allocation of 1G/2M huge pages to the Pod. Huge page allocation is done through K8s
  Multus: Support for Multiple network interface in the PODs deployed by Kubernetes
  Node Feature discovery: Support detection of Silicon and Software features and automation of deployment of CNF, Applications and services
  FPGA Remote System Update service: Support Intel OPAE (fpgautil) tool to build a Pod that is scheduled by K8s as a job that updated the FPGA with the new RTL
  Real-time Kernel—Support for the K8s Edge Node running real time kernel
  Support for running legacy application in VM mode using Kubervirt and allocation of SRI-OV ethernet interfaces to VMs
  Non-Privileged Container: Support deployment of non-privileged pods (CNFs and Applications as reference)

Edge Compute EPA—feature for On-Premises edge may include:
  Support for allocation of Intel® Movidius™ VPUs to the OnPrem applications running in Docker containers.

Figure 22:
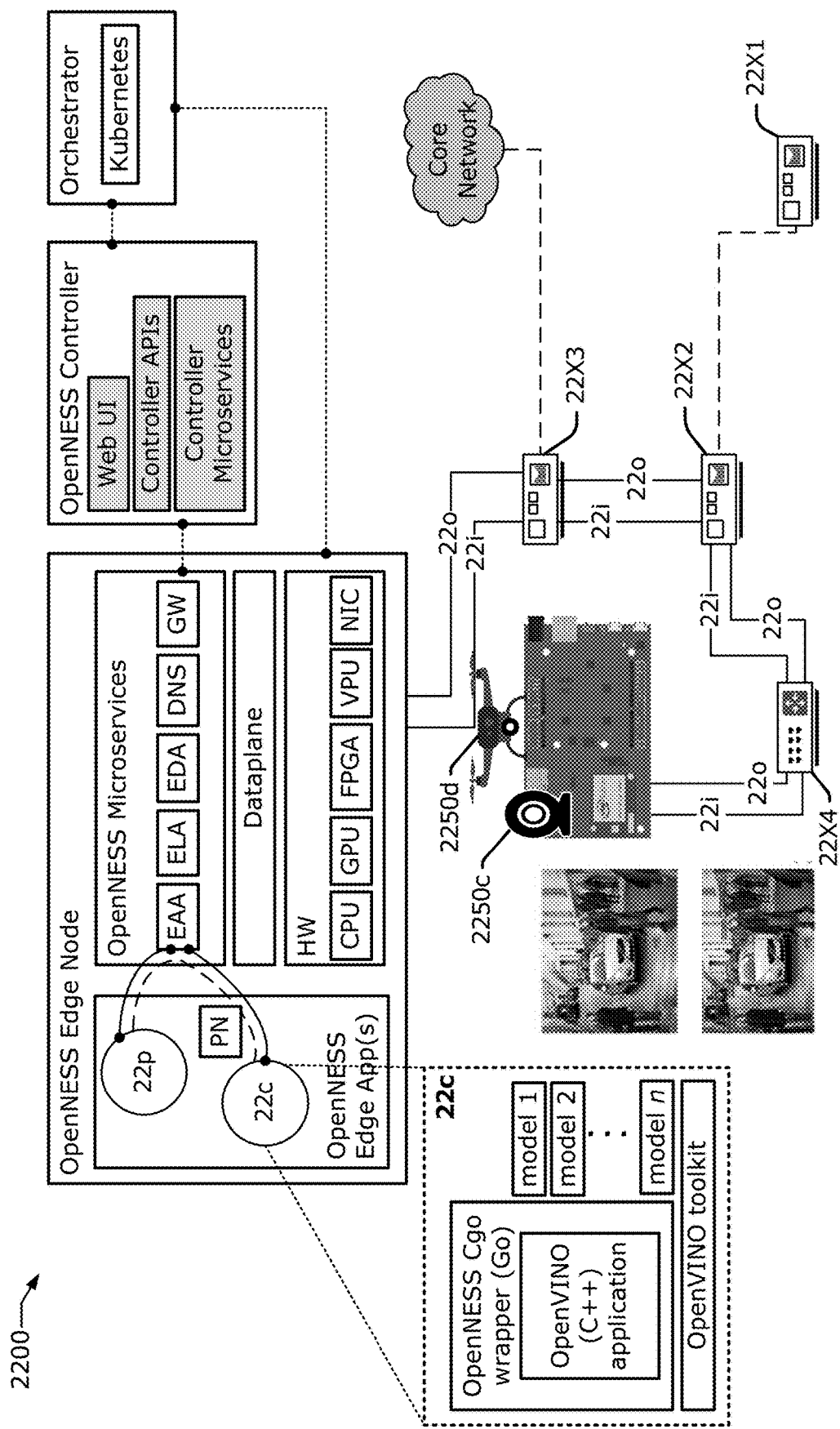
FIG. 22 depicts OpenNESS Edge Node Applications including Producer and Consumer Applications.

Support for dedicated core allocation to application running as VMs or Containers Support for dedicated SR-IOV VF allocation to application running in VM or containers Support for system resource allocation into the application running as container Mount point for shared storage Pass environment variables Configure the port rules Non-Privileged Container: Support deployment of non-privileged containers FIG. 22 shows an example of OpenNESS Edge Node Apps 2200 including producer apps 22p and consumer apps 22c. Consumer apps 22c may be an OVINO consumer app. NF 22x1 comprises one or more of a virtual MME (vMME), virtual HHS (vHHS), and/or virtual PCRF (vPCRF); NF 22x2 comprises a virtual SGW (vSGW); NF 22x3 comprises a virtual PGW (vPGW); and NF 22x4 comprises a virtual eNB (vENB).

OpenNESS Applications are onboarded and provisioned on the Edge Node through OpenNESS Controller in Native mode, and through K8s master in K8s mode. In K8s mode OpenNESS also supports onboarding of the Network Functions like RAN, Core, Firewall, etc. OpenNESS apps can be categorized in different ways depending on the scenarios or use cases, such as by the following examples: Depending on the OpenNESS APIs support: edge cloud apps (apps calling EAA APIs for providing or consuming services on the edge compute along with servicing end-users traffic), and/or unmodified cloud applications (apps not availing of any services on the edge compute, just servicing end-user traffic). Depending on the application execution platform: app running natively on Edge Node in a VM/Container provisioned by the OpenNESS controller, and/or app running on Local breakout not provisioned by the OpenNESS controller. Depending on the servicing of end-user traffic: producer app 22p, and/or consumer app 22c.

Producer Applications 22p. OpenNESS producer apps 22p are edge compute applications that provide services to other applications running on the edge compute platform. Producer apps do not serve end users traffic directly. They are sometimes also to as Edge services. Here are some of the characteristics of a producer app. Producer apps 22p authenticate and acquire TLS; the producer apps 22p activate if the service provided by them needs to be discoverable by other edge applications; and a producer app 22p can have one or more fields for which it will provide a notification update.

Consumer Applications 22c. OpenNESS consumer apps 22c are edge compute applications that serve end user traffic directly. Consumer apps 22c may or may not subscribe to the services from other producer apps 22p on the Edge Node. Here are some of the characteristics of a consumer apps 22c: it is not mandatory for consumer applications to authenticate if they do not wish to call EAA APIs; a consumer app 22c can subscribe to any number of services from producer apps 22p, and push notifications PN can be provided by the producer app 22p to the consumer app 22c based on occurrence of an event or the like. Future extension can implement entitlements to consumer apps 22c to create access control lists; and producer 22p to consumer 22c updates may use a web socket for notification. If there is further data to be shared between producer 22p and consumer 22c, other NFVi components like OVS/VPP/NIC-VF can be used for data transfer.

In the example of FIG. 22, the consumer app 22c is based on OpenVINO. OpenVINO is a toolkit facilitating the optimization of a Deep Learning model from a framework and deployment using an inference engine onto hardware elements. The high level pipeline of OpenVINO includes two parts: generate Intermediate Representation (IR) files via Model Optimizer using your trained model or public one and execute inference on Inference Engine on specified plugins (e.g., CPU, Intel® Processor Graphics, VPU, FPGA, GNA, Multi-Device plugin, Heterogeneous plugin, etc.).

In this example, the OpenVINO consumer app 22c executes inference on the input video stream 22i, and the OpenVINO producer app 22p generates notifications to the consumer app 22c for changing the inference model. The video input stream 22i is captured from a webcam 2250c installed on an embedded client device (e.g., an embedded Linux client) and/or a drone 2250d, and an annotated video output stream 22o is streamed out of the OpenNESS Edge Node back to the client device for further data analysis.

Figure 23:
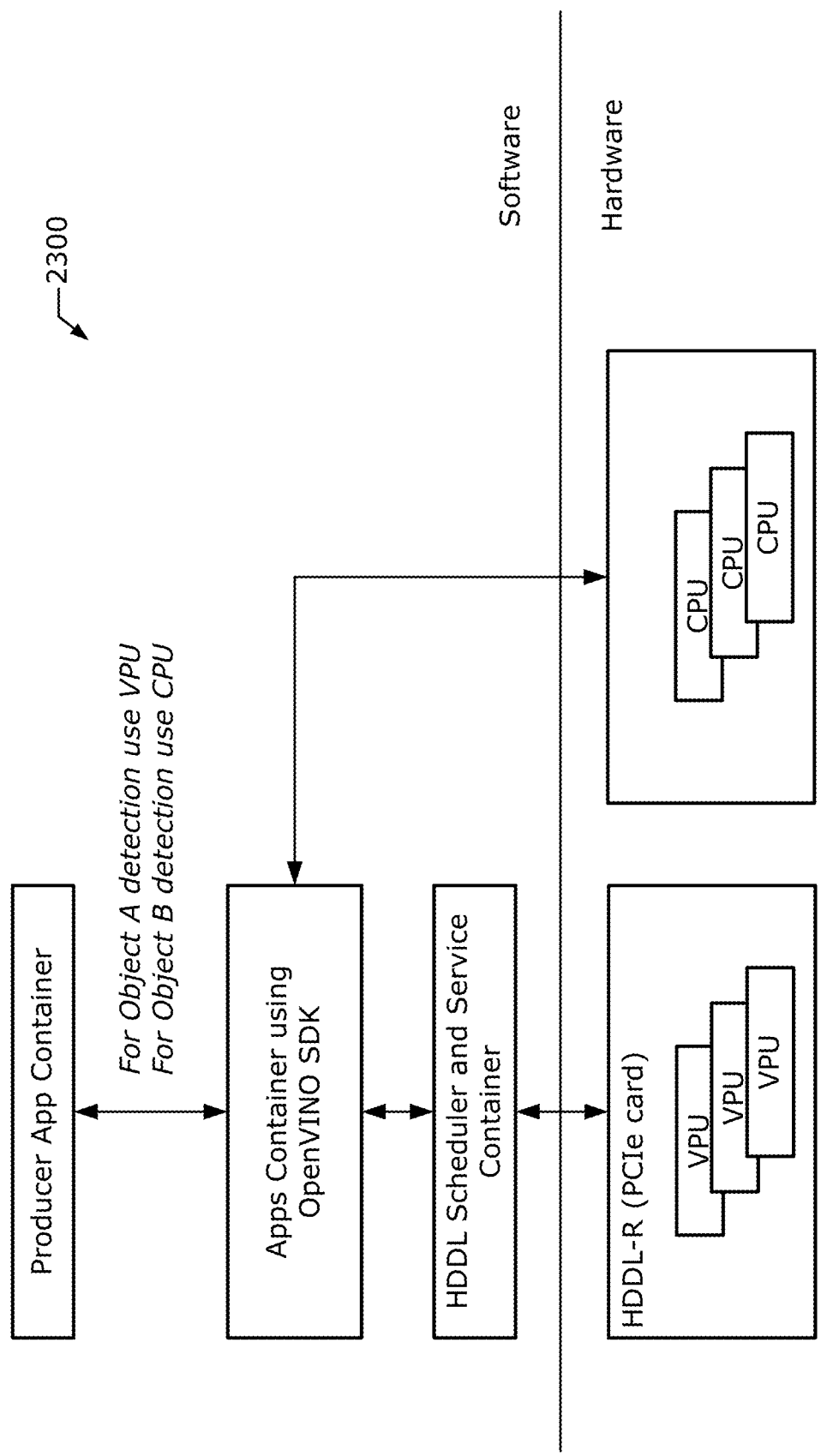
FIG. 23 shows an example of OpenNESS dynamic CPU and VPU usage.

FIG. 23 shows an example of dynamic CPU and VPU usage. The OpenNESS APIs provide mechanisms to utilize platform resources efficiently in the Edge cloud. The OpenVINO application in the example of FIG. 22 supports dynamic use of VPU or CPU for object detection depending on the input from the producer app. The producer app can behave as a load balancer. It also demonstrates the Application portability with OpenVINO so that it can run on a CPU or VPU.

Deployment of AI based Machine Learning (ML) applications on the edge is becoming more prevalent. Supporting hardware resources that accelerate AI/ML applications on the edge is key to improve the capacity of edge cloud deployment. It is also important to use CPU instruction set to execute AI/ML tasks when load is less. In various embodiments, inferences may be computed as edge workloads. In the example of FIG. 23, the HDDL-R integrates multiple SoCs to provide high capacity deep learning.

As an example, the HDDL may be Intel® Movidius™ Myriad™ X High Density Deep Learning solution, where the SoCs are multiple Myriad™ X SoCs in a PCIe add-in card form factor or a module form factor. The HDDL-R provides raw video data to the PCIe card (decode on host). In this example implementation, the HDDL SW stack adopts Intel® OpenVINO™ IE APIs. These universal deep learning inference APIs have different implementations for the Intel CPU, GPU, FPGA, and VPU (e.g., Intel® Movidius™ Myriad™ series) hardware. Each implementation for each hardware is an inference engine plugin. The plugin for Intel® Movidius™ Myriad™ X HDDL solution, or IE HDDL plugin for short, supports the Myriad™ X HDDL Solution hardware PCIe card. It communicates with the Myriad™ X HDDL HAL API to manage the multiple Myriad™ X devices in the card, and schedule deep learning neural networks and inference tasks to these Myriad™ X devices.

Cloud Adapter Edge compute Application. Many major cloud service providers (CSPs) implement frameworks to deploy edge applications that link back to their cloud via connectors. For example, Amazon® Greengrass enables lambda functions to be deployed on the edge and connecting to the AWS cloud using the GreenGrass service. While it was originally intended to host this type of edge software on IoT gateways, the same framework can be utilized by Service Providers and Enterprises, to implement a multi-cloud strategy for their Edge Nodes. OpenNESS enables this approach by running the Greengrass Core (with the Edge software) as Edge applications on the Edge Node. They can run unchanged, or modified to utilize the EAA APIs to serve as Producer or Consumer apps on the Edge Node. By running multiple cloud connector instances from different cloud service providers on the same Edge Node, a multi-cloud experience can be easily implemented. OpenNESS supports this by providing the ability to deploy public cloud IOT gateways from cloud vendors like Amazon AWS IoT Greengrass and Baidu OpenEdge on edge compute platform. The existing IOT gateways can be migrated to OpenNESS as is or enhanced to call EAA APIs using extensions like Lambda functions.

OpenNESS Microservices and APIs. The OpenNESS Edge Node and Controller are each composed of a set of microservices that interact with each other, with applications, and with other network functions (e.g., infrastructure managers, orchestrators) to accomplish their functions. The microservices expose APIs over reference points, as discussed previously.

Interaction between the OpenNESS Controller and the Edge Node is mediated by two gateway services, via gRPC Remote Procedure Calls (gRPC), a technology that provides reliable, high-performance RPC communication between microservices. APIs between the Controller and Edge Node, and internal APIs among Edge Node microservices, are implemented via gRPC. For messages to and from applications, as well as to and from the Controller and the access network, are exposed as OpenAPI (e.g., REST-ful) APIs. OpenNESS supports the following APIs: Edge Application APIs; Edge Application Authentication APIs; Edge Lifecycle Management APIs; Edge Virtualization Infrastructure APIs; Core Network Configuration APIs for edge compute; and OpenNESS Controller APIs.

Edge Application APIs. Edge Application APIs are implemented by the EAA as HTTPS REST. Edge Application APIs may be used for porting of existing Public/Private Cloud application to the edge compute based on OpenNESS: This is the scenario where a customer wants to run existing apps in public cloud on OpenNESS edge without calling any APIs or changing code. In this case, the only requirement is for an Application image (VM/Container) should be uploaded to the controller and provisioned on the Edge Node using OpenNESS Controller. In this case, the Application cannot call any EAA APIs and consume services on the edge compute. It just services the end-user traffic.

The Edge Application APIs may also be used when Native Edge compute Application are to call EAA APIs. This is the scenario where a customer wants to develop Edge compute applications that take advantage of the Edge compute services resulting in more tactile application that responds to the changing user, network or resource scenarios.

The Edge Application Agent is a service that runs on the Edge Node and operates as a discovery service and basic message bus between applications via pubsub. The connectivity and discoverability of applications by one another is governed by an entitlement system and is controlled by policies set with the OpenNESS Controller. The entitlement system is still in its infancy, however, and currently allows all applications on the executing Edge Node to discover one another as well as publish and subscribe to all notifications. The Figure below provides the sequence diagram of the supported APIs for the application.

Edge Application Authentication APIs. OpenNESS supports authentication of Edge compute apps that intend to call EAA APIs. Applications are authenticated by the Edge Node microservice issuing the requesting application a valid TLS certificate after validating the identity of the application. Edge Application Authentication APIs are implemented as HTTP REST APIs.

For existing pubic cloud application ported to OpenNESS, a customer may want to run existing apps in the public cloud on OpenNESS edge without calling any APIs or changing code. In this case the Application cannot call any EAA APIs and consume services on the edge compute. It just services the end-user traffic. So the Application will not call authentication API to acquire a TLS certificate.

For Native Edge compute Application calling EAA APIs, a customer may want to develop Edge compute applications that take advantage of the Edge compute services resulting in more tactile application that responds to the changing user, network or resource scenarios. Such applications should first call authentication APIs and acquire TLS certificate. Authentication of Applications that provide services to other Applications on the edge compute (Producer Apps) is mandatory.

For applications executing on the Local breakout the Authentication is not applicable since it's not provisioned by the OpenNESS controller.

Edge Lifecycle Management APIs. ELA APIs are implemented by the ELA microservice on the Edge Node. The ELA runs on the Edge Node and operates as a deployment and lifecycle service for Edge applications and VNFs (Virtual Network Functions) that are needed for Edge compute deployment like e.g. 4G EPC CUPS User plane and DNS server. It also provides network interface, network zone, and application/interface policy services. ELA APIs are implemented over gRPC. For the purpose of visualization they are converted to json.

Edge Virtualization Infrastructure APIs. EVA APIs are implemented by the EVA microservice on the Edge Node. The EVA operates as a mediator between the infrastructure that the apps run on and the other edge components. The EVA abstracts how applications were deployed. In order to achieve this, there is also a complementary EVA service running on the Controller that the Edge Node EVA service can call when the Edge Node was configured as a node/slave of an external orchestrator. As an example, an RPC to list the running applications on the node is achieved by calling the Docker daemon and virsh list on the Edge Node, get its response data and show the status of the running applications. EVA APIs are implemented over gRPC. For the purpose of visualization they are converted to json.

3.2.2. Core Network Configuration APIs for Edge Compute

Core Network Configuration API for 5G. OpenNESS controller community edition supports configuration of the 5G Application Function (AF) to support the Edge Cloud support. Once AF is configured it then interacts with the 5G Network Exposure Function (NEF) as per 3GPP standards. Traffic Influence feature is implemented between AF and NEF to steer the traffic towards the Edge Cloud or what 3GPP calls Local Data Network. OpenNESS supports 3GPP Rel v15.3 for communication between AF and NEF. Traffic influence and Notifications of AF are supported by OpenNESS in the current scope. The UPF can be co-located in the Edge location or can be deployed on Edge Node platform from OpenNESS controller. Features supported by 5G Components of OpenNESS include AF, NEF, CNCA, WEB UI, and the like.

Core Network Configuration API for 4G CUPS. As part of the OpenNESS reference edge stack the OpenNESS controller community edition is used for configuring the traffic policy for Control and User Plane Separation of EPC Nodes (CUPS) EPC to steer traffic towards the edge compute, This API is based on HTTP REST. Since 3GPP or ETSI MEC does not provide a reference for these APIs various implementation of this Edge Controller to CUPS EPC might exist. OpenNESS has tried to take the approach of minimal changes to 3GPP CUPS EPC to achieve the edge compute deployment. OpenNESS and HTTP REST APIs for the EPC CUPS is a reference implementation to enable customers using OpenNESS to integrate their own HTTP REST APIs to the EPC CUPS into the OpenNESS Controller. Special care has been taken to make these components Modular microservices.

The OpenNESS reference solution provides a framework for managing multiple Edge Nodes through a centralized OpenNESS controller. In case of co-located EPC user plane and Edge Node deployment models, LTE user plane elements can be controlled through NFV infrastructure provided by OpenNESS reference solution. OpenNESS suggests HTTP based REST APIs to configure and manage the LTE user plane components through the centralized Edge controller. LTE Network Operator's Operation and Maintenance (OAM) elements can consume these APIs to open an interface for the Edge controllers to communicate for the management of user plane nodes launched at the Edge Nodes. It is implicitly understood that OAM agent communication with EPC core components is always an implementation dependent from vendor to vendor in different operator's environments.

OpenNESS Controller APIs. OpenNESS Controller APIs are important APIs for those managing one or more OpenNESS Edge Nodes. OpenNESS Controller APIs are called by the UI frontend and can be called by external orchestrators. These APIs allow centralized management of OpenNESS Edge Nodes. The API enables a developer to maintain a list of OpenNESS Edge Nodes, configure apps, manage policies and DNS, and more. The OpenNESS Controller API represents an abstraction layer for an operations administrator. While individual OpenNESS Edge Nodes may be managed singularly, the OpenNESS Controller API allows for management in a scalable way. Furthermore, it allows for secure communication to the many Edge Nodes. The OpenNESS Controller API is implemented using HTTP REST.

4. Hardware Components

Figure 24:
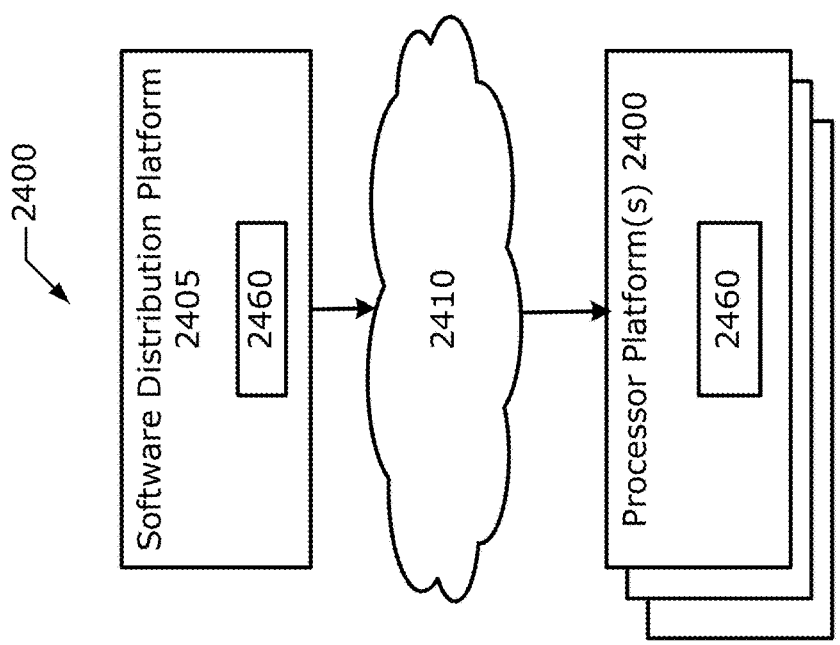
FIG. 24 illustrates an example software distribution platform.
Figure 26:
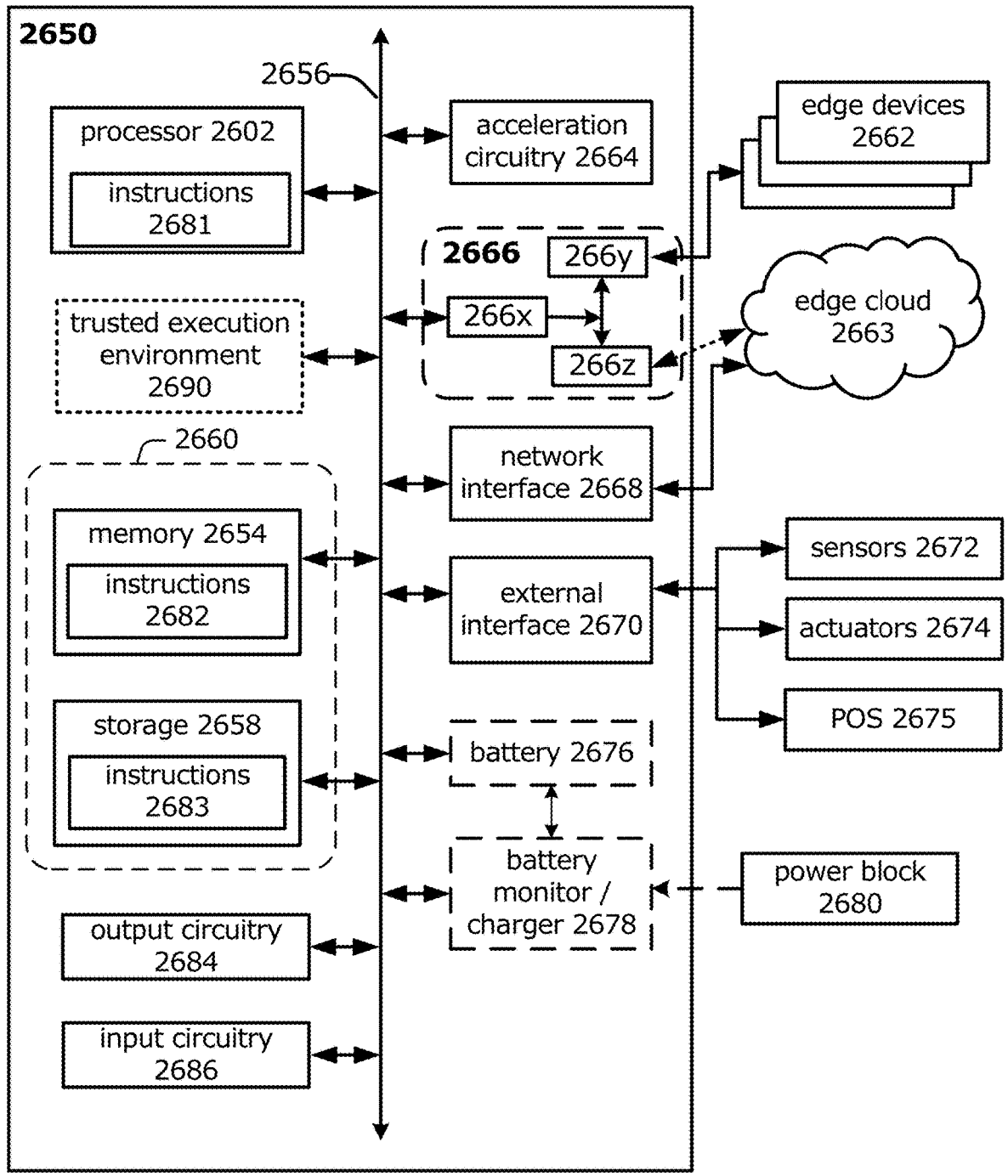

FIG. 24 illustrates an example software distribution platform 2405 to distribute software 2460, such as the example computer readable instructions 2660 of FIG. 26, to one or more devices, such as example processor platform(s) 2400 and/or example connected edge devices 2662 (see e.g., FIG. 26) and/or any of the other computing systems/devices discussed herein. The example software distribution platform 2405 may be implemented by any computer server, data facility, cloud service, etc., capable of storing and transmitting software to other computing devices (e.g., third parties, the example connected edge devices 2662 of FIG. 26). Example connected edge devices may be customers, clients, managing devices (e.g., servers), third parties (e.g., customers of an entity owning and/or operating the software distribution platform 2405). Example connected edge devices may operate in commercial and/or home automation environments. In some examples, a third party is a developer, a seller, and/or a licensor of software such as the example computer readable instructions 2660 of FIG. 26. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 24, the software distribution platform 2405 includes one or more servers and one or more storage devices. The storage devices store the computer readable instructions 2460, which may correspond to the example computer readable instructions 2660 of FIG. 26, as described above. The one or more servers of the example software distribution platform 2405 are in communication with a network 2410, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 2460 from the software distribution platform 2405. For example, the software 2460, which may correspond to the example computer readable instructions 2660 of FIG. 26, may be downloaded to the example processor platform(s) 2400, which is/are to execute the computer readable instructions 2460 to implement Radio apps.

In some examples, one or more servers of the software distribution platform 2405 are communicatively connected to one or more security domains and/or security devices through which requests and transmissions of the example computer readable instructions 2460 must pass. In some examples, one or more servers of the software distribution platform 2405 periodically offer, transmit, and/or force updates to the software (e.g., the example computer readable instructions 2660 of FIG. 26) to ensure improvements, patches, updates, etc. are distributed and applied to the software at the end user devices.

In the illustrated example of FIG. 24, the computer readable instructions 2460 are stored on storage devices of the software distribution platform 2405 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions D182 stored in the software distribution platform 2405 are in a first format when transmitted to the example processor platform(s) 2400. In some examples, the first format is an executable binary in which particular types of the processor platform(s) 2400 can execute. However, in some examples, the first format is uncompiled code that requires one or more preparation tasks to transform the first format to a second format to enable execution on the example processor platform(s) 2400. For instance, the receiving processor platform(s) 2400 may need to compile the computer readable instructions 2460 in the first format to generate executable code in a second format that is capable of being executed on the processor platform(s) 2400. In still other examples, the first format is interpreted code that, upon reaching the processor platform(s) 2400, is interpreted by an interpreter to facilitate execution of instructions.

Figure 25:
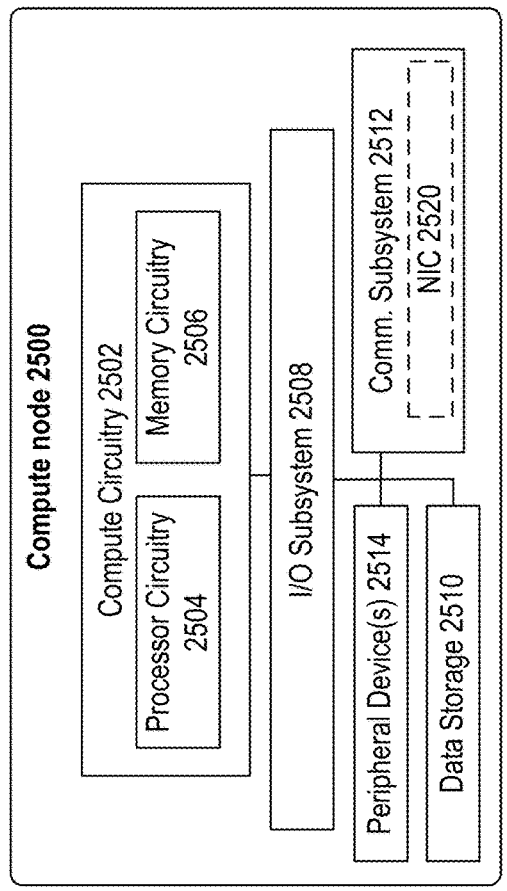
FIGS. 25 and 26 depict example components of various compute nodes in edge computing system(s).

FIGS. 25 and 26 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 25, an edge compute node 2500 includes a compute engine (also referred to herein as "compute circuitry") 2502, an input/output (I/O) subsystem 2508, data storage 2510, a communication circuitry subsystem 2512, and, optionally, one or more peripheral devices 2514. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 2500 may be embodied as any type of engine, device, or collection of devices capable of performing various compute functions. In some examples, the compute node 2500 may be embodied as a single device such as an integrated circuit, an embedded system, an FPGA, a System-on-Chip (SoC), or other integrated system or device. The compute node 2500 includes or is embodied as a processor 2504 and a memory 2506. The processor 2504 may be embodied as any type of processor capable of performing the functions described herein (e.g., executing an application). For example, the processor 2504 may be embodied as a multi-core processor(s), a microcontroller, or other processor or processing/controlling circuit.

In some examples, the processor 2504 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 2504 may work in coordination with each other to execute many types of operations and instructions within and on behalf of the compute node 2500.

The memory 2506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 2506 may be integrated into the processor 2504. The main memory 2506 may store various software and data used during operation such as one or more applications, data operated on by the application(s), libraries, and drivers.

The compute circuitry 2502 is communicatively coupled to other components of the compute node 2500 via the I/O subsystem 2508, which may be embodied as circuitry and/or components to facilitate input/output operations with the compute circuitry 2502 (e.g., with the processor 2504 and/or the main memory 2506) and other components of the compute circuitry 2502. For example, the I/O subsystem 2508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 2508 may form a portion of an SoC and be incorporated, along with one or more of the processor 2504, the main memory 2506, and other components of the compute circuitry 2502, into the compute circuitry 2502.

The one or more illustrative data storage devices/disks 2510 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 2510 may include a system partition that stores data and firmware code for the data storage device/disk 2510. Individual data storage devices/disks 2510 may also include one or more operating system partitions that store data files and executables for operating systems depending on, for example, the type of compute node 2500.

The communication circuitry 2512 may be embodied as any communication circuit, device, or collection thereof, capable of enabling communications over a network between the compute circuitry 2502 and another compute device (e.g., an edge gateway node or the like). The communication circuitry 2512 may be configured to use any one or more communication technology (e.g., wired or wireless communications) and associated protocols (e.g., a cellular networking protocol such a 3GPP 4G or 5G standard, a wireless local area network protocol such as IEEE 802.11/WiFi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The communication circuitry 2512 includes a network interface controller (NIC) 2520, which may also be referred to as a host fabric interface (HFI). The NIC 2520 may be embodied as one or more add-in-boards, daughter cards, network interface cards, controller chips, chipsets, or other devices that may be used by the compute node 2500 to connect with another compute device. In some examples, the NIC 2520 may be embodied as part of a system-on-a-chip (SoC) that includes one or more processors, or included on a multichip package that also contains one or more processors. In some examples, the NIC 2520 may include a local processor (not shown) and/or a local memory (not shown) that are both local to the NIC 2520. In such examples, the local processor of the NIC 2520 may be capable of performing one or more of the functions of the compute circuitry 2502 described herein. Additionally, or alternatively, in such examples, the local memory of the NIC 2520 may be integrated into one or more components of the client compute node at the board level, socket level, chip level, and/or other levels.

Additionally, in some examples, a respective compute node 2500 may include one or more peripheral devices 2514. Such peripheral devices 2514 may include any type of peripheral device found in a compute device or server such as audio input devices, a display, other input/output devices, interface devices, and/or other peripheral devices, depending on the particular type of the compute node 2500. In further examples, the compute node 2500 may be embodied by a respective edge compute node in an edge computing system (e.g., client compute node, edge gateway node, edge aggregation node, V-ITS-Ss discussed previous, etc.) or like forms of appliances, computers, subsystems, circuitry, or other components.

FIG. 26 illustrates an example of components that may be present in an edge computing node 2650 for implementing the techniques (e.g., operations, processes, methods, and methodologies) described herein. This edge computing node 2650 provides a closer view of the respective components of node 2600 when implemented as or as part of a computing device (e.g., as a mobile device, a base station, server, gateway, etc.). The edge computing node 2650 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 2650, or as components otherwise incorporated within a chassis of a larger system.

The edge computing node 2650 includes processing circuitry in the form of one or more processors 2652. The processor circuitry 2652 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2652 may include one or more hardware accelerators (e.g., same or similar to acceleration circuitry 2664), which may be microprocessors, programmable processing devices (e.g., FPGA, ASIC, etc.), or the like. The one or more accelerators may include, for example, computer vision and/or deep learning accelerators. In some implementations, the processor circuitry 2652 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 2652 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, an xPU/DPU/IPU/NPU, special purpose processing unit, specialized processing unit, or any other known processing elements, or any suitable combination thereof. The processors (or cores) 2652 may be coupled with or may include memory/storage and may be configured to execute instructions stored in the memory/storage to enable various applications or operating systems to run on the platform 2650. The processors (or cores) 2652 is configured to operate application software to provide a specific service to a user of the platform 2650. Additionally or alternatively, the processor(s) 2652 may be a special-purpose processor(s)/controller(s) configured (or configurable) to operate according to the elements, features, and implementations discussed herein.

As examples, the processor(s) 2652 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2652 may be a part of a system on a chip (SoC), System-in-Package (SiP), a multi-chip package (MCP), and/or the like, in which the processor(s) 2652 and other components are formed into a single integrated circuit, or a single package, such as the Edison™ or Galileo™ SoC boards from Intel® Corporation. Other examples of the processor(s) 2652 are mentioned elsewhere in the present disclosure.

The processor(s) 2652 may communicate with system memory 2654 over an interconnect (IX) 2656. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2658 may also couple to the processor 2652 via the IX 2656. In an example, the storage 2658 may be implemented via a solid-state disk drive (SSDD) and/or high-speed electrically erasable memory (commonly referred to as "flash memory"). Other devices that may be used for the storage 2658 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 2654 and/or storage circuitry 2658 may also incorporate three-dimensional (3D) cross-point (XPOINT) memories from Intel® and Micron®.

In low power implementations, the storage 2658 may be on-die memory or registers associated with the processor 2652. However, in some examples, the storage 2658 may be implemented using a micro hard disk drive (HDD). Further, any number of new technologies may be used for the storage 2658 in addition to, or instead of, the technologies described, such resistance change memories, phase change memories, holographic memories, or chemical memories, among others.

The components of edge computing device 2650 may communicate over an interconnect (IX) 2656. The IX 2656 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 2656 may be a proprietary bus, for example, used in a SoC based system.

The IX 2656 couples the processor 2652 to communication circuitry 2666 for communications with other devices, such as a remote server (not shown) and/or the connected edge devices 2662. The communication circuitry 2666 is a hardware element, or collection of hardware elements, used to communicate over one or more networks (e.g., cloud 2663) and/or with other devices (e.g., edge devices 2662). The collection of hardware elements include hardware devices such as baseband circuitry 266x, switches, filters, amplifiers, antenna elements, and the like to facilitate OTA communications)

The transceiver 2666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The communication circuitry 2666 (or multiple transceivers 2666) may communicate using multiple standards or radios for communications at a different range. For example, the communication circuitry 2666 may include short-range RAT circuitry 266y to communicate with relatively close devices (e.g., within about 10 meters) based on BLE, or another low power radio, to save power. More distant connected edge devices 2662 (e.g., within about 50 meters) may be reached over ZigBee® circuitry 266y and/or other intermediate power radios 266y. Both communications techniques may take place over a single radio 266y at different power levels or may take place over separate transceivers 266y, for example, a local transceiver 266y using BLE and a separate mesh transceiver 266y using ZigBee®.

A wireless network transceiver 266z may be included to communicate with devices or services in the edge cloud 2663 via local or wide area network protocols. The wireless network transceiver 266z may be an LPWA transceiver that follows the IEEE 802.15.4, or IEEE 802.15.4g standards, among others. The edge computing node 2650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 266z, as described herein. For example, the transceiver 266z may include a cellular transceiver that uses spread spectrum (SPA/SAS) communications for implementing high-speed communications. Further, any number of other protocols may be used, such as Wi-Fi® networks for medium speed communications and provision of network communications. The transceiver 266z may include radios that are compatible with any number of 3GPP specifications, such as LTE and 5G/NR communication systems, discussed in further detail at the end of the present disclosure.

A network interface controller (NIC) 2668 may be included to provide a wired communication to nodes of the edge cloud 2663 or to other devices, such as the connected edge devices 2662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 2668 may be included to enable connecting to a second network, for example, a first NIC 2668 providing communications to the cloud over Ethernet, and a second NIC 2668 providing communications to other devices over another type of network.

Given the variety of types of applicable communications from the device to another component or network, applicable communications circuitry used by the device may include or be embodied by any one or more of components 2664, 2666, 2668, or 2670. Accordingly, in various examples, applicable means for communicating (e.g., receiving, transmitting, etc.) may be embodied by such communications circuitry.

The edge computing node 2650 may include or be coupled to acceleration circuitry 2664, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 2664 may comprise logic blocks or logic fabric and other interconnected resources that may be programmed (configured) to perform various functions, such as the procedures, methods, functions, etc. discussed herein. In such implementations, the acceleration circuitry 2664 may also include memory cells (e.g., EPROM, EEPROM, flash memory, static memory (e.g., SRAM, anti-fuses, etc.) used to store logic blocks, logic fabric, data, etc. in LUTs and the like.

The IX 2656 also couples the processor 2652 to a sensor hub or external interface 2670 that is used to connect additional devices or subsystems. The additional/external devices may include sensors 2672, actuators 2674, and positioning circuitry 2675.

The sensor circuitry 2672 includes devices, modules, or subsystems whose purpose is to detect events or changes in its environment and send the information (sensor data) about the detected events to some other a device, module, subsystem, etc. Examples of such sensors 2672 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 2674, allow platform 2650 to change its state, position, and/or orientation, or move or control a mechanism or system. The actuators 2674 comprise electrical and/or mechanical devices for moving or controlling a mechanism or system, and converts energy (e.g., electric current or moving air and/or liquid) into some kind of motion. The actuators 2674 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2674 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 2650 may be configured to operate one or more actuators 2674 based on one or more captured events and/or instructions or control signals received from a service provider and/or various client systems The positioning circuitry 2675 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2675 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 2675 may include a Micro-Technology for Positioning, Navigation, and Timing (Micro-PNT) IC that uses a master timing clock to perform position tracking/estimation without GNSS assistance. The positioning circuitry 2675 may also be part of, or interact with, the communication circuitry 2666 to communicate with the nodes and components of the positioning network. The positioning circuitry 2675 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 2675 is, or includes an INS, which is a system or device that uses sensor circuitry 2672 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 2650 without the need for external references.

In some optional examples, various input/output (I/O) devices may be present within or connected to, the edge computing node 2650, which are referred to as input circuitry 2686 and output circuitry 2684 in FIG. 26. The input circuitry 2686 and output circuitry 2684 include one or more user interfaces designed to enable user interaction with the platform 2650 and/or peripheral component interfaces designed to enable peripheral component interaction with the platform 2650. Input circuitry 2686 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2684 may be included to show information or otherwise convey information, such as sensor readings, actuator position(s), or other like information. Data and/or graphics may be displayed on one or more user interface components of the output circuitry 2684. Output circuitry 2684 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2650. The output circuitry 2684 may also include speakers or other audio emitting devices, printer(s), and/or the like. Additionally or alternatively, the sensor circuitry 2672 may be used as the input circuitry 2684 (e.g., an image capture device, motion capture device, or the like) and one or more actuators 2674 may be used as the output device circuitry 2684 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2676 may power the edge computing node 2650, although, in examples in which the edge computing node 2650 is mounted in a fixed location, it may have a power supply coupled to an electrical grid, or the battery may be used as a backup or for temporary capabilities. The battery 2676 may be a lithium ion battery, or a metal-air battery, such as a zinc-air battery, an aluminum-air battery, a lithium-air battery, and the like.

A battery monitor/charger 2678 may be included in the edge computing node 2650 to track the state of charge (SoCh) of the battery 2676, if included. The battery monitor/charger 2678 may be used to monitor other parameters of the battery 2676 to provide failure predictions, such as the state of health (SoH) and the state of function (SoF) of the battery 2676. The battery monitor/charger 2678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 2678 may communicate the information on the battery 2676 to the processor 2652 over the IX 2656. The battery monitor/charger 2678 may also include an analog-to-digital (ADC) converter that enables the processor 2652 to directly monitor the voltage of the battery 2676 or the current flow from the battery 2676. The battery parameters may be used to determine actions that the edge computing node 2650 may perform, such as transmission frequency, mesh network operation, sensing frequency, and the like.

A power block 2680, or other power supply coupled to a grid, may be coupled with the battery monitor/charger 2678 to charge the battery 2676. In some examples, the power block 2680 may be replaced with a wireless power receiver to obtain the power wirelessly, for example, through a loop antenna in the edge computing node 2650. A wireless battery charging circuit, such as an LTC4020 chip from Linear Technologies of Milpitas, California, among others, may be included in the battery monitor/charger 2678. The specific charging circuits may be selected based on the size of the battery 2676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2658 may include instructions 2682 in the form of software, firmware, or hardware commands to implement the techniques described herein. Although such instructions 2682 are shown as code blocks included in the memory 2654 and the storage 2658, it may be understood that any of the code blocks may be replaced with hardwired circuits, for example, built into an application specific integrated circuit (ASIC).

In an example, the instructions 2682 provided via the memory 2654, the storage 2658, or the processor 2652 may be embodied as a non-transitory, machine-readable medium 2660 including code to direct the processor 2652 to perform electronic operations in the edge computing node 2650. The processor 2652 may access the non-transitory, machine-readable medium 2660 over the IX 2656. For instance, the non-transitory, machine-readable medium 2660 may be embodied by devices described for the storage 2658 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 2660 may include instructions to direct the processor 2652 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 25 and 26 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 25 and 26 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

FIGS. 25 and 26 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

5. Implementation Examples

Figure 27:
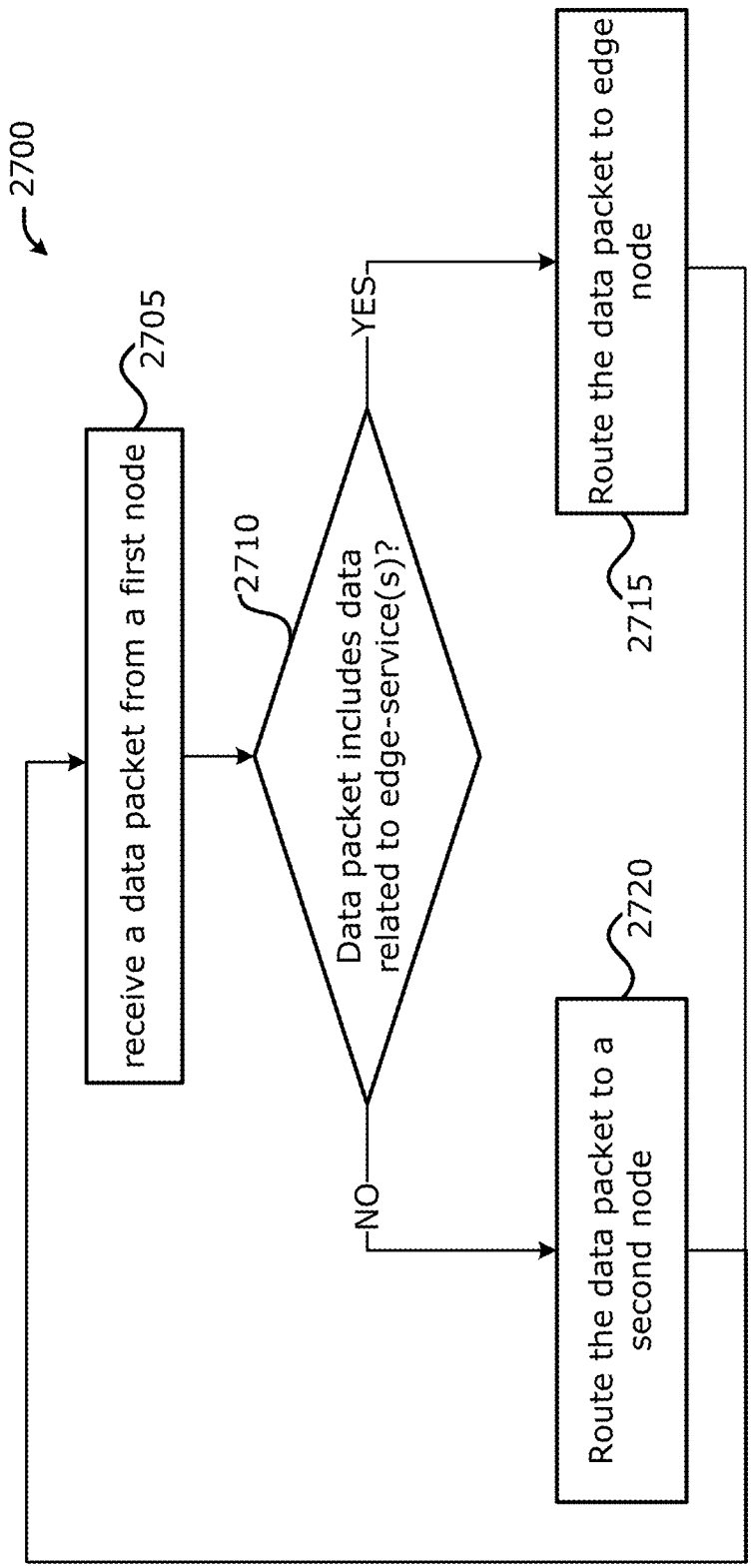
FIG. 27 depicts an example edge LBO process.

An example implementation of the LBO mechanisms discussed herein are shown and described with respect to FIG. 27, which shows an edge LBO process 2700 that may be practiced by an edge node 140 or a NAN 130. Process 2700 begins at operation 2705 where a data packet is received from a first node. The first node may be a UE 117, a cloud computing service 160, an app server, or other entity. At operation 2710, it is determined whether the data packet includes data related to one or more edge-services (e.g., microservices 211a, 211b).

If the data packet includes data related to one or more edge-services (e.g., microservices 211a, 211b), then the data packet is routed to the edge node 140 at operation 2715. If the edge LBO process 2700 is performed by the edge node 140, operation 2715 may involve routing the data packet (e.g., by the conditional relay layer 605) to an application layer of a UP protocol stack 601 implemented by the edge node 140 (or to a specified edge application within the application layer). If the edge LBO process 2700 is performed by the NAN 130, operation 2715 may involve sending the data packet (e.g., by the conditional relay layer 705) over a UP interface between the NAN 130 and the edge node 140. Here, the UP interface may be the same type of interface used for communicating with the second node, such as, for example, the S1-U interface if the second node is the SGW 526, the N3 interface if the second node is the UPF 548, the SGi interface if the second node is the PDN 536a, or the N6 interface if the second node is the DN 536b. Alternatively, the UP interface between the edge node 140 and the NAN 130 could be a different interface than those used for communicating with the second node.

If the data packet does not include data related to one or more edge-services (e.g., microservices 211a, 211b), then the data packet is routed to the second node at operation 2720. The second node may be a UE 117, a core network function, a cloud computing service 160, an app server, a PDN/DN 536, or some other entity. If the edge LBO process 2700 is performed by the edge node 140, operation 2720 may involve sending the data packet (e.g., by the conditional relay layer 605) over a UP protocol interface. Here, the UP interface may be the S1-U interface if the second node is the SGW 526, the N3 interface if the second node is the UPF 548, the SGi interface if the second node is the PDN 536a, the N6 interface if the second node is the DN 536b, or the Uu interface if the second node is the UE 117. If the edge LBO process 2700 is performed by the NAN 130, operation 2720 may involve sending the data packet (e.g., by the conditional relay layer 705) over a UP interface between the NAN 130 and the second node. Here, the UP interface may be the S1-U interface if the second node is the SGW 526, the N3 interface if the second node is the UPF 548, or the Uu interface if the second node is the UE 117.

Additional examples of the presently described embodiments include the following, non-limiting implementations. Each of the following non-limiting examples may stand on its own or may be combined in any permutation or combination with any one or more of the other examples provided below or throughout the present disclosure.

Example 1 includes a method for operating a compute node to provide edge local breakout related to a microservice provided by an edge compute node, the method comprising: receiving a data packet from a first node; routing the data packet to the edge compute node when the data packet includes edge-service data related to the microservice; and routing the data packet to a second node when the data packet does not include edge-service data related to the microservice.

Example 2 includes the method of examples 1 and/or some other example(s) herein, when the data packet includes the edge-service data related to the microservice, the method further comprises: diverting the data packet to a corresponding edge application in the edge compute node.

Example 3 includes the method of examples 1-2 and/or some other example(s) herein, when the data packet does not include the edge-service data related to the microservice, the method further comprises: relaying the data packet to the second node.

Example 4 includes the method of examples 1-3 and/or some other example(s) herein, further comprising: operating a conditional relay layer for routing the data packet to the edge compute node or the second node.

Example 5 includes the method of examples 1-4 and/or some other example(s) herein, wherein the compute node is in a first network deployment and the second node is in a second network deployment different than the first network deployment.

Example 6 includes the method of example 5 and/or some other example(s) herein, wherein the method is performed by the edge compute node, the first network deployment includes the edge compute node is co-located with one or more network access nodes (NANs), and deployed on, at, or near respective interfaces between the one or more NANs and a core network, and the second network deployment includes the core network.

Example 7 includes the method of example 6 and/or some other example(s) herein, wherein: the first network deployment includes the edge compute node being coupled with the core network via a first UP interface, and one of: the one or more NANs being coupled with the core network via respective second UP interfaces between the one or more NANs and the core network that are separate from the first UP interface; or the one or more NANs being coupled with the core network via respective second UP interfaces between the one or more NANs and the edge compute node and the first UP interface.

Example 8 includes the method of examples 6-7 and/or some other example(s) herein, wherein the conditional relay layer is part of a user plane (UP) protocol stack implemented by the edge compute node.

Example 9 includes the method of example 8 and/or some other example(s) herein, wherein the conditional relay layer is between an internet protocol (IP) layer of the UP protocol stack and an application layer of the UP protocol stack.

Example 10 includes the method of example 9 and/or some other example(s) herein, wherein the routing the data packet to the edge compute node when the data packet includes the edge-service data related to the microservice comprises: operating the conditional relay layer to route the data packet to the application layer of the UP protocol stack.

Example 11 includes the method of examples 9-10 and/or some other example(s) herein, wherein the routing the data packet to the second node when the data packet does not include the edge-service data related to the microservice comprises: operating the conditional relay layer to relay the data packet over a UP interface.

Example 12 includes the method of example 11 and/or some other example(s) herein, wherein the second node is a network function (NF) in the core network, the UP interface is between the edge compute node and the NF, and wherein the second network deployment includes: the NF is a serving gateway (SGW), the core network is a fourth generation (4G) evolved packet core (EPC), and the UP interface is an S1-U interface; or the NF is a user plane function (UPF), the core network is a fifth generation (5G) core network (5GC), and the UP interface is an N3 interface.

Example 13 includes the method of example 12 and/or some other example(s) herein, wherein the first node is a user equipment (UE).

Example 14 includes the method of example 13 and/or some other example(s) herein, wherein when the core network is the 4G EPC, an Evolved Packet System (EPS) bearer is established between the UE and the core network, wherein the EPS bearer extends through the edge compute node, and the method further comprises: establishing an edge bearer between the UE and the edge compute node separate from the establishment of the EPS bearer.

Example 15 includes the method of example 11 and/or some other example(s) herein, wherein the second node is an element outside of the core network, the UP interface is between the edge compute node and the second node, and wherein the second network deployment includes: the second node being a data network (DN) and the UP interface being an N6 interface; or the second node being a packet data network (PDN) and the UP interface being an SGi interface.

Example 16 includes the method of examples 6-15 and/or some other example(s) herein, wherein each NAN of the one or more NANs is an Evolved Universal Terrestrial Radio Access Network NodeB (eNB), a Next Generation NodeB (gNB), a next generation eNB (ng-eNB), an Evolved Universal Terrestrial Radio Access-New Radio gNB (en-gNB), or a WiFi access point (AP).

Example 17 includes the method of example 5 and/or some other example(s) herein, wherein the method is performed by a NAN, and the first network deployment includes the NAN that is co-located with the edge compute node deployed on, at, or near an interface between the the NAN and a core network, and the second network deployment includes the core network.

Example 18 includes the method of example 17 and/or some other example(s) herein, wherein the conditional relay layer is part of a UP protocol stack implemented by the NAN.

Example 19 includes the method of example 18 and/or some other example(s) herein, wherein the conditional relay layer is above a Packet Data Convergence Protocol (PDCP) layer of the UP protocol stack or above a General Packet Radio System Tunnelling Protocol User Plane (GTP-U) layer of the UP protocol stack.

Example 20 includes the method of example 19 and/or some other example(s) herein, wherein the routing the data packet to the edge compute node when the data packet includes the edge-service data related to the microservice comprises: operating the conditional relay layer to route the data packet over a UP interface between the NAN and the edge compute node.

Example 21 includes the method of example 20 and/or some other example(s) herein, wherein the routing the data packet to the second node when the data packet does not include the edge-service data related to the microservice comprises: operating the conditional relay layer to relay the data packet over another UP interface between the NAN and an NF in the core network.

Example 22 includes the method of example 21 and/or some other example(s) herein, wherein the UP interface is a same type of interface as the other UP interface, or the UP interface is a different type of interface than the other UP interface.

Example 23 includes the method of examples 21-22 and/or some other example(s) herein, wherein the second node is the NF in the core network, and wherein the second network deployment includes: the NF being a serving gateway (SGW), the core network being a fourth generation (4G) evolved packet core (EPC), and the other UP interface being an S1-U interface; or the NF being a user plane function (UPF), the core network being a fifth generation (5G) core network (5GC), and the other UP interface being an N3 interface.

Example 24 includes the method of examples 21-23 and/or some other example(s) herein, wherein the UP interface is an N6 interface or an SGi interface.

Example 25 includes the method of example 24 and/or some other example(s) herein, wherein the first node is a user equipment (UE).

Example 26 includes the method of example 25 and/or some other example(s) herein, wherein an Evolved Packet System (EPS) bearer is established between the UE and the core network, wherein the EPS bearer does not extend through the edge compute node, and an edge bearer is established between the UE and the edge compute node separate from the establishment of the EPS bearer.

Example 27 includes the method of examples 17-26 and/or some other example(s) herein, wherein the NAN is an Evolved Universal Terrestrial Radio Access Network NodeB (eNB), a Next Generation NodeB (gNB), a next generation eNB (ng-eNB), an Evolved Universal Terrestrial Radio Access-New Radio gNB (en-gNB), or a WiFi access point (AP).

Example 28 includes the method of examples 1-27 and/or some other example(s) herein, wherein the edge compute node is a Multi-access Edge Computing (MEC) platform, a MEC host, or an Open Network Edge Services Software (OpenNESS) edge node.

Example 29 includes the method of examples 1-28 and/or some other example(s) herein, wherein the edge-service data related to the microservice is data for consumption by the microservice.

Example 30 includes the method of examples 1-29 and/or some other example(s) herein, wherein the edge-service and/or the microservice is part of an session.

Example 31 includes the method of example 30 and/or some other example(s) herein, wherein the session is an ad hoc session that is open or started to accomplish a particular function and terminated after performance of the particular function.

Example 32 includes one or more computer readable media comprising instructions, wherein execution of the instructions by processor circuitry is to cause the processor circuitry to perform the method of examples 1-29 and/or some other example(s) herein.

Example 33 includes a computer program comprising the instructions of example 32 and/or some other example(s) herein.

Example 34 includes an Application Programming Interface (API) defining functions, methods, variables, data structures, and/or protocols for the computer program of example 32 and/or some other example(s) herein.

Example 35 includes an apparatus comprising circuitry loaded with the instructions of example 32 and/or some other example(s) herein.

Example 36 includes an apparatus comprising circuitry operable to run the instructions of example 32 and/or some other example(s) herein.

Example 37 includes an integrated circuit comprising one or more of the processor circuitry of example 32 and the one or more computer readable media of example 32 and/or some other example(s) herein.

Example 38 includes a computing system comprising the one or more computer readable media and the processor circuitry of example 32 and/or some other example(s) herein.

Example 39 includes an apparatus comprising means for executing the instructions of example 32 and/or some other example(s) herein.

Example 40 includes a signal generated as a result of executing the instructions of example 32 and/or some other example(s) herein.

Example 41 includes a data unit generated as a result of executing the instructions of example 32 and/or some other example(s) herein.

Example 42 includes the data unit of example 41 and/or some other example(s) herein, wherein the data unit is a datagram, network packet, data frame, data segment, a PDU, a service data unit (SDU), a message, or a database object.

Example 43 includes a signal encoded with the data unit of examples 41-42 and/or some other example(s) herein.

Example 44 includes an electromagnetic signal carrying the instructions of example 32 and/or some other example(s) herein.

Example 45 includes an apparatus comprising means for performing the method of examples 1-29 and/or some other example(s) herein.

An example implementation is an edge computing system, including respective edge processing devices and nodes to invoke or perform the operations of examples 1-45, or other subject matter described herein. Another example implementation is a client endpoint node, operable to invoke or perform the operations of examples 1-45, or other subject matter described herein. Another example implementation is an aggregation node, network hub node, gateway node, or core data processing node, within or coupled to an edge computing system, operable to invoke or perform the operations of examples 1-45, or other subject matter described herein. Another example implementation is an access point, base station, road-side unit, street-side unit, or on-premise unit, within or coupled to an edge computing system, operable to invoke or perform the operations of examples 1-45, or other subject matter described herein. Another example implementation is an edge provisioning node, service orchestration node, application orchestration node, or multi-tenant management node, within or coupled to an edge computing system, operable to invoke or perform the operations of examples 1-45, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples 1-45, or other subject matter described herein. Another example implementation is an edge computing system operable as an edge mesh, as an edge mesh with side car loading, or with mesh-to-mesh communications, operable to invoke or perform the operations of examples 1-45, or other subject matter described herein. Another example implementation is an edge computing system including aspects of network functions, acceleration functions, acceleration hardware, storage hardware, or computation hardware resources, operable to invoke or perform the use cases discussed herein, with use of examples 1-45, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples 1-45, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples 1-45, or other subject matter described herein. Another example implementation is an edge computing system adapted for supporting xApps and operating according to 0-RAN specifications, operable to invoke or perform the use cases discussed herein, with use of examples 1-45, or other subject matter described herein.

6. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module. Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein at least in some embodiments refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein at least in some embodiments refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof. The term "device" at least in some embodiments refers to a physical entity embedded inside, or attached to, another physical entity in its vicinity, with capabilities to convey digital information from or to that physical entity. The term "entity" at least in some embodiments refers to a distinct component of an architecture or device, or information transferred as a payload. The term "controller" at least in some embodiments refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" at least in some embodiments refers to an identifiable entity that implements one or more computing operations, whether part of a larger system, distributed collection of systems, or a standalone apparatus. As used herein, the term "edge compute node" or "edge node" at least in some embodiments refers to a compute node that performs edge computing operations, whether part of a larger system, distributed collection of systems, or a standalone apparatus. In some examples, an edge node may be referred to as an "edge device" or "edge system", whether in operation as a client, server, or intermediate entity. Specific implementations of a compute node may be incorporated into a server, base station, gateway, road side unit, on premise unit, UE or end consuming device, or the like.

The term "computer system" as used herein at least in some embodiments refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein at least in some embodiments refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" as used herein at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

As used herein, the term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

As used herein, the term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

As used herein, the term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021 Jul. 9)). Two or more en-gNBs are interconnected with each other (and/or with one or more eNBs) by means of an X2 interface.

As used herein, the term "Next Generation RAN node" or "NG-RAN node" at least in some embodiments refers to either a gNB or an ng-eNB.

As used herein, the term "access point" or "AP" at least in some embodiments refers to an entity that contains one station (STA) and provides access to the distribution services, via the wireless medium (WM) for associated STAs. An AP comprises a STA and a distribution system access function (DSAF). As used herein, the term "base station" at least in some embodiments refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "orchestration" at least in some embodiments refers to one or more processes for management of interconnections and/or interactions among various workloads to meet service and/or network requirements, and typically involves provisioning apps, services, virtual machines, containers, etc.; deploying and monitoring infrastructure; allocating resources; manage networking; create VMs; performing permission, security, and/or integrity checks; and/or arrangement and coordination of automated tasks resulting in a consolidated processes or workflows. The term "edge orchestration" at least in some embodiments refers to the orchestration of edge resources, edge applications, edge compute nodes, edge compute clusters, and/or edge services running thereon (i.e., workloads). The term "cloud orchestration" at least in some embodiments refers to the orchestration of cloud compute nodes, cloud compute clusters, and/or cloud computing services running thereon (i.e., workloads).

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "subsystem"; however, references to an "edge computing system" generally refer to a distributed architecture, organization, or collection of multiple nodes and devices, and which is organized to accomplish or offer some aspect of services or resources in an edge computing setting.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are physical or virtualized objects that communicate on a network and may include sensors, actuators, and other input/output components, such as to collect data or perform actions from a real world environment. IoT devices are usually low-power devices without heavy compute or storage capabilities. IoT devices may include low-powered devices that are embedded or attached to everyday things, such as buildings, vehicles, packages, etc., to provide an additional level of artificial sensory perception of those things. "Edge IoT devices" may be any kind of IoT devices deployed at a network's edge.

As used herein, the term "cluster" at least in some embodiments refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network. The term "V2X" at least in some embodiments refers to vehicle to vehicle (V2V), vehicle to infrastructure (V2I), infrastructure to vehicle (I2V), vehicle to network (V2N), and/or network to vehicle (N2V) communications and associated radio access technologies (RATs).

As used herein, the term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Digital Enhanced Cordless Telecommunications (DECT), DECT Ultra Low Energy (DECT ULE), DECT-2020, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including C-V2X), Dedicated Short Range Communications (DSRC) communication systems such as Intelligent-Transport-Systems (ITS) including the European ITS-G5, ITS-GSB, ITS-GSC, etc. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" as used herein at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein at least in some embodiments refers to a connection between two devices through a RAT for the purpose of transmitting and receiving information.

The term "Quality of Service" or "QoS' at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or data flows, or to guarantee a certain level of performance to a data flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element (s) that integrate local data by utilizing a combination of localized network(s) and distributed computation.

The terms "instantiate," "instantiation," and the like at least in some embodiments refers to the creation of an instance. An "instance" also at least in some embodiments refers to a concrete occurrence of an object, which may occur, for example, during execution of program code. Additionally or alternatively, loading or instantiation may only be done on installed applications such as radio applications (RAs). Semantically this means that the loaded application/RA instance is available for the user for activation and its parameters may be managed, but the application is not yet executing. Unloading an application/RA instance means it cannot be activated before it has been instantiated again; this may be used to save resources, for instance.

The term "related" at least in some embodiments refers to a connection of two objects or elements by way of an established or discoverable relation, where a "relation" at least in some embodiments refers to a property that holds between an ordered pair of objects. Additionally or alternatively, the term "related to" at least in some embodiments refers to a state of being connected with something and/or to be about something.

The term "information element" at least in some embodiments refers to a structural element containing one or more fields. The term "field" at least in some embodiments refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" at least in some embodiments refers to a data type that contains one single data. The term "data frame" or "DF" at least in some embodiments refers to a data type that contains more than one data element in a predefined order.

As used herein, the term "reliability" at least in some embodiments refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink). The term "Interoperability" at least in some embodiments refers to the ability of ITS-Ss utilizing one communication system or RAT to communicate with other ITS-Ss utilizing another communication system or RAT. The term "Coexistence" at least in some embodiments refers to sharing or allocating radiofrequency resources among ITS-Ss using either communication system or RAT.

The term "application" may refer to a complete and deployable package, environment to achieve a certain function in an operational environment. The term "AI/ML application" or the like may be an application that contains some AI/ML models and application-level descriptions.

The term "artificial intelligence" or "AI" at least in some embodiments refers to intelligence demonstrated by machines and/or a system or device that perceives its environment and takes actions that maximize its chances of achieving a goal. Additionally or alternatively, the term "artificial intelligence", "AI", "artificial intelligence system", or "AI system" at least in some embodiments refers to software and/or hardware that is developed with one or more AI techniques and approaches, and can generate outputs for a given set of objectives (or goals) such as content, predictions, recommendations, inferences, and/or decisions influencing the environments they interact with. The term "artificial intelligence techniques and approaches" or "AI techniques and approaches" at least in some embodiments refers to (a) machine learning approaches, including supervised, unsupervised, and/or reinforcement learning using a wide variety of methods including deep learning; (b) logic- and knowledge-based approaches, including knowledge representation, inductive (logic) programming, knowledge bases, inference and deductive engines, (symbolic) reasoning, and expert systems; and/or (c) statistical approaches, Bayesian estimation, search and optimization methods and/or objective functions.

The term "machine learning" or "ML" at least in some embodiments refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" at least in some embodiments refers to different concepts than the term "ML model," these terms as discussed herein may be used interchangeably for the purposes of the present disclosure.

The term "Geo-Area" at least in some embodiments refers to one or more geometric shapes such as circular areas, rectangular areas, and elliptical areas. A circular Geo-Area is described by a circular shape with a single point A that represents the center of the circle and a radius r. The rectangular Geo-Area is defined by a rectangular shape with a point A that represents the center of the rectangle and a parameter a which is the distance between the center point and the short side of the rectangle (perpendicular bisector of the short side, a parameter b which is the distance between the center point and the long side of the rectangle (perpendicular bisector of the long side, and a parameter θ which is the azimuth angle of the long side of the rectangle. The elliptical Geo-Area is defined by an elliptical shape with a point A that represents the center of the rectangle and a parameter a which is the length of the long semi-axis, a parameter b which is the length of the short semi-axis, and a parameter θ which is the azimuth angle of the long semi-axis. An ITS-S can use a function F to determine whether a point P(x,y) is located inside, outside, at the center, or at the border of a geographical area. The function F(x,y) assumes the canonical form of the geometric shapes: The Cartesian coordinate system has its origin in the center of the shape. Its abscissa is parallel to the long side of the shapes. Point P is defined relative to this coordinate system.

The term "ITS data dictionary" at least in some embodiments refers to a repository of DEs and DFs used in the ITS applications and ITS facilities layer. The term "ITS message" at least in some embodiments refers to messages exchanged at ITS facilities layer among ITS stations or messages exchanged at ITS applications layer among ITS stations.

The term "Collective Perception" or "CP" at least in some embodiments refers to the concept of sharing the perceived environment of an ITS-S based on perception sensors, wherein an ITS-S broadcasts information about its current (driving) environment. CP is the concept of actively exchanging locally perceived objects between different ITS-Ss by means of a V2X RAT. CP decreases the ambient uncertainty of ITS-Ss by contributing information to their mutual FoVs. The term "Collective Perception basic service" (also referred to as CP service (CPS)) at least in some embodiments refers to a facility at the ITS-S facilities layer to receive and process CPMs, and generate and transmit CPMs. The term "Collective Perception Message" or "CPM" at least in some embodiments refers to a CP basic service PDU. The term "Collective Perception data" or "CPM data" at least in some embodiments refers to a partial or complete CPM payload. The term "Collective Perception protocol" or "CPM protocol" at least in some embodiments refers to an ITS facilities layer protocol for the operation of the CPM generation, transmission, and reception. The term "CP object" or "CPM object" at least in some embodiments refers to aggregated and interpreted abstract information gathered by perception sensors about other traffic participants and obstacles. CP/CPM Objects can be represented mathematically by a set of variables describing, amongst other, their dynamic state and geometric dimension. The state variables associated to an object are interpreted as an observation for a certain point in time and are therefore always accompanied by a time reference. The term "Environment Model" at least in some embodiments refers to a current representation of the immediate environment of an ITS-S, including all perceived objects perceived by either local perception sensors or received by V2X. The term "object", in the context of the CP Basic Service, at least in some embodiments refers to the state space representation of a physically detected object within a sensor's perception range. The term "object list" at least in some embodiments refers to a collection of objects temporally aligned to the same timestamp.

The term "ITS Central System" at least in some embodiments refers to an ITS system in the backend, for example, traffic control center, traffic management center, or cloud system from road authorities, ITS application suppliers or automotive OEMs (see e.g., clause 4.5.1.1 of [EN302665]). The term "personal ITS-S" at least in some embodiments refers to an ITS-S in a nomadic ITS sub-system in the context of a portable device (e.g., a mobile device of a pedestrian). The term "vehicle" may refer to road vehicle designed to carry people or cargo on public roads and highways such as AVs, busses, cars, trucks, vans, motor homes, and motorcycles; by water such as boats, ships, etc.; or in the air such as airplanes, helicopters, UAVs, satellites, etc.

The term "sensor measurement" at least in some embodiments refers to abstract object descriptions generated or provided by feature extraction algorithm(s), which may be based on the measurement principle of a local perception sensor mounted to an ITS-S. The feature extraction algorithm processes a sensor's raw data (e.g., reflection images, camera images, etc.) to generate an object description. The term "State Space Representation" is a mathematical description of a detected object, which includes state variables such as distance, speed, object dimensions, and the like. The state variables associated with/to an object are interpreted as an observation for a certain point in time, and therefore, are accompanied by a time reference.

The term "maneuvers" or "manoeuvres" refer to specific and recognized movements bringing an actor, e.g., pedestrian, vehicle or any other form of transport, from one position to another within some momentum (velocity, velocity variations and vehicle mass). The term "Maneuver Coordination" or "MC" at least in some embodiments refers to the concept of sharing, by means of a V2X RAT, an intended movement or series of intended movements of an ITS—S based on perception sensors, planned trajectories, and the like, wherein an ITS-S broadcasts information about its current intended maneuvers. The term "Maneuver Coordination basic service" (also referred to as Maneuver Coordination Service (MCS)) at least in some embodiments refers to a facility at the ITS-S facilities layer to receive and process MCMs, and generate and transmit MCMs. The term "Maneuver Coordination Message" or "MCM" at least in some embodiments refers to an MC basic service PDU. The term "Maneuver Coordination data" or "MCM data" at least in some embodiments refers to a partial or complete MCM payload. The term "Maneuver Coordination protocol" or "MCM protocol" at least in some embodiments refers to an ITS facilities layer protocol for the operation of the MCM generation, transmission, and reception. The term "MC object" or "MCM object" at least in some embodiments refers to aggregated and interpreted abstract information gathered by perception sensors about other traffic participants and obstacles, as well as information from applications and/or services operated or consumed by an ITS-S.

The term "network address" at least in some embodiments refers to an identifier for a node or host in a computer network, and may be a unique identifier across a network and/or may be unique to a locally administered portion of the network. Examples of network addresses include telephone numbers in a public switched telephone number, a cellular network address (e.g., international mobile subscriber identity (IMSI), mobile subscriber ISDN number (MSISDN), Subscription Permanent Identifier (SUPI), Temporary Mobile Subscriber Identity (TMSI), Globally Unique Temporary Identifier (GUTI), Generic Public Subscription Identifier (GPSI), etc.), an internet protocol (IP) address in an IP network (e.g., IP version 4 (Ipv4), IP version 6 (IPv6), etc.), an internet packet exchange (IPX) address, an X.25 address, an X.21 address, a port number (e.g., when using Transmission Control Protocol (TCP) or User Datagram Protocol (UDP)), a media access control (MAC) address, an Electronic Product Code (EPC) as defined by the EPCglobal Tag Data Standard, Bluetooth hardware device address (BD ADDR), a Universal Resource Locator (URL), an email address, a Tunnel Endpoint Identifier (TEID), and/or the like.

The term "Tunnel Endpoint Identifier" or "TEID" at least in some embodiments refers to an identifier that unambiguously identifies a tunnel endpoint in the receiving GTP-U protocol entity for a given UDP/IP endpoint. The receiving end side of a GTP tunnel locally assigns the TEID value the transmitting side has to use. The TEID values are exchanged between tunnel endpoints using control plane message. The term "GTP-U Tunnel" at least in some embodiments refers to a set of nodes with a TEID, an IP address and a UDP port number; a GTP-U tunnel is necessary to enable forwarding packets between GTP-U entities and are used to carry encapsulated transport PDUs (T-PDUs) and signalling messages between a given pair of GTP-U Tunnel endpoints.

The term "user" in the context of reconfigurable radio equipment/systems, at least in some embodiments refers to an abstract representation of any entity issuing command requests (e.g., using the services) to a system, device, component, or other entity or element. The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "ego" as in "ego station" or "ego ITS-S" at least in some embodiments refers to an entity/element (e.g., a STA or ITS-S) that is under consideration. The term "neighbors" at least in some embodiments refers to other entities/elements different than the ego entity/element, and may refer to such other entities/elements within a predetermined or predefinied distance to the ego entity/element.

The term "flow" and/or "data flow" refer to a user plane data link that is attached to an association. Examples are circuit switched phone calls, voice over IP calls, reception of an SMS, sending of a contact card, PDP context for internet access, demultiplexing a TV channel from a channel multiplex, calculation of position coordinates from geopositioning satellite signals, etc. A flow may only be established when there is already an association present. Typically, both sides of the association may initiate a flow, and both sides may terminate it. The maximum amount of flows in an association may be limited by the radio system specifications. It may be possible to move a flow from one association to another, even across radio applications.

The term "distributed computations" at least in some embodiments refers to a model in which components located on networked computers communicate and coordinate their actions by passing messages interacting with each other in order to achieve a common goal. The term "network coding" at least in some embodiments refers to a technique in which transmitted data is encoded and decoded to improve network performance.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. The term "microservice architecture" at least in some embodiments refers to a variant of the service-oriented architecture (SOA) structural style wherein applications are arranged as a collection of loosely-coupled services (e.g., fine-grained services) and may use lightweight protocols. Additionally or alternatively, the term "microservice" at least in some embodiments refers to an architecture that structures an application as a set of loosely coupled, collaborating services that are independently deployable.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the present disclosure, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus comprising:
   interface circuitry to receive data packets from user equipment (UE) different than an edge compute node; and
   at least one processor circuit to be programed by instructions to:
   cause a first data packet to be routed to the edge compute node based on the first data packet including edge-service data related to a microservice provided by the edge compute node; and
   cause a second data packet to be routed over a user plane (UP) interface to a serving gateway (SGW) in an evolved packet core (EPC) based on the second data packet not including edge-service data related to the microservice, the UP interface to provide data communication between the edge compute node and the SGW, an Evolved Packet System (EPS) bearer to provide data communication between the UE and the EPC, the EPS bearer to extend through the edge compute node; and establish an edge bearer to provide data communication between the UE and the edge compute node, the edge bearer distinct from the EPS bearer.

2. The apparatus of claim 1, wherein one or more of the at least one processor circuit is to cause the first data packet to be diverted to a corresponding edge application in the edge compute node based on the first data packet including the edge-service data.

3. The apparatus of claim 1, wherein one or more of the at least one processor circuit is to operate a UP protocol stack including a conditional relay layer, the conditional relay layer to route the first data packet to the edge compute node or the second data packet to the SGW in the EPC.

4. The apparatus of claim 3, wherein the apparatus is in a first network deployment and the SGW in the EPC is in a second network deployment different than the first network deployment.

5. The apparatus of claim 4, wherein the apparatus is the edge compute node, the first network deployment includes (i) the edge compute node co-located with one or more network access nodes (NANs), and (ii) the edge compute node deployed on, at, or near respective interfaces between the one or more NANs and the EPC, and the second network deployment includes the EPC.

6. The apparatus of claim 5, wherein the UP interface is a first UP interface, the first network deployment includes the edge compute node coupled with the EPC via the first UP interface, and the one or more NANs coupled with the EPC via respective one or more second UP interfaces between the one or more NANs and the EPC, the one or more second UP interfaces distinct from the first UP interface.

7. The apparatus of claim 5, wherein the UP interface is a first UP interface, the first network deployment includes the edge compute node coupled with the EPC via the first UP interface, and the one or more NANs coupled with the EPC via respective one or more second UP interfaces between the one or more NANs and the edge compute node and the first UP interface.

8. The apparatus of claim 5, wherein the conditional relay layer is between an internet protocol (IP) layer of the UP protocol stack and an application layer of the UP protocol stack.

9. The apparatus of claim 8, wherein one or more of the at least one processor circuit is to cause the conditional relay layer to route the first data packet to a designated edge application in the application layer of the UP protocol stack based on the first data packet including the edge-service data.

10. The apparatus of claim 8, wherein one or more of the at least one processor circuit is to cause the conditional relay layer to relay the second data packet over the UP interface to the SGW in the EPC based on the second data packet not including the edge-service data.

11. The apparatus of claim 10, wherein the UP interface between the edge compute node and the SGW is an S1-U interface.

12. An apparatus comprising:
interface circuitry to receive data packets from user equipment (UE) different than an edge compute node; and
at least one processor circuit to be programed by instructions to:
cause a first data packet to be routed over an SGi interface to the edge compute node based on the first data packet including edge-service data related to a microservice provided by the edge compute node; and
cause a second data packet to be routed over an S1-U interface to a serving gateway (SGW) in an evolved packet core (EPC) based on the second data packet not including edge-service data related to the microservice, an Evolved Packet System (EPS) bearer to provide data communication between the UE and the EPC, the EPS bearer not to extend through the edge compute node; and
establish an edge bearer to provide data communication between the UE and the edge compute node, the edge bearer distinct from the EPS bearer.

13. The apparatus of claim 12, wherein the edge-service data is data for consumption by the microservice.

14. The apparatus of claim 1, including the instructions.

15. The apparatus of claim 1, including the EPC is a fourth generation (4G) EPC.

16. The apparatus of claim 12, including the instructions.

17. The apparatus of claim 12, including the EPC is a fourth generation (4G) EPC.

* * * * *